Oct. 19, 1926.
T. MIDGLEY
1,603,860
CORD TIRE BUILDING
Filed March 27, 1924   28 Sheets-Sheet 8
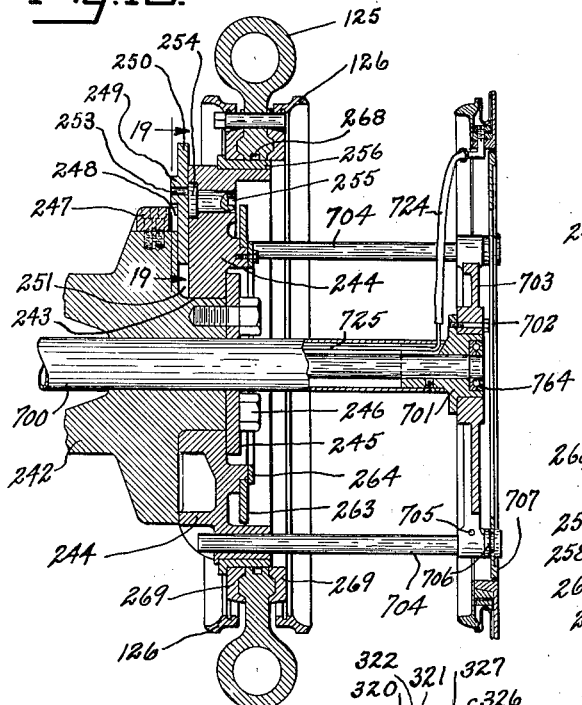
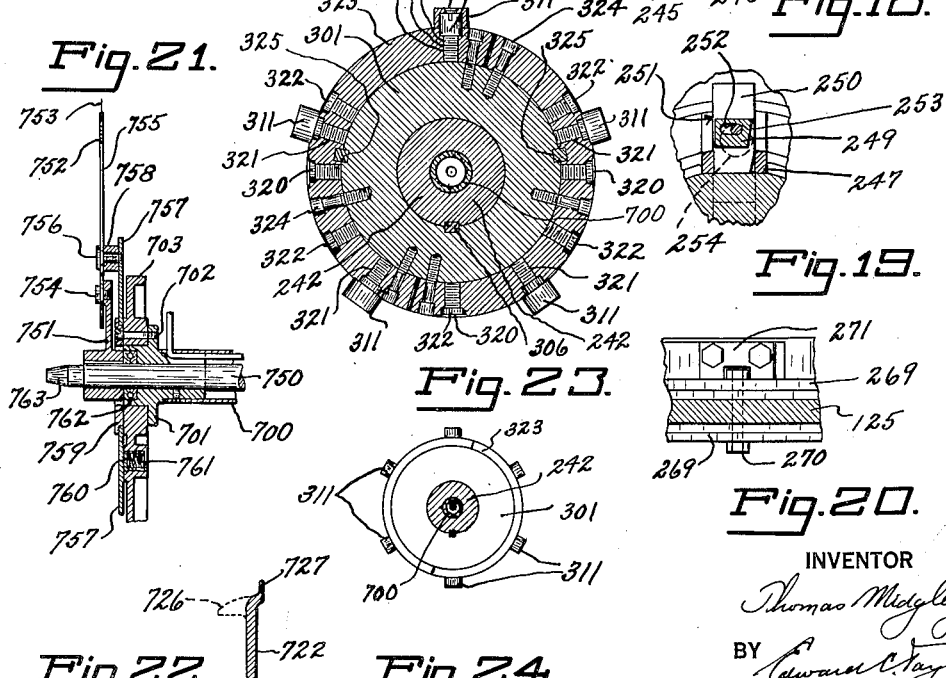
INVENTOR
Thomas Midgley
BY
Edward C. Taylor
ATTORNEY Oct. 19, 1926.

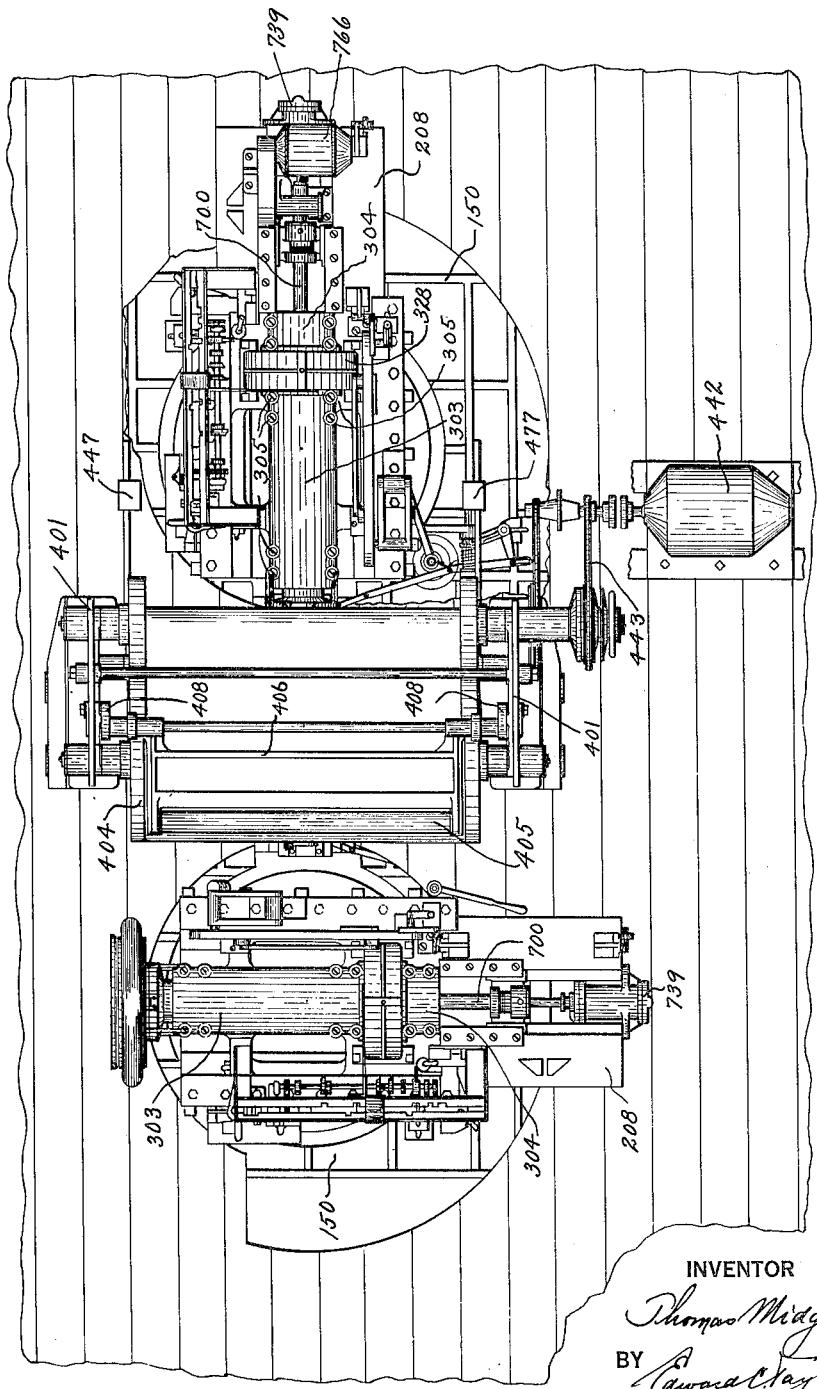

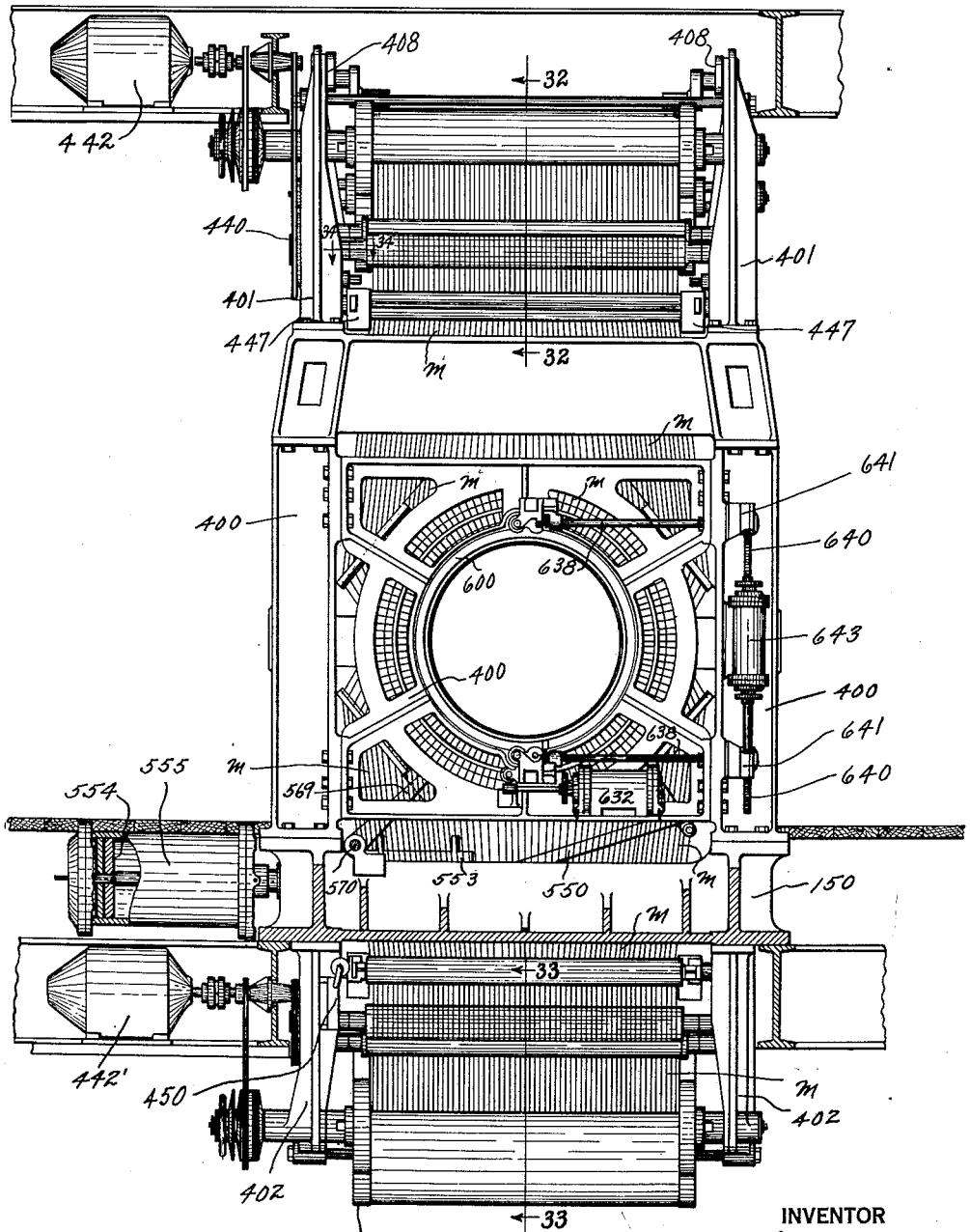

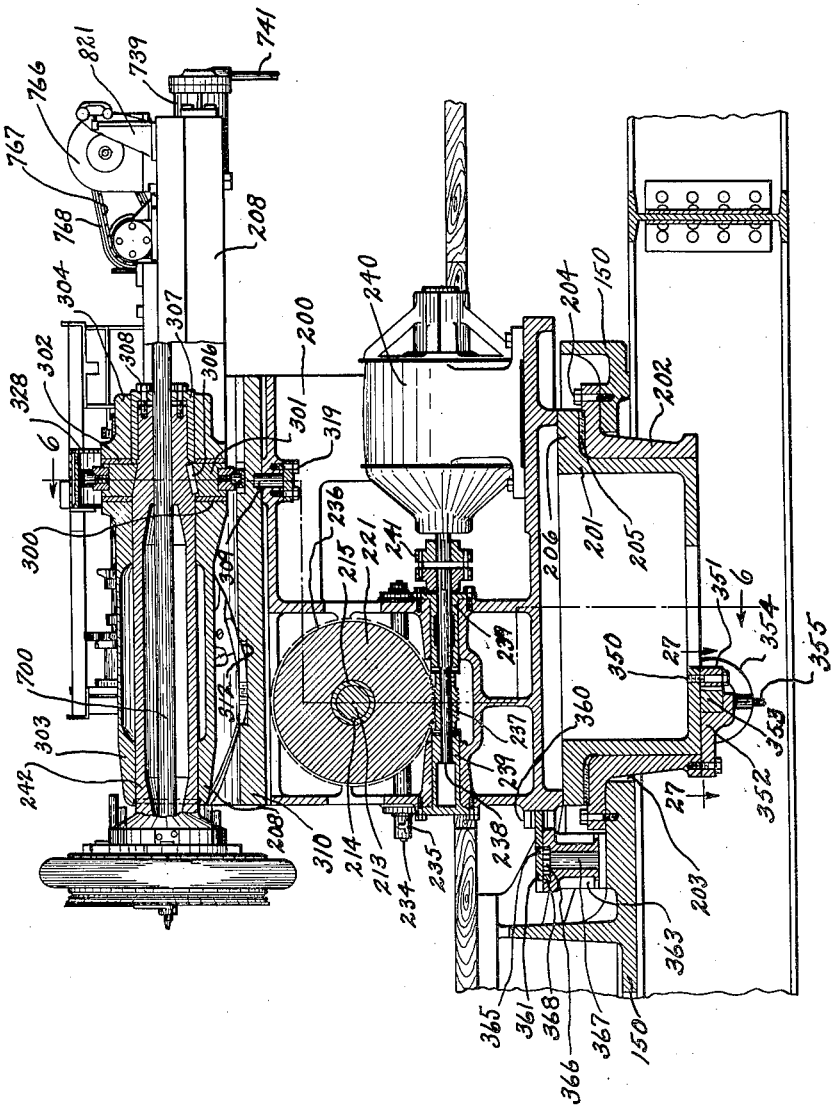

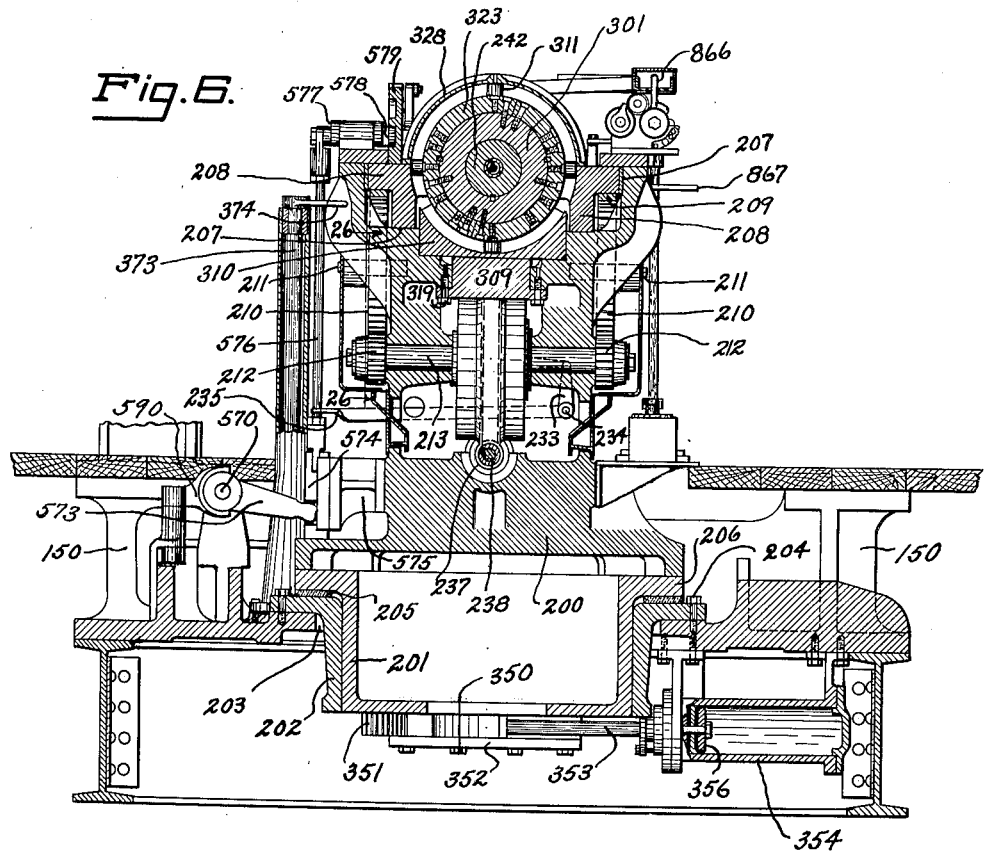
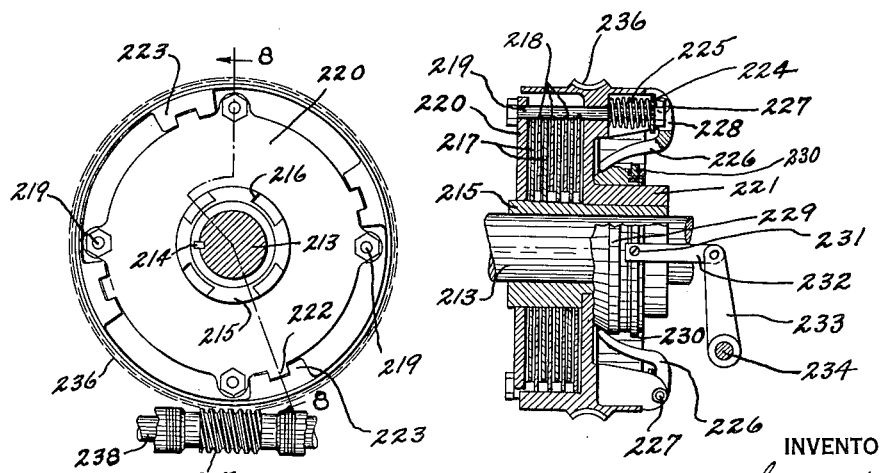

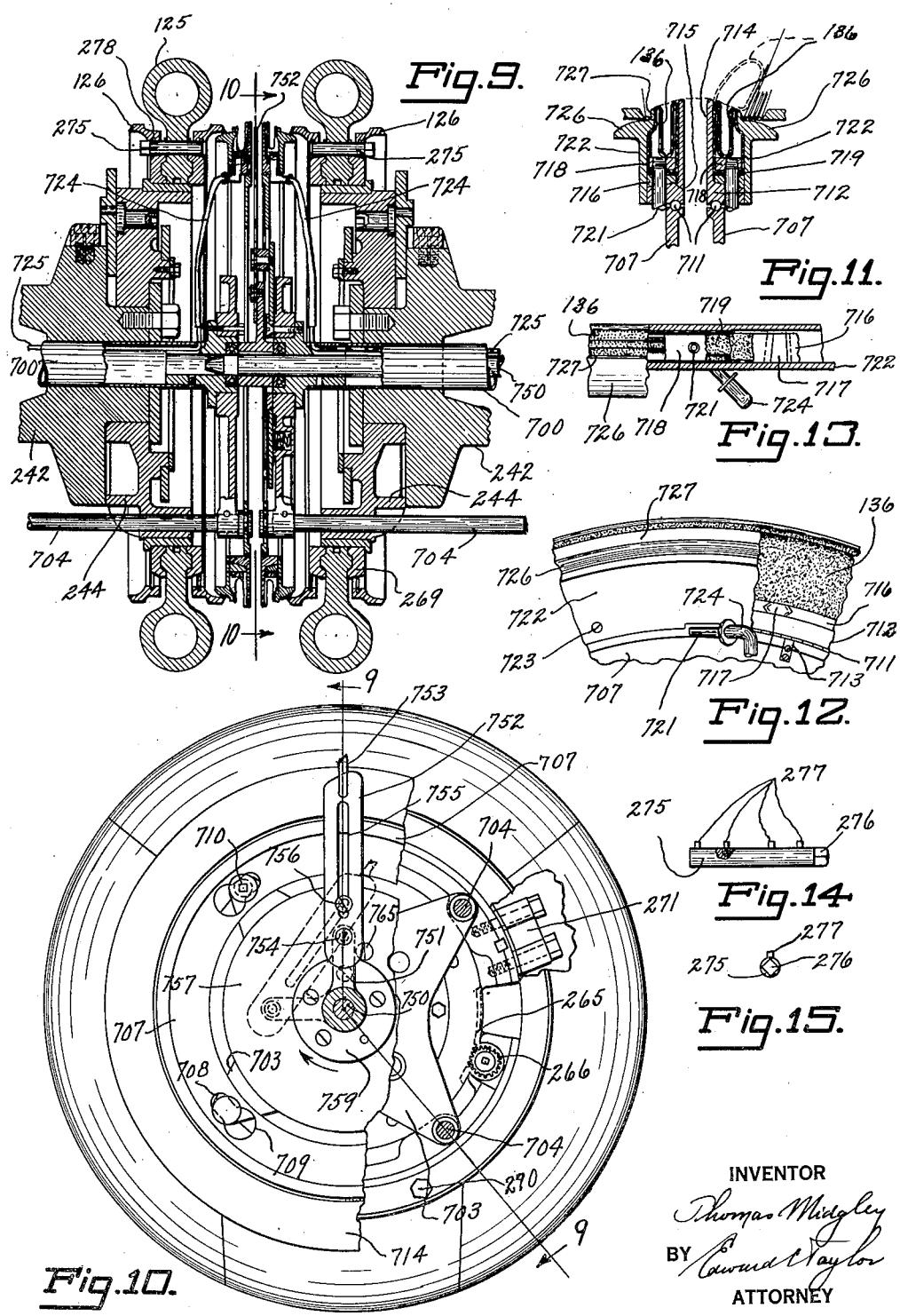

T. MIDGLEY 1,603,860

CORD TIRE BUILDING

Filed March 27, 1924   28 Sheets-Sheet 9

INVENTOR
Thomas Midgley
BY Edward C. Taylor
ATTORNEY

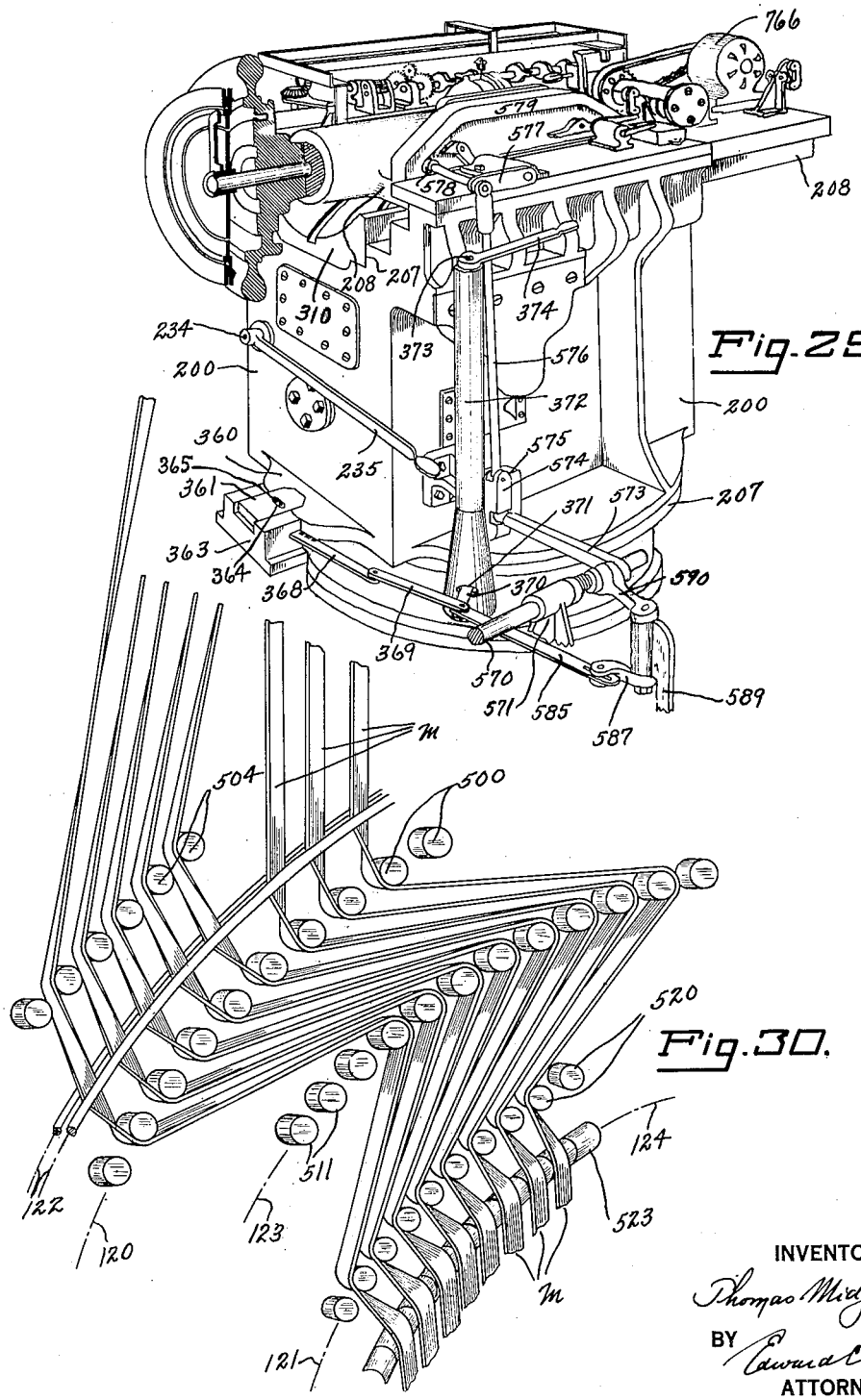

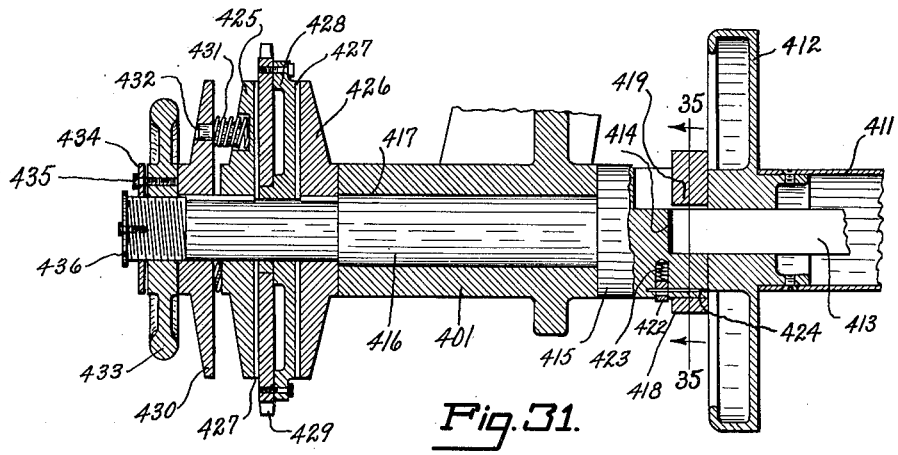

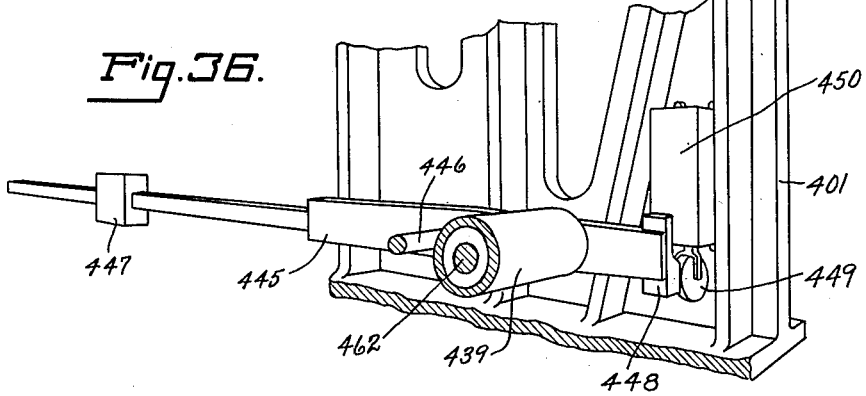
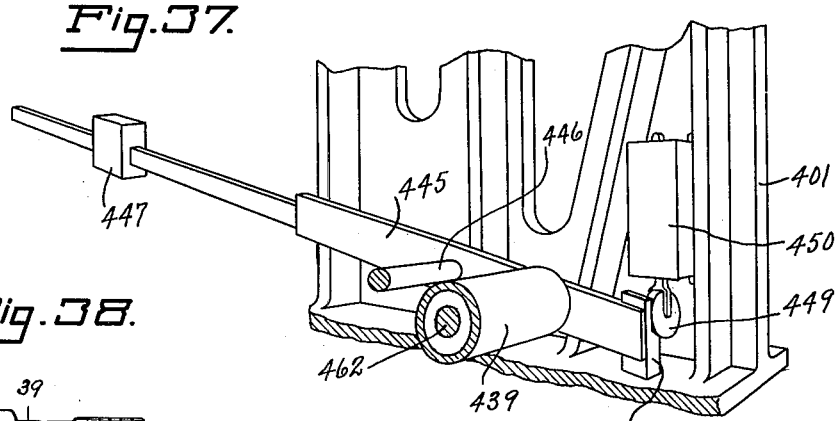
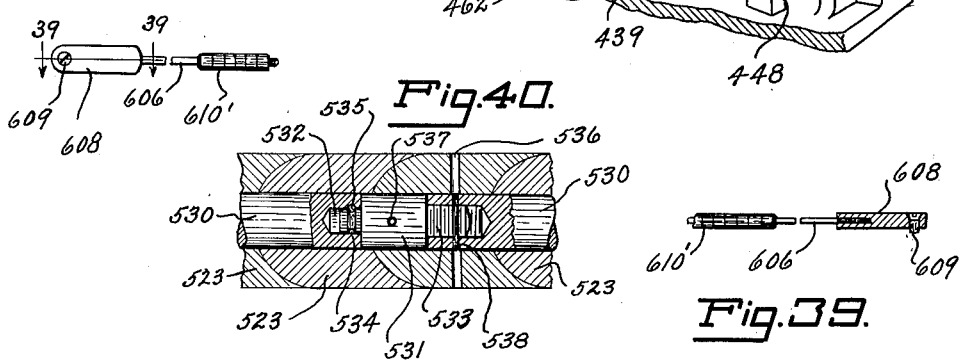
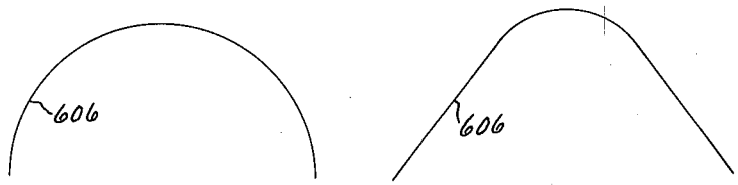

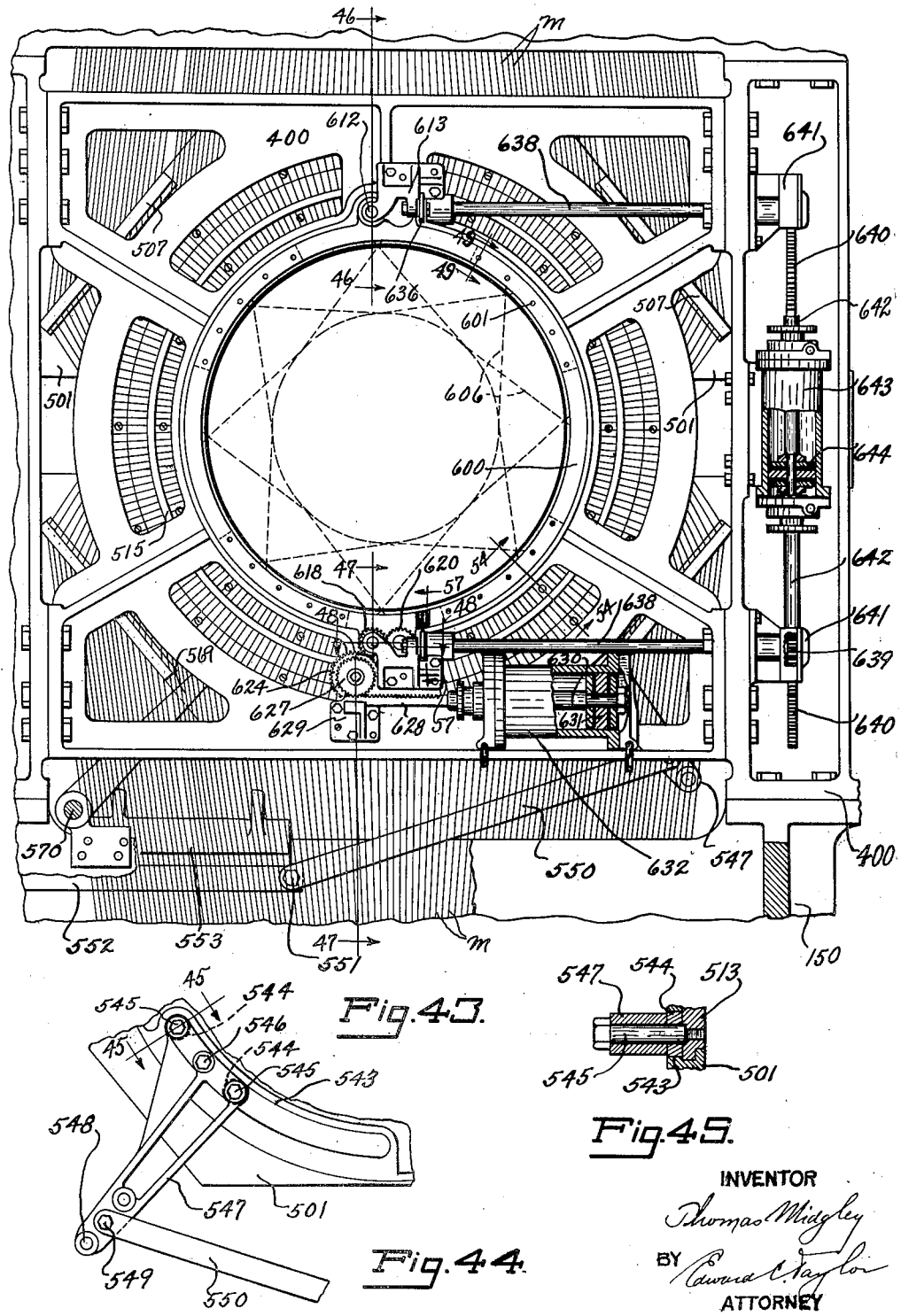

Oct. 19, 1926.
T. MIDGLEY
1,603,860
CORD TIRE BUILDING
Filed March 27, 1924 28 Sheets-Sheet 14
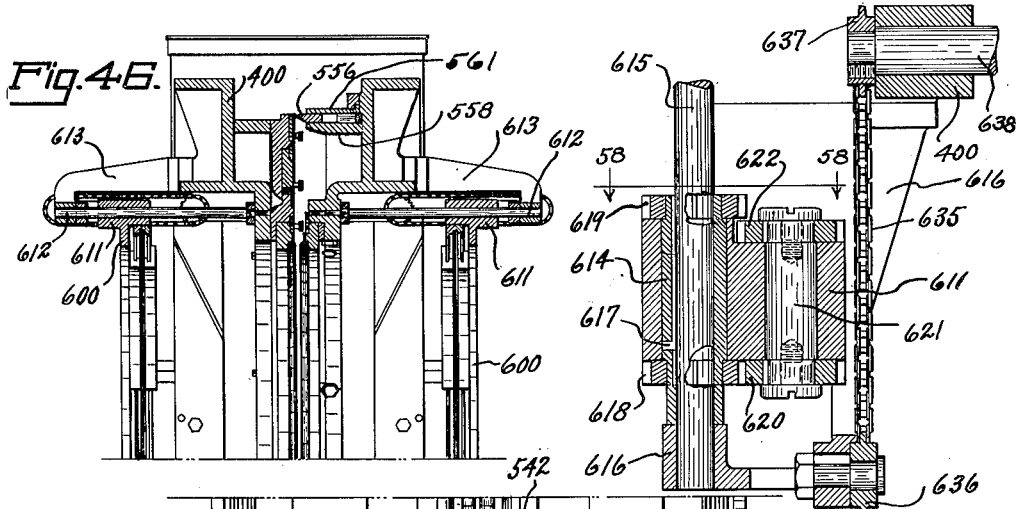
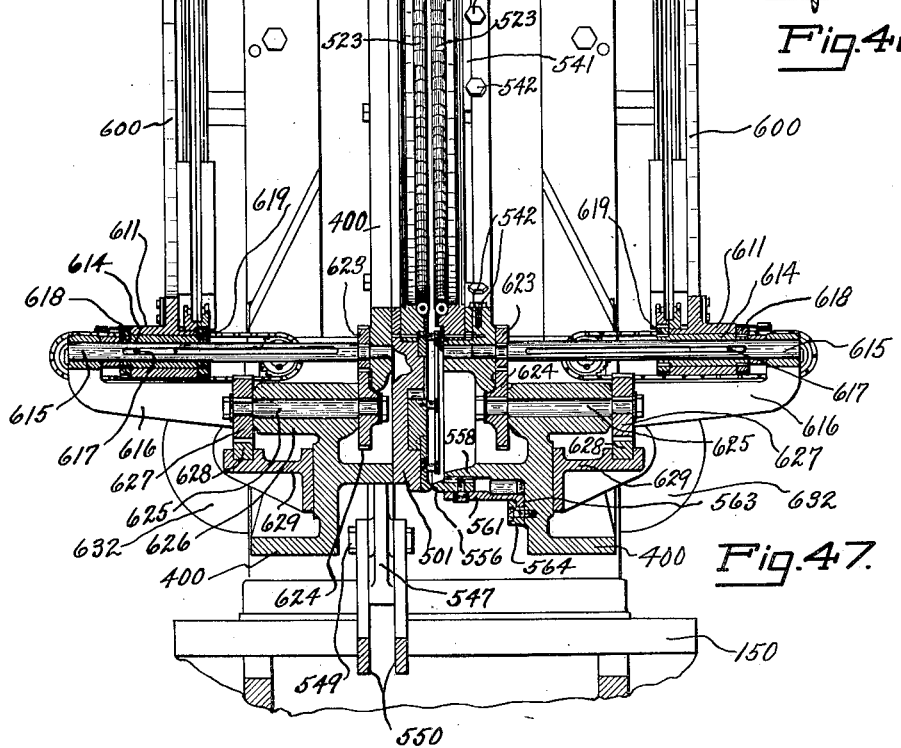
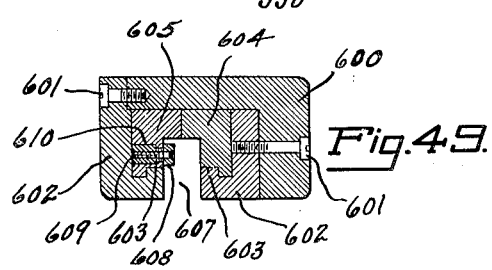
INVENTOR
Thomas Midgley
BY
Edward C. Taylor
ATTORNEY

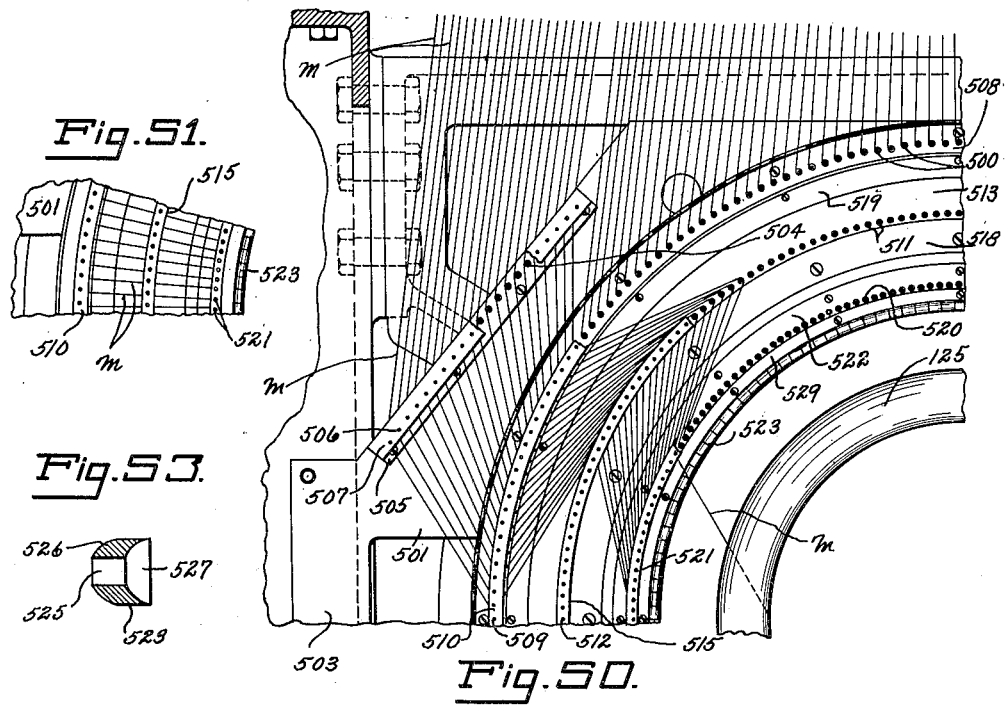
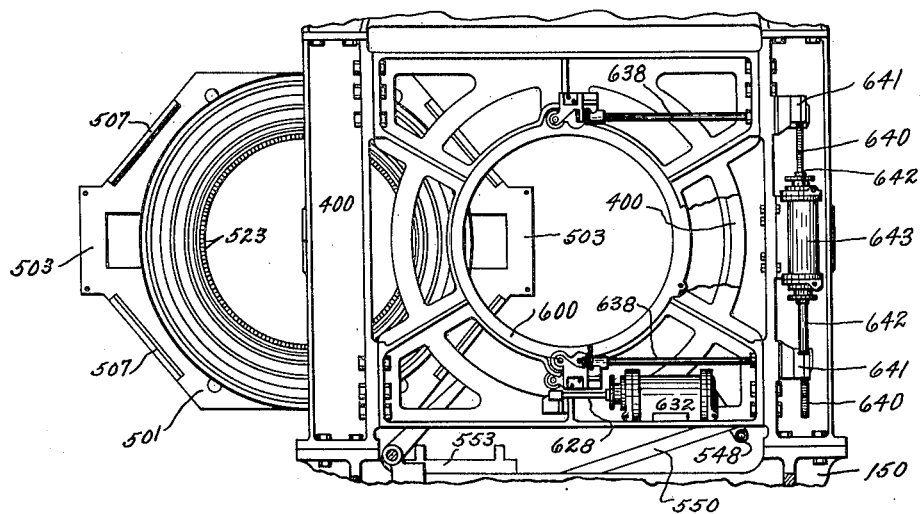

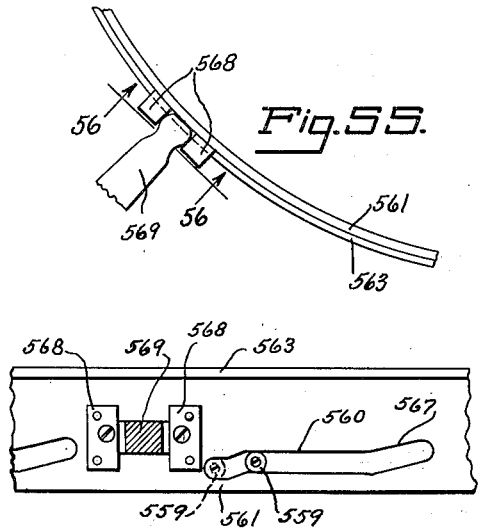
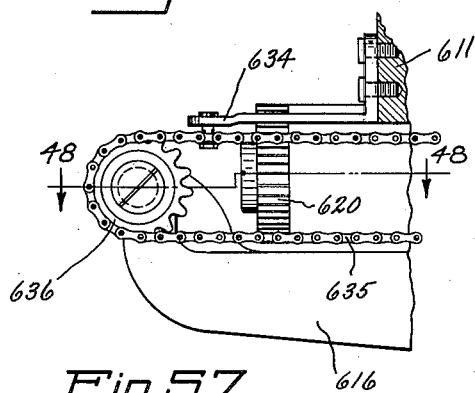
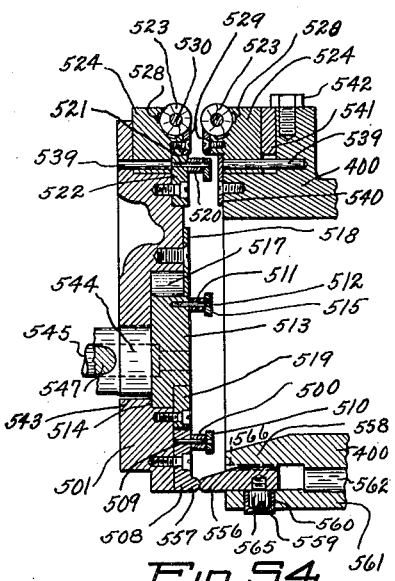
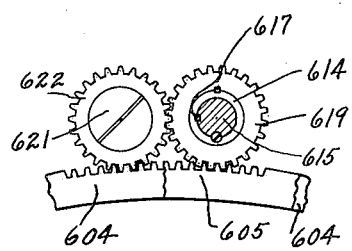
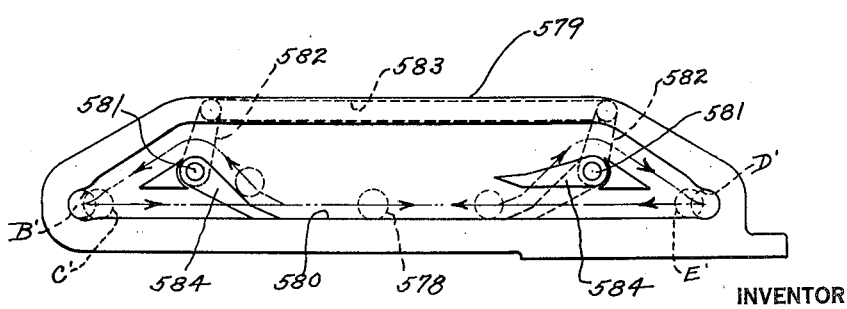

Oct. 19, 1926.

T. MIDGLEY 1,603,860

CORD TIRE BUILDING

Filed March 27, 1924    28 Sheets-Sheet 17

INVENTOR.
Thomas Midgley
BY
Edward C. Taylor
ATTORNEY.

Oct. 19, 1926.  1,603,860
T. MIDGLEY
CORD TIRE BUILDING
Filed March 27, 1924    28 Sheets-Sheet 18

INVENTOR
Thomas Midgley
BY
ATTORNEY

Oct. 19, 1926.

T. MIDGLEY

CORD TIRE BUILDING

Filed March 27, 1924     28 Sheets-Sheet 19

Oct. 19, 1926.　　　　　　　　　　　　　　　　　　　　1,603,860
T. MIDGLEY
CORD TIRE BUILDING
Filed March 27, 1924　　　28 Sheets-Sheet 20

Position E' or J'

INVENTOR.
Thomas Midgley
BY
Edward C. Taylor
ATTORNEY.

Oct. 19, 1926.

T. MIDGLEY 1,603,860

CORD TIRE BUILDING

Filed March 27, 1924    28 Sheets-Sheet 21

INVENTOR.
Thomas Midgley
Edward C. Taylor
BY
ATTORNEY.

Oct. 19, 1926.

T. MIDGLEY

CORD TIRE BUILDING

Filed March 27, 1924    28 Sheets-Sheet 22

1,603,860

INVENTOR.
BY Thomas Midgley
Edward Taylor
ATTORNEY.

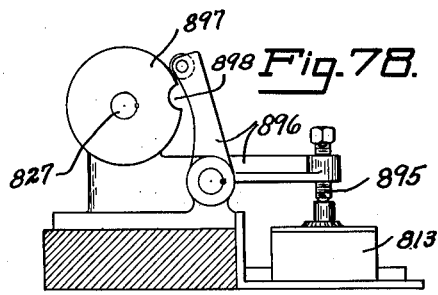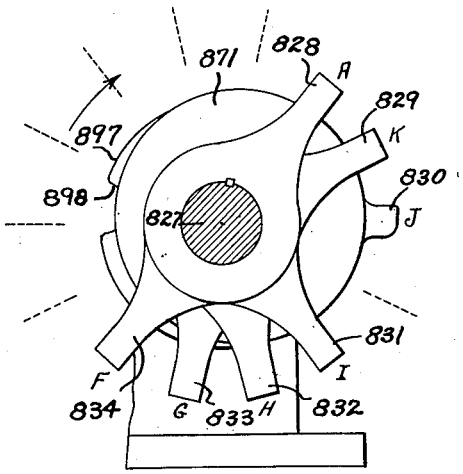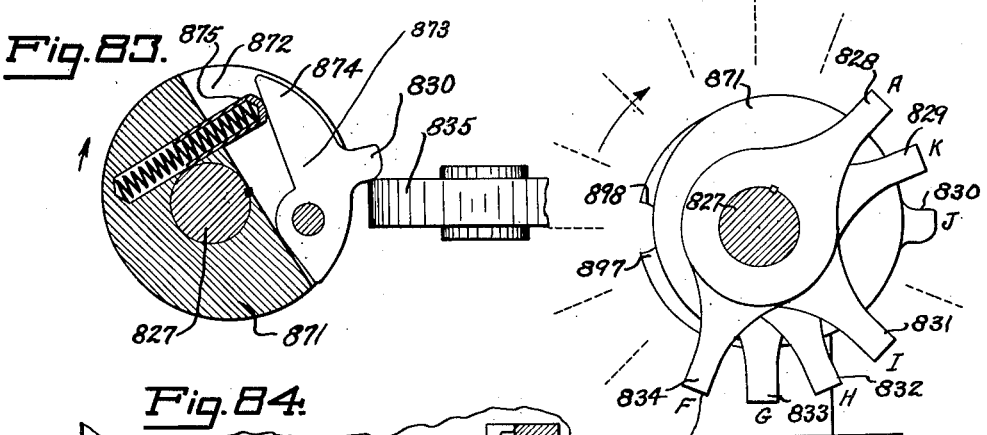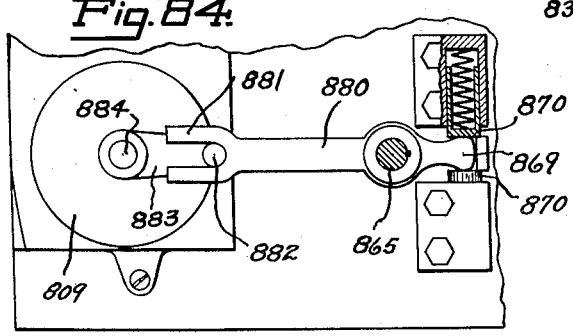

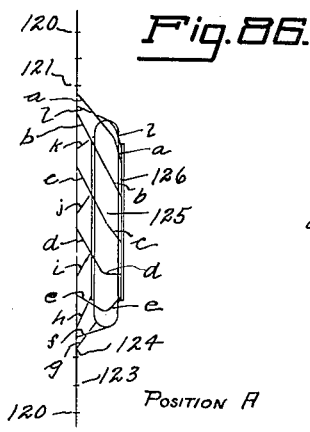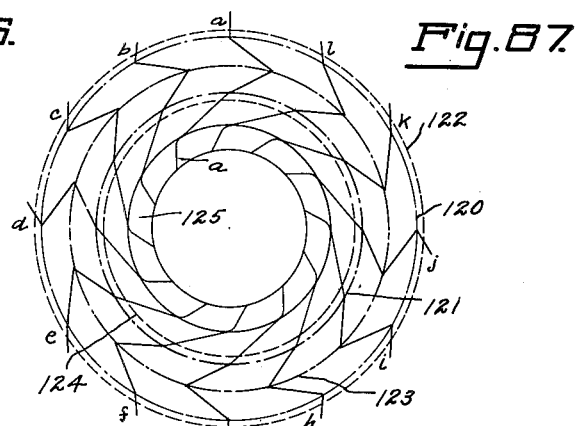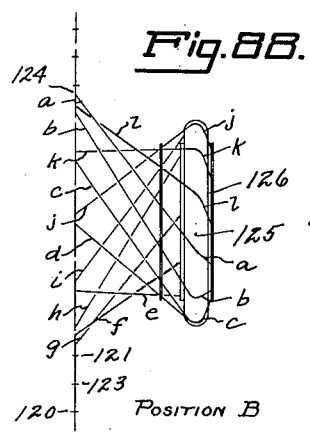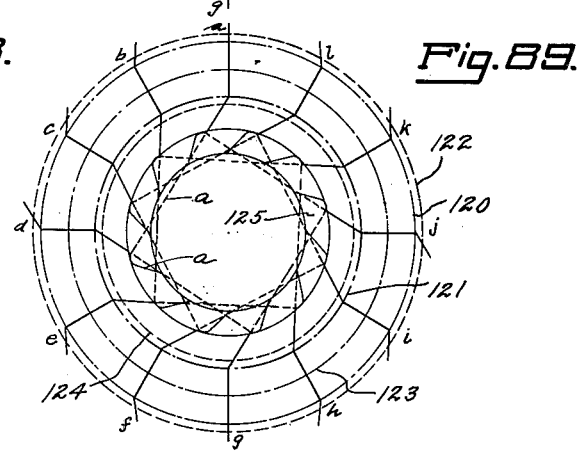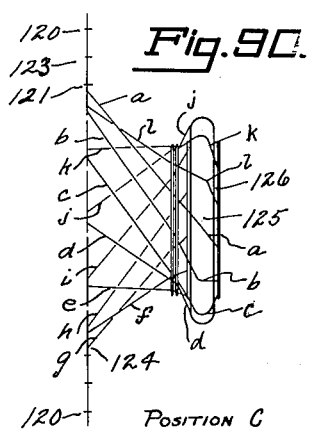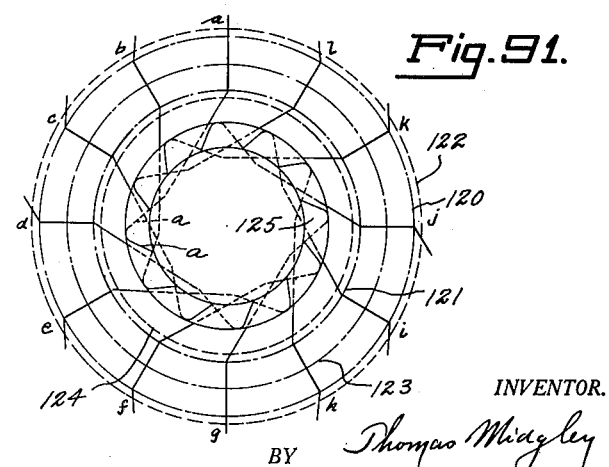

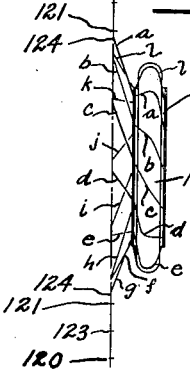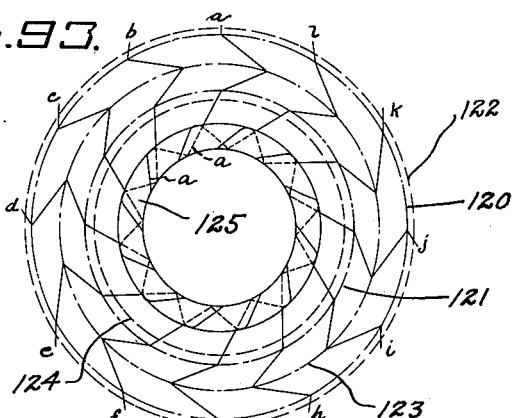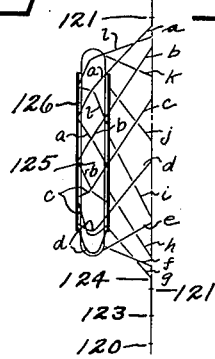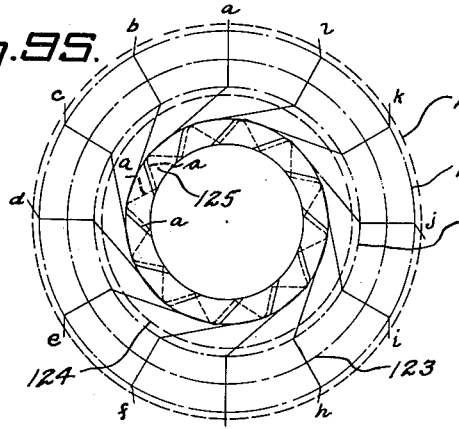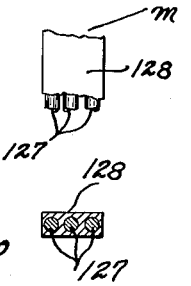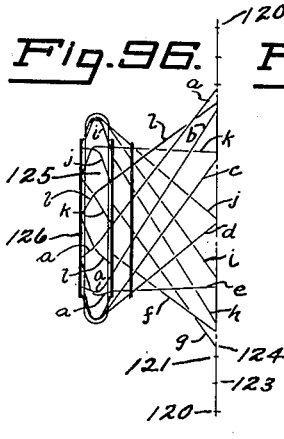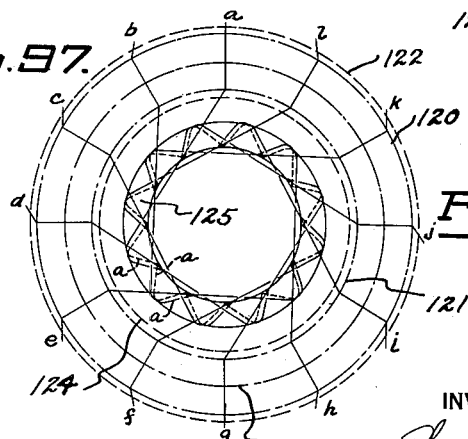

Oct. 19, 1926.
T. MIDGLEY
1,603,860
CORD TIRE BUILDING
Filed March 27, 1924     28 Sheets-Sheet 27
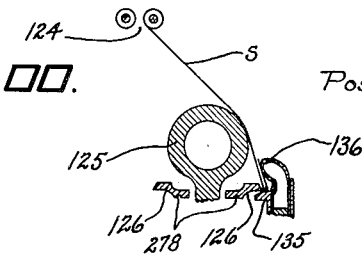
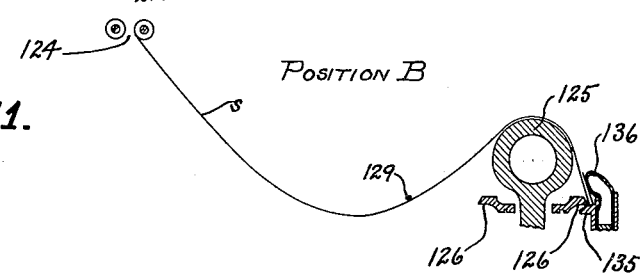
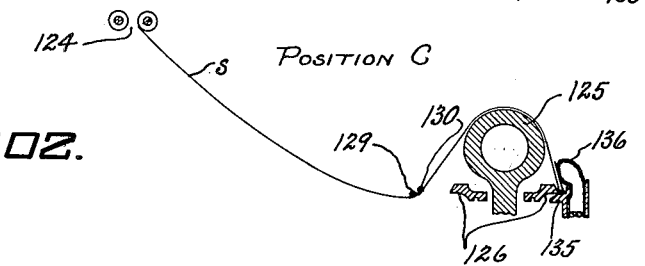
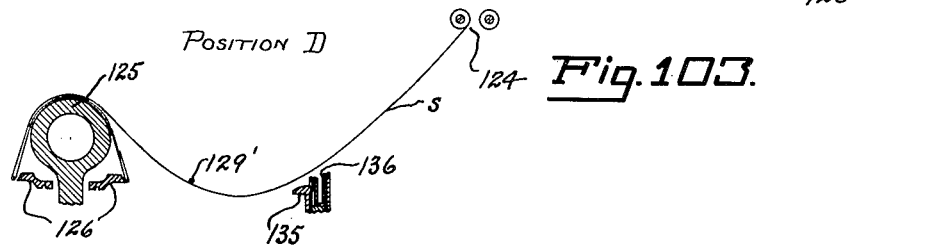
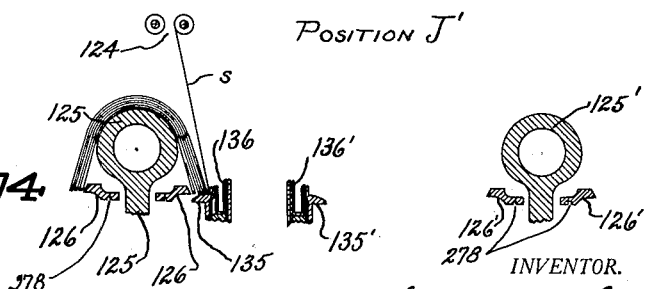

Oct. 19, 1926.

T. MIDGLEY 1,603,860

CORD TIRE BUILDING

Filed March 27, 1924   28 Sheets-Sheet 28

INVENTOR.
BY Thomas Midgley
Edward C. Taylor
ATTORNEY.

Patented Oct. 19, 1926.

1,603,860

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

CORD-TIRE BUILDING.

Application filed March 27, 1924. Serial No. 702,248.

The present invention relates to machines and methods for building cord tires. It has for one object the provision of a machine which will quickly and accurately construct the carcass portions of automobile tire casings out of a circumferential series of building strands or cords. It has for a more specific object the improvement of machines of the type described in my prior application Serial No. 547,081, filed March 27, 1922, particularly in the ease and certainty of control, the manner of supplying and tensioning the cords, and in numerous other mechanical improvements and subcombinations which will fully appear from the following description. It has for a further object the improvement of the building methods described in said application and in my prior application Serial No. 448,891, filed March 1, 1921, particularly with regard to supplying the cords and preserving them at all times during the building operation in taut condition.

For convenience in restricting the description to one preferred form, the machine will be described as building a tire carcass from reverse folds of flat cord strands upon a circular tire building core or former of the usual toric shape and collapsible construction. Changes in the form of the building support, as for example to a flat or pulley band shape, or in the type of cord used do not affect the broader features of the invention. Furthermore, I realize that in a machine of this complexity many of the mechanical means could be redesigned with a quite different structure and arrangement without departing from the essential conceptions herein disclosed, and I do not therefore limit myself to mechanical details except as specifically pointed out in the claims.

The invention will now be described in connection with the accompanying drawings, in which—

Fig. 3 is a plan view thereof, certain flooring and overhead supporting frames being broken away;

Fig. 4 is a section on line 4—4 of Fig. 2, the right hand core and supporting mechanism being removed;

Fig. 5 is an elevation, partly in longitudinal median section, of that core turret shown at the right in Fig. 2;

Fig. 6 is a section on line 6—6 of Fig. 5;

Fig. 7 is a side elevation of a clutch mechanism shown in Fig. 6;

Fig. 8 is a section on line 8—8 of Fig. 7;

Fig. 9 is a sectional detail, taken on line 9—9 of Fig. 10, showing two core supports associated in position for transfer of the building operation from one core to the other;

Fig. 10 is a section on line 10—10 of Fig. 9;

Fig. 11 is a detail section, on an enlarged scale, of parts shown in Fig. 9;

Fig. 12 is a side elevation, looking from the left and partly broken away, of parts shown in Fig. 11;

Fig. 13 is a top plan view, progressively broken away, of Fig. 12;

Fig. 14 is a detail of a locking pin;

Fig. 15 is a right end elevation thereof;

Fig. 16 is a section corresponding to Fig. 9 of the left hand core support shown in that figure, certain parts being shown in a different operative position;

Fig. 17 is a detail section of a core locking pin taken on line 17—17 of Fig. 18;

Fig. 18 is a section on line 18—18 of Fig. 17, certain of the parts appearing in different positions of rotation in Fig. 10;

Fig. 19 is a section on line 19—19 of Fig. 16;

Fig. 20 is a section on line 20—20 of Fig. 17;

Fig. 21 is a detail showing separately certain parts appearing in Fig. 9;

Fig. 22 is a sectional detail showing a modification of a part appearing in Fig. 11;

Fig. 23 is an enlarged detail section of a cam roll disk shown in Fig. 6;

Fig. 24 is a side elevation thereof, showing a modified arrangement of cam rolls;

Fig. 25 is a development of a core rotating cam;

Fig. 30 is a diagrammatic perspective, showing the passage of the cords through the guiding and take-up devices;

Fig. 31 is a section on line 31—31 of Fig. 2;

Fig. 32 is a section on line 32—32 of Fig. 4;

Fig. 33 is a section on line 33—33 of Fig. 4;

Fig. 34 is a section on line 34—34 of Fig. 4;

Fig. 35 is a section on line 35—35 of Fig. 31;

Fig. 36 is a perspective detail of the control for the cord feed motor;

Fig. 37 is a similar view showing the parts in a different operative position;

Fig. 38 is a detail of the end connection of one of the constricting wires;

Fig. 39 is a section on line 39—39 of Fig. 38;

Fig. 40 is a detail showing the construction of an anti-friction circumferential cord guide;

Fig. 41 is a diagrammatic view of one of the constricting wires in inactive position;

Fig. 42 is a similar view of the wire in its active position;

Fig. 43 is a section taken on a portion of line 4—4 of Fig. 2, showing on an enlarged scale certain mechanism appearing in Fig. 4;

Fig. 44 is a rear view of certain mechanism partially visible in Fig. 43;

Fig. 45 is a section on line 45—45 of Fig. 44;

Fig. 46 is a section on line 46—46 of Fig. 43;

Fig. 47 is a section on line 47—47 of Fig. 43, taken on a larger scale than Fig. 46;

Fig. 48 is a section on lines 48—48 of Figs. 43 and 57;

Fig. 49 is a section on line 49—49 of Fig. 43;

Fig. 50 is a fragmentary view of the parts shown in Fig. 43, some of the parts being removed to show the cord guiding devices;

Fig. 51 is a detail corresponding to a portion of Fig. 50, certain parts being shown in a different operative position;

Fig. 52 is a view corresponding to Fig. 43 on a reduced scale, showing the parts partially disassembled;

Fig. 53 is a detail of one of the rollers forming the circumferential anti-friction cord guide shown also in Fig. 40;

Fig. 54 is a section of the central cord guiding means taken on line 54—54 of Fig. 43;

Fig. 55 is a detail of the operating means for the cord clamping device;

Fig. 56 is a developed bottom view of Fig. 55, taken on line 56—56;

Fig. 57 is a section on line 57—57 of Fig. 48;

Fig. 58 is a section on line 58—58 of Fig. 48;

Fig. 59 is a detail elevation of the cord locking cam shown at the right in Fig. 2;

Fig. 78 is a detail of a signal light operating switch taken on line 78—78 of Fig. 68;

Fig. 79 is a diagrammatic plan of a reversing switch;

Fig. 80 is a section thereof on line 80—80 of Fig. 79;

Fig. 81 is a view of the transfer stop cams for a six-ply tire as they appear from line 81—81 of Fig. 67;

Fig. 82 is a similar view showing the cams arranged for an eight-ply tire;

Fig. 83 is a detail of one of the transfer stop cams, taken on line 83—83 of Fig. 68;

Fig. 84 is a detail taken on line 84—84 of Fig. 68, partly broken away;

Fig. 86 is a diagrammatic side elevation of a tire building core and the circumferential cord guides, the core being shown as if carried by that turret at the left in Fig. 2, and in the position relative to the guides hereinafter designated as A;

Fig. 87 is a diagrammatic view from the right in Fig. 86;

Figs. 88 and 89 are similar views, showing the core at the end of the first ply-laying stroke, hereinafter referred to as position B;

Figs. 90 and 91 are similar views, showing the core at a stop position hereafter referred to as position C, and also showing the application of a bead anchorage;

Figs. 92 and 93 are similar views, showing the core at an intermediate position in the laying of the second ply;

Figs. 94 and 95 are similar views of a still later intermediate position;

Figs. 96 and 97 are similar views showing a position hereinafter referred to as position D, corresponding to position B but at the opposite end of the stroke;

Fig. 98 is a fragmentary plan, partly broken away, of one type of cord member;

Fig. 99 is a section thereof;

Fig. 100 is a view showing the core and its associated mechanism in the position of Fig. 86, the cords being indicated by a single line indicative of the surface bounded by all the cords rather than any individual cord;

Fig. 101 is a similar view with the core in the position of Fig. 88;

Fig. 102 is a similar view with the core in the position of Fig. 90;

Fig. 103 is a similar view with the core in the position of Fig. 96; and

Figure 2:
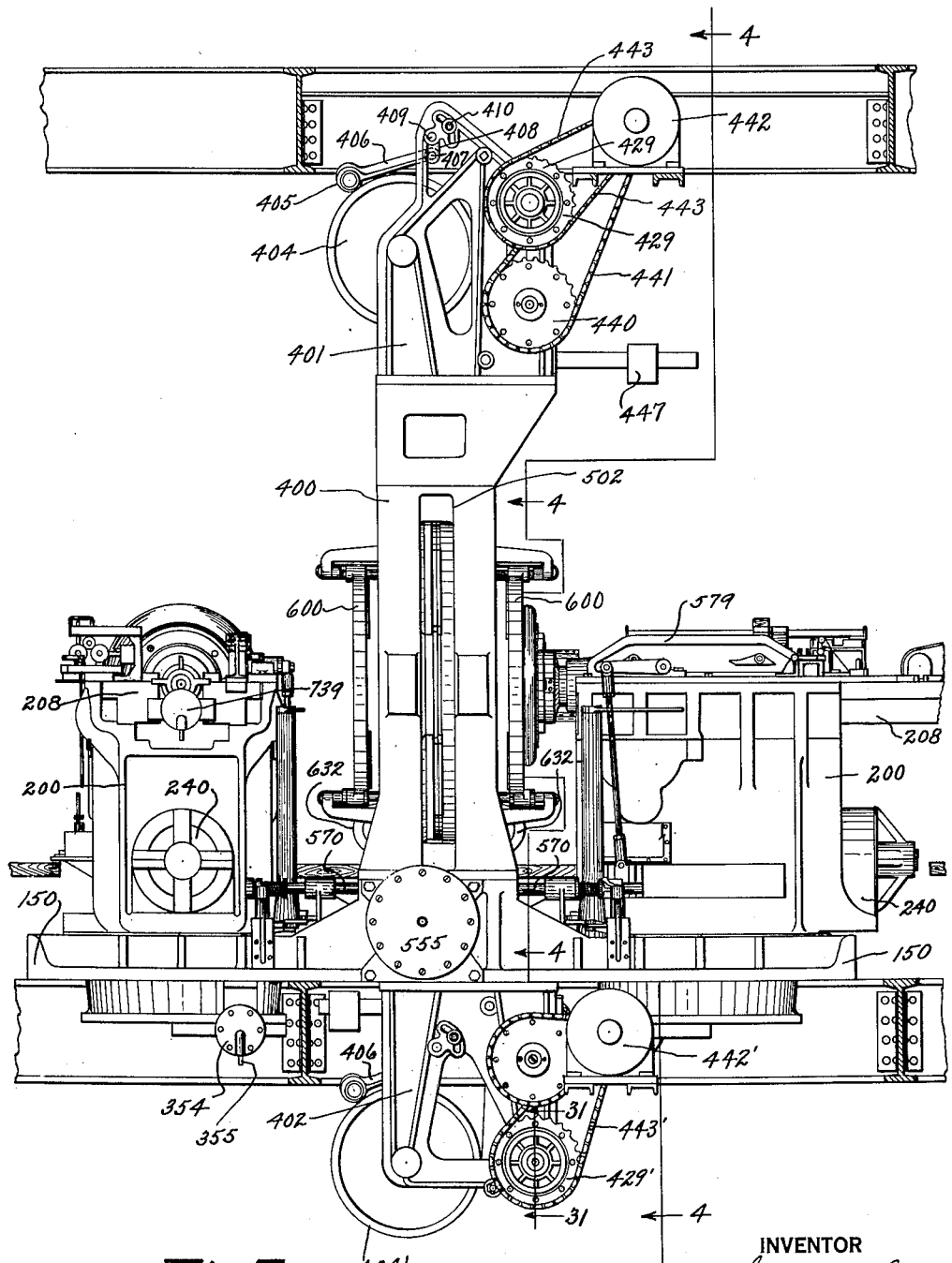
Fig. 2 is a side elevation of the machine.
Figures 26, 27:
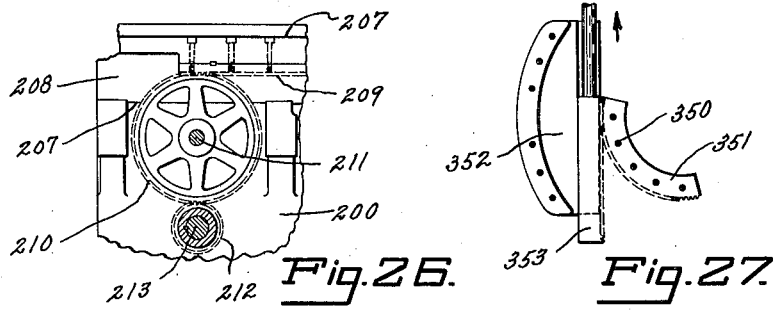
Fig. 26 is a section on line 26—26 of Fig. 6.
Fig. 27 is a section on line 27—27 of Fig. 5.

Figs. 104 to 109 inclusive are similar views showing successive positions of the two cores and associated mechanisms during the transfer from the building of a tire on the left hand turret (as viewed in Fig. 2) to the building of a tire on the right hand turret.

*Method of building carcasses (Figs. 86 to 99. Reference characters 100–199).*

The general method of incorporating the cords into the carcass of the tire used in the present machine is substantially that described in my prior applications Serial Nos. 448,891 and 547,081, filed March 1, 1921, and March 27, 1922, respectively. Aside from the improvements in the apparatus by which the tire is built, which will be described below, the present invention involves a change in the method of keeping the cords taut during the building operations. According to the manner of handling the cords in the prior applications referred to, the circumferential series of cords were led in converging relation through a guiding circumference to a circular tire building support such as a convex ring core. This ring core was passed back and forth through the guiding circumference (or, what is the same thing, the latter passed back and forth over the core), and the series of cords restricted by an annular anchorage to the bead diameter alternately on one side and the other of the core, so that a plurality of superposed plies of cords were laid in reverse folds upon the support. In order to permit of this restriction or anchoring being carried out with facility the cords were drawn further to the side of the support than was necessary merely for the supplying of sufficient cord to form the successive layers, so that an excess length of cord was drawn out through the circumference during the laying of each ply which needed to be taken up in order to prevent slackness in the cords. In the method of handling the cords in the prior cases cited this was accomplished by rewinding the cords on the spools upon which they were supplied.

By the present invention the necessity for rewinding the cords on their supplying spools is avoided, and more uniform and accurate control of the tension on the cords in all portions of the building cycle is obtained. According to this method the cords drawn from their supply spools, as required by the movement of the core, are received and guided in proper spaced relation at a circumference 120 concentric with and larger than the main guiding circumference 121. At or near the circumference 120 is a circumference 122, at which place is provided means for clamping the entire series of cords against movement. Between the circumferences 120 and 121 is a circumferentially shiftable guide 123 by which the cords may be deflected so as to increase their length of path. The effect of the rotation will be apparent from a comparison of Figs. 87 and 89. The circumference 124 indicated in the drawings represents a guide supplementary to the spacing guide 121 and acting to support the cords as they are carried to one side or the other of the central guiding plane (compare Figs. 92 and 94).

The method of handling the cords may now be considered in more detail. As in the prior applications referred to a circumferential series of twelve cords, lettered from *a* to *l*, have been chosen for illustration, although in practice a circumferentially complete series is preferably employed. As a building support on which the tire may be constructed an annular ring core 125 of convex cross section has been shown, having flanges 126 against which the bead portions of the casing may be positioned. The consideration of the building cycle may conveniently be started with the core and guides in the position of Fig. 86, in which the cords extend from the guides 121 and 124 in an inwardly converging series and are attached to the core adjacent the bead flanges 126, curving slightly over the crest of the core. Relative reciprocation and rotation are now caused between the core and guides, for convenience considered as if supplied by the core alone, so as to displace the core towards the right in Fig. 86 towards the position of Fig. 88 and to rotate it as on a right handed helix, thereby drawing the cords diagonally across the core and to one side thereof as is fully explained in the prior applications referred to.

When the core and guide are in the position of Fig. 86 the cords are deflected at circumference 123 so that their path is increased, as shown in Fig. 87, for a purpose which will appear below. In the first part of the motion from the position of Fig. 86 to that of Fig. 88 the cords are permitted to straighten out, so that the cord lengths required by the motion of the core will be supplied by the straightening out of the deflected cords between circumferences 120 and 121, the cords remaining clamped at circumference 122 during this period. As soon as the cords are straightened out between these circumferences they are unclamped, and further movement of the core toward the position of Fig. 88 draws the required cord lengths from the supply. At the end of the stroke of the core the cords are again clamped at circumference 122 preparatory to the core starting upon its backward movement.

As in my former case Serial No. 547,081, the series of cords are preferably constricted near the bead flanges 126, as by a contractile circular structure, while the core is at its outermost position, and the core given a slight reverse motion while the cords are under this constricting tendency. This action, which draws the series of cords to a small enough circumference to permit of the application of a bead anchorage, is illustrated by the difference between Figs. 88 and 90. At the position of Fig. 90 the core is stopped, and the bead anchorage, preferably formed as an encircling wire hoop, applied. Before releasing the constricting force a yielding force is applied at circumference 123 tending to deflect the cords again individually from their straight line paths. There will be a tendency to slackness in the cords as the constricting force is removed, and the yielding deflecting force prevents the actual formation of slack, taking up the excess length of cord as soon as it is liberated. The cords remain clamped at circumference 122 as the core passes through the plane of the guides, and with continued motion of the core the cycle above described is repeated.

In the above discussion the rotation of the core has been ignored. This has been discussed at length in the prior applications referred to, and any extended consideration of this feature of the building method would be unnecessary in this case. The method as generally practiced is intended for the production of tire carcasses in which the cords cross the carcass at an angle and cross the cords in adjacent piles. In carrying out this method the core is rotated simultaneously with its reciprocation, each point on its periphery moving on what is substantially a helix. This draws the series of cords across the core and to one side thereof in a surface the nature of which is indicated only roughly by the twelve cords in Fig. 88, but which has been fully described in the prior applications referred to above. As the core recedes from its position of Fig. 88 it rotates in a reverse direction in order not to shift the cord angles, stopping in rotation as it stops axial movement in the position of Fig. 90, and continuing its reverse rotation until substantially the position of Fig. 92 has been reached. At about this point the core again starts rotating in its original direction and repeats during the laying of the succeeding ply the cycle just passed through.

The cords used in the process (indicated by $m$ except where the individual cords are referred to in the diagrams Figs. 86 to 97) may be round or flat, and of any desired character, but it is preferred for convenience to use substantially flat bands or cords such as illustrated in Figs. 98 and 99. Each of these cords comprises a plurality of strands 127, conveniently three in number and formed of the usual cord material known to the tire industry in the form of cord fabric. Surrounding these strands is a matrix of rubber 128, preferably of sufficient volume to flow into the interstices between the cords when the tire is being vulcanized. A convenient way of preparing these strands is by severing them from a web of rubberized cord fabric, preferably formed without weft threads and held together only by the rubber matrix.

*Stop positions (Figs. 85 and 100 to 109).*

Figure 85:
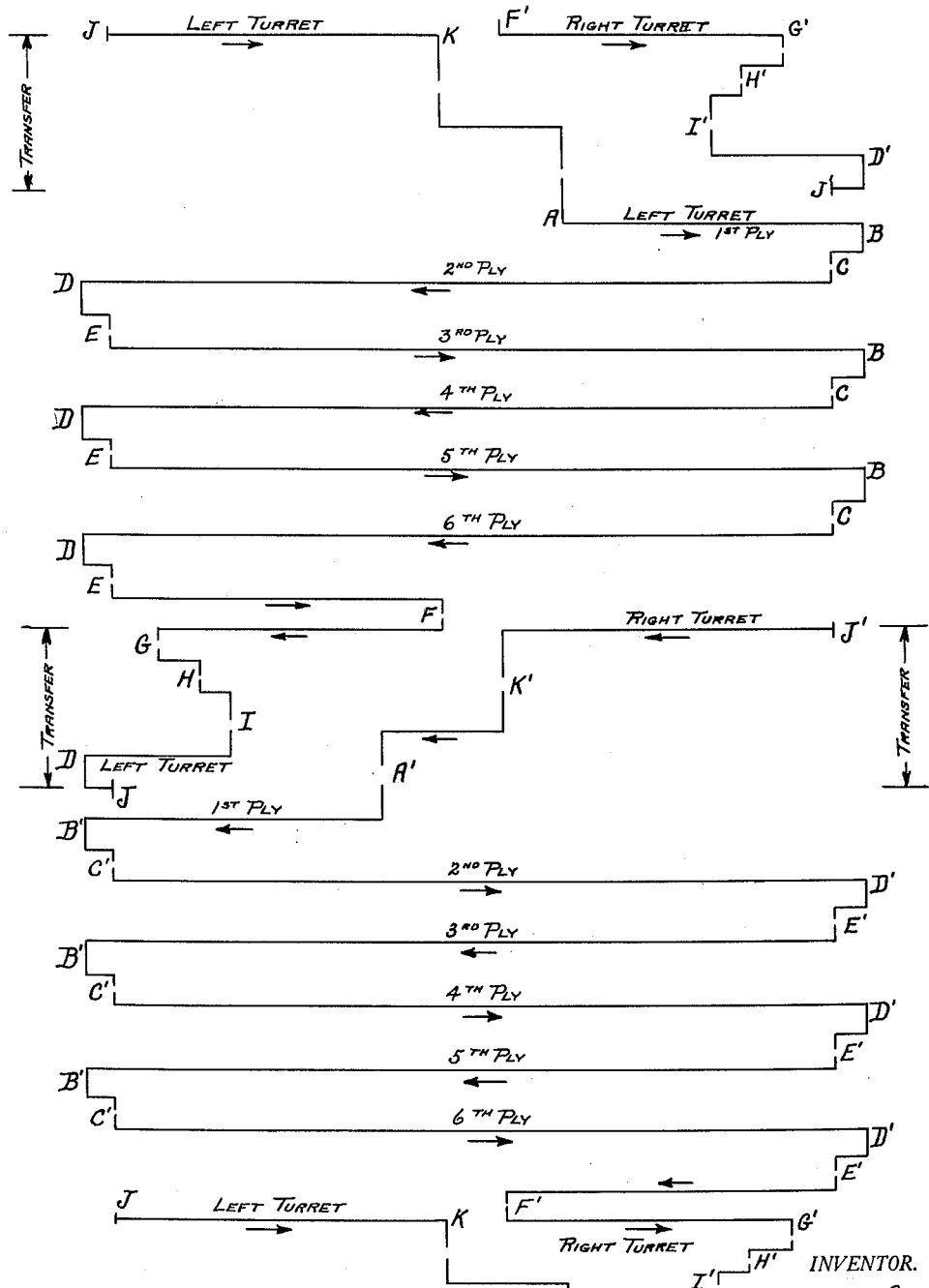
Fig. 85 is a diagram illustrating the motion of the cores on the two turrets during a complete cycle of operation.
Figure 105:
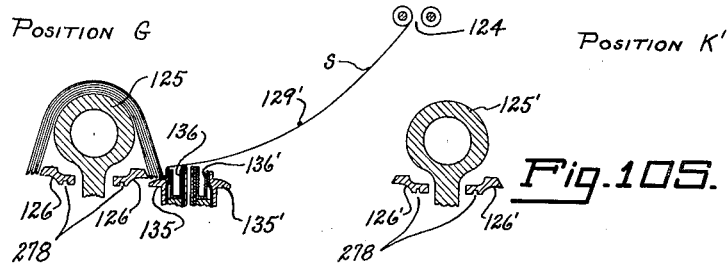

The relative coaction between the core and the guide has also been shown in Figs. 100 to 109, in which the cords are illustrated as a unit surface $s$ rather than as separate cords. This manner of illustration is justified by the action of a circumferentially complete series of cords, as fully explained in my prior applications referred to above, and gives a somewhat clearer idea of the relation of the cords to the mechanism than is obtained by the showing of separate cords as in Figs. 86 to 97. Figs. 100 to 109 are intended to show mainly the various important positions of the core relative to the cord guide such as positions where stoppage or reversal occurs, during the building of a tire on one core and the transfer of the building operation to a second core. In Fig. 85 these positions are also diagrammatically shown.

In Fig. 100 the core is shown in what will be termed position A. This position is also indicated on Fig. 85, and is the position in which the core is left after the transfer operation has been completed. Fig. 101 shows the core having reached the end of its stroke farthest from its supporting turret. This is indicated as position B, the position of Fig. 88, in which the reversing mechanism later to be described causes the core to reverse its direction of travel. At approximately this point, as indicated in Fig. 101, the constricting wires 129 are caused to grip the cords, so that in the passage of the core from position B to position C (Fig. 102) the cords will be drawn in towards the axis of the core. While the core is stopped in position C the bead anchorage 130 is applied by the operator. Motion of the core is then resumed, it passing through the central guide to position D, similar but opposite to position B. A position E, similar but opposite to position C, is indicated in Fig. 85, but is not shown in the other views. Successive reciprocations of the core in opposite directions through the central guide are continued until the desired number of carcass plies are laid (six as illustrated in Fig. 85) and the operation of transferring the building from one core to another is started.

*Method of transferring cords (Figs. 85 and 100 to 109).*

The general principles underlying this transfer are described fully in my said application Serial No. 547,081, and also in my application Serial No. 519,583, filed December 3, 1921, and the present invention differs therefrom in this particular mainly in providing automatic stop positions at various times during the operation. The following description will therefore refer to these stop positions, the mechanism for causing the stoppages being later described.

The core 125 on the left hand turret (viewed as in Fig. 2) is shown in Fig. 104 as having six carcass plies laid thereon and being ready for the transfer of the circumferential sheath of cords to the core 125' carried by the right hand turret. Associated with core 125 is a clamping ring 135 which presses the anchored ply edges against the building flange 126. In the mechanical structure hereinafter to be described this ring is pressed against the tire edge (Figs. 100 and 104) or held remote from the tire (Fig. 103) as desired by a pneumatic cylinder. A similar ring 135' is associated with the right hand core. As the cores are located in Fig. 104, with the left hand core in a stop position F and the right hand core in a stop position J', the ring 135 is in clamping engagement with its tire, while ring 135' is extended from the core.

Both cores are now moved by their respective mechanisms to positions G and K', which draws the cords out so that they extend in a slanting surface from the bead circumference of the left hand core to the circular cord guide, and also positions the clamping ring 135' with its associated parts in juxtaposition to the parts carried by clamping ring 135. Each of these clamping rings carries in a recessed holder an annular inflatable bag 136, 136', the purpose of which will appear later and which is uninflated in the positions at present being considered. The constricting means 129' (similar but located at the opposite side of the central annular guide from 129) is then caused to grasp the series of cords and the left hand core 125 caused to move to the right into stop position H. The right hand core remains stationary during this period, but its clamping ring 135' is pushed closer to it by the ring 135. By the time position H is reached the cord series is constricted close enough to the axis of the core by the constricting means 129' to permit of the application of a bead anchorage 130, which is to be the initial anchorage of the tire to be built on core 125'. The constricting means are now removed (the formation of slack being prevented by the shifting of circumference 123 and a consequent drawing back of the cords through circumference 124) and core 125 moved further to the right into position I in order to draw the anchorage 130 onto the ledge of clamping ring 135'. Core 125' is now moved to the left into position A', in which the clamping ring 135' holds the newly applied anchorage with the cords folded around it firmly against the adjacent building flange 126'.

Figure 108:
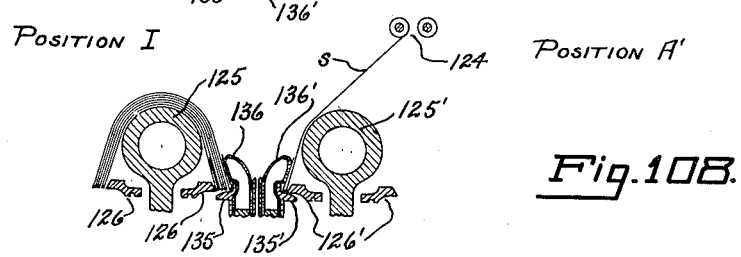
Figure 109:
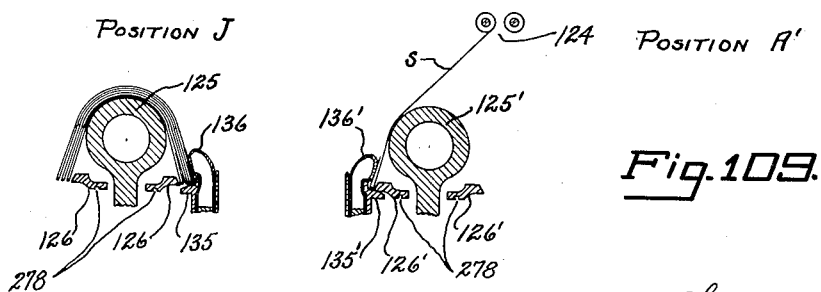

This leaves the cord sheath anchored firmly in the beads of both the completed carcass and the new carcass to be built, the cords extending from core 125' to the central guide. The cords are now severed between the clamping rings, either by hand or by the mechanically operated knife to be described, and the bags 136 and 136' inflated (Fig. 108). This turns the cut ends of the cords back against the sides of the carcasses. Core 125 is now backed off to position J (Fig. 109), and its turret is rotated on a vertical axis 90° to permit of the ready removal of the built-up carcass and to avoid interference with the passage of the core 125' through the cord guide. Core 125' is now in a position (A') corresponding to the position A in which core 125 was shown in Fig. 100. During the laying and anchoring of the first ply (shown in Figs. 100, 101, and 102 for core 125) the clamping ring 135 is left in position to grip the bead anchorage, and bag 136 is left inflated, so as to prevent the tension of the cords pulling the cords around the anchorage. The bag is then deflated, the clamping ring backed off to the position of Fig. 103, and the building of a tire continued.

*General description of machine (Figs. 1, 2, and 3).*

The mechanism about to be described is grouped around a central guide which supplies the cords in a circumferential sheath, and carries devices for supplying the cords and keeping them taut during the entire building operation. On opposite sides of the plane of this guide are supports, called turrets for convenience, each of which carries a tire building core or support. The turrets may be swung by power independently through an arc of 90° to place the core in a convenient position for removal, and are each provided with mechanism for propelling its core back and forth with a twisting motion through the central guide. The central guide supports on either side a device arranged to constrict the cords towards the axis of the core sufficiently to permit of the application of a bead anchorage, each device being shiftable by power into either of two operative positions. Apparatus associated with each core for service during the transfer of the building operation from one core to another is also provided and one turret is provided with mechanism for cutting the series of cords between the cores after the transfer is otherwise complete. Finally there are control devices associated with each turret which cause the cores to stop at predetermined periods in their cycle, and other devices for controlling the remaining power operated mechanism. The first unit to be considered will be the turrets and the core supporting mechanism.

*Core supporting and reciprocating mechanism (Figs. 1, 2, 3, 5-9, 14-20, 26 and 29. Reference characters 200-299).*

The two building supports or cores are carried on independently operable turrets, each supported rotatably in the main foundation frame 150. The two turrets are similar, except that one only carries a drive for operating a cord cutting knife, and with this explanation a description of one will suffice for both. Each turret frame or standard 200 is carried on a base 201 (Figs. 5 and 6) freely rotatable in a large bearing 202 extending through an opening 203 in the foundation frame 150 and attached to it as by bolts 204. The bearing has a substantially cylindrical portion machined to provide rotative bearing for the base, while suitable anti-friction material 205 on the top of the bearing bears the weight of the turret through a flange 206 on the base. The turret is thus supported so that it may be rotated freely about a center fixed with relation to the foundation frame. This rotation is permitted to enable a built-up tire on one turret to be removed without interference with the building operations being performed on the core on the other turret, the first turret being rotated into a position at right angles to the axis of the core when in normal operation. Suitable mechanism is provided for rotating the turret by power and for locking it in its operative positions, although a description of these mechanisms is best left for consideration later.

The upper portion of the turret is formed with ways 207 in which moves a core supporting slide 208, having suitable bearing surfaces for permitting easy reciprocating movement. At each side of this slide is a rack 209 (Figs. 6 and 26) meshing with idler gears 210 mounted on shafts 211 and meshing with pinions 212 on a cross shaft 213. Secured to this shaft by a key 214 (Figs. 5 and 7) is one member 215 of a clutch, shown in this instance as of the multiple disk type. Slots 216 (Fig. 7) on this member hold against relative rotation one set of clutch plates 217 (Fig. 8); the other set 218 being slidable on bolts 219 connecting a plate 220 and a clutch member 221 freely rotatable on member 215, and being held by the intermeshing of lugs 222 (Fig. 7) on the plates with slotted ears 223 on an overhanging part of clutch member 221. The bolts are headed at both ends, and at their ends adjacent member 221 have washers 224 (Fig. 8) between which and the clutch member springs 225 are mounted under compression. Clutch operating levers 226 are pivoted at 227 to member 221 and are forked at 228 to straddle the head of the bolts and bear on washers 224. The inner ends of these levers are curved so as to rest on the conical end surface of a sleeve 229 slidable on a hub portion of member 221 to operate the levers in unison. A ring 230 fits in a groove in the sleeve and is attached at 231 to oppositely disposed links 232 carried by rocking arms 233. These arms are fixed to a shaft 234 pivoted in the turret frame and having at one end a treadle lever 235 (Figs. 5, 6, and 29) by which the clutch mechanism may be worked. By pressing down on the treadle the parts will be moved into the position of Fig. 8, in which the clutch is in its disconnected condition. The outer surface of the clutch member 221 is formed as a worm gear 236 meshing with a worm 237 (Figs. 5, 6, and 7) on a shaft 238 suitably journaled in bushings 239 bolted to the turret frame. A motor 240 is connected to the shaft 238 through a universal joint or alignment coupling 241 of any desired type.

This motor is controlled for operation in either direction by electrical control devices operated by hand or automatically to give the reciprocating movements and stop positions desired as will more fully appear below. The clutch described above is used for disconnecting the motor drive so as to "ease" the drive on one of the cores when the two cores are brought into contact as indicated in Fig. 108.

The slide 208, which is reciprocated by the mechanism described, carries a sleeve 242 rotatably mounted therein, and shouldered at 243 (Fig. 16) on one end to removably and rotatively receive a core supporting head 244, illustrated in Figs. 16 to 20. A plate 245, bolted at 246 to the sleeve, keeps the head in position thereon, but permits of rotation if desired. To secure the head to the sleeve during the normal operation of the machine a lock mechanism is provided. To the outer surface of the shouldered part of the sleeve are screwed a series of latch blocks 247 (Figs. 16 and 19), preferably four in number and evenly spaced around the circumference. Each block has a slot 248 into which a projection 249 on a slide 250 is adapted to fit. This slide works in a guideway 251 in the core head and has a slot 252 (Fig. 19) in which is located a pin 253 eccentrically mounted on a rotatable member 254 (Fig. 16) journaled in the head. A squared hole 255 in the end of this member serves for the reception of any suitable wrench. By this means the member 254 can be rotated to move the slide 250 so that its locking projection 249 enters or leaves the slot in one of the latch blocks. When this locking mechanism is fast the core head, and consequently the core mounted thereon, will be held to the sleeve 242 for any reciprocative and rotative movements which may be given to it.

In operating a machine of this type under commercial conditions it is often desirable to change the size of tire being built. If all tires had the same inside diameter this could be handled easily, but on account of variations in this regard the core head in the present case is fitted with core holding mechanism made readily interchangeable for different core sizes. The core is received upon a shouldered ring 256 removably fitted upon the core head with a key 257 (Fig. 18). This ring and the core head are drilled to receive a series of pins 258 (Figs. 17 and 18) keyed at 259 (Fig. 17) to prevent rotation. At its inner end each pin is bolted at 260 to a cam roll 261, running in a cam slot 262 (Fig. 18) in a ring 263 held rotatively in place on the core head by an annular plate 264 (Fig. 17). A portion of the outer surface of the ring 263 is formed with gear teeth 265 (Fig. 18) meshing with a pinion 266 suitably mounted in the core head and having a squared hole 267 whereby it may be rotated by a suitable wrench. As the pinion 266 is rotated the cam ring 263 will be turned, causing the series of pins 258 to be simultaneously projected or retracted, so as to engage or release the core.

The outer end of each pin 258 is shaped to fit into a groove 268 (Figs. 16 and 18) in the inner periphery of the ring core or building support 125. In the instance shown this ring core is of substantially tire shape, composed of sections held together by rings 269 (Figs. 17 and 20) clamped by bolts 270. These bolts have been utilized for holding the core against rotation, one of the bolt heads fitting into a slotted block 271 mounted on the core head 244.

The devices for holding the bead positioning flanges 126 to the core are illustrated in Figs. 9, 14, and 15. Through holes through the neck portions of cores 125 pass a series of pins 275, provided on one end with a squared portion 276 and with a series of studs 277 screwed into the pins. The bead flanges have annular grooves 278 (compare Figs. 9 and 100) in their inner peripheries, into which fit the outer pair of studs 277 on each of the pins. By rotating the pins their studs may be cleared from the grooves in the rings and the rings then removed. If desired, the holes through which the pins pass may have a slot out of line with the normal position of the studs, so that by rotating the pins they can be removed from the core without disassembling the studs. The inner pair of studs bear against the core and hold the pins, and consequently the bead flanges 126, in proper centralized position relative to it.

*Core rotating mechanism (Figs. 3, 5, 6, 23, 24, 25 and 67. Reference characters 300–349).*

This completes the mechanism for holding the core on the sleeve 242. We will now retrace our steps a little and consider the mounting of the sleeve and the devices for rotating it in the desired relation to its reciprocation. The slide 208 is recessed at 300 (Fig. 5) to receive a cam roll disk 301, spaced from the edges of the recess by plates 302 of anti-friction material or by suitable thrust bearings. The slide also has cap pieces 303 and 304, held to the slide proper as by bolts 305 (Figs. 3 and 67) and abutting the plates of anti-friction material. A key 306 unites the sleeve for rotation with the cam roll disk, and a clamping piece 307, held by bolts 308, secures these two parts against relative endwise motion. The sleeve 242 is thus freely rotatable in slide 208, as impelled by the motion of cam roll disk 301, but will be constrained for reciprocation with the slide at all times.

Fixed to the turret frame 200, as by a key piece 309 (Figs. 5 and 6) is a cam 310, illustrated in developed plan in Fig. 25. This cam is of concave cylindrical form, so that cam rollers 311 on the cam roll disk may operate in it, and is composed of angular cam tracks 312 joined by switch pieces 313. Each switch piece is pivoted at 314 to the cam, has a switch point 315 projecting into the cam track, and a heel portion 316 forming a continuation of the track. A spring 317, attached to the heel 316 and to a pin 318 fixed on the cam, causes the switches to be pressed normally into the positions shown in full lines in Fig. 25.

In considering the action of this cam it should be remembered that the cam itself is stationary, and that a cam roll on disk 301 is reciprocated lengthwise of the cam by the movement of slide 208. As a roll starts in the groove at the bottom of Fig. 25 it is moved towards the right in that figure. This forces it upward (referring to its appearance in Fig. 25) which causes a rotation of the cam roll disk. The roll continues in this motion until the slide reverses its motion, at which point the roll is at the position indicated at D', corresponding to the similarly marked core position in Fig. 85. During the first part of the reversed motion of the slide the roll will retrace its steps, causing a period of retrograde rotation of the cam roll disk and consequently of the sleeve 242 carrying the core. Further movement of the slide will bring the roll to the position P where it is again started in a path inclining towards the top of Fig. 25 by contact of the adjacent cam roll P' with the switch 315. Shortly after it passes the position P it passes under the point of the switch interposed in its path, spring 317 yielding to permit this (see dotted lines in Fig. 25). As soon as the roll passes the switch point the latter snaps back to the full line position, blocking the path against the roll's return. The roll proceeds to the end of its stroke, and returns in a similar manner, being shunted up the next incline by the switch it previously passed. The path of a cam roll is indicated in dash and dot lines with arrow-heads. During a portion of the stroke two cam rolls are simultaneously in contact with the cam, as shown by P and P', thus insuring that the cam disk will be rotated in the direction desired. The rotation thereby given to the core is in one general direction with short interposed periods of rotation in the reverse direction. The purpose of these intermediate periods of retrograde movement in permitting the taking up, without change of angle, of excess lengths of cord drawn out to facilitate the laying of a bead anchorage, is fully described in my copending application Serial No. 547,081 referred to.

In the present embodiment of the machine the cam 310 has been made removable so that cams of different types, giving different cord angles, can be employed. This is accomplished by the key 309, which as shown is bolted to the turret frame at 319 (Figs. 5 and 6). By removing these bolts and the key the cam may be slid lengthwise out of the turret. The cam roll disk is designed so as to permit the use of varying numbers of cam rolls, equally spaced in each case about its circumference. If a tire were to be made of a single ply, or two plies, a single cam roll on the disk could follow all the cam track necessary for these building operations. But where a tire having a larger number of plies is used, it is desirable from purposes of economy and simplicity in the design of the cam to use a cam track sufficient in size to accommodate a single cam roll during one reciprocative cycle, and to use a series of cam rolls, each entering the cam track as the preceding one is leaving it. Thus in Fig. 25 the two cam rolls shown in each of the positions P and P' may be considered as successive positions of the same roll (which is always true), but may also be considered as simultaneous positions of two adjacent rolls of the series; the roll at the bottom of the figure in position P just entering the cam, and the roll at the top in position P' just about to leave it. It will be seen from this that as the total rotation for one forward and back reciprocation is changed by substituting a new cam, the spacing of rolls on the cam roll disk must also be varied to correspond. If the number of reciprocative cycles of the slide used in building a single tire is to be less than the number of rolls on the cam disk, the cam design and corresponding roll spacing may be varied at will, the cam rolls being reset after the completion of each tire; but if the number of cycles is greater than this, or if resetting is not desirable, the design of the cam must be chosen so that the rolls will be equally spaced around the entire surface of the cam roll disk.

In the construction shown (Figs. 6, 23, and 24) the cam roll disk has been provided with means for attaching either four, five, or six rolls. In Fig. 6 four rolls are shown, in Fig. 23 five, and in Fig. 24 six. Other spacings may be made in a similar manner. In order to facilitate the removal of cam 310 the cam roll disk is fitted so that the cam rolls may be readily removed without taking down the entire machine. To this end the cam rolls are screwed into holes 320, 321, or 322, on a segmental ring 323 attached to the disk body 242 as by screws 324. Holes 320 are used when four rolls are used, holes 321 for five rolls, and holes 322 for six rolls. As further security against shifting of the segmental ring on the disk body keys 325 are provided. The cam rolls themselves are mounted on studs 326, over which are loosely fitted caps 311 forming the cam roll surface and held rotatably in place by headed screws 327. The cam roll disk is preferably enclosed by a lubricant retaining cover 328 (Fig. 6).

*Turret rotating and locking mechanism (Figs. 5, 6, 27, 28, 29, and 66. Reference characters 350–399).*

Attached to the bottom of each turret as by bolts 350 (Figs. 5, 6, and 27) is a gear segment 351. Meshing with this segment and sliding in guideways 352 attached to bearing 202 is a rack bar 353 forming also the piston rod of a pneumatic cylinder 354 secured to the foundation frame 150. This cylinder is fitted with piping 355 for the admission of air under pressure to either end of the cylinder. Such piping has been omitted in the detail views for purposes of clearness, but is shown diagrammatically in Fig. 36. The details of construction of the air cylinder, such as the packing for piston 356, are standard for pneumatic cylinders of this type, and need not be considered in detail.

Figure 1:
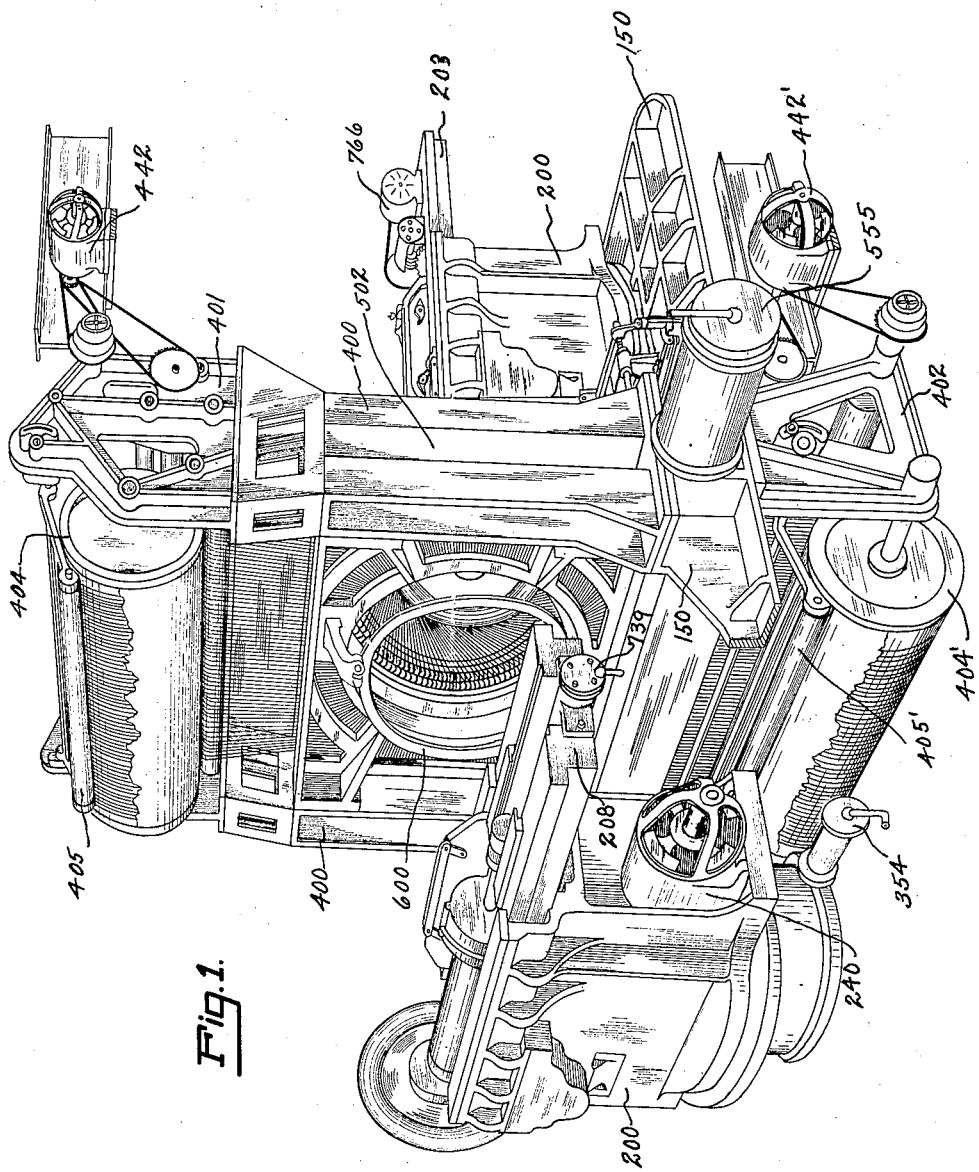
Fig. 1 is a perspective view of the assembled machine, part of the frame and other supports being broken away and the flooring being omitted.

The described mechanism serves to rotate the turrets through arcs of ninety degrees into either the inoperative position illustrated by the turret at the left of Fig. 1 or to the operative position illustrated by the turret at the right. The swinging of the turret is accomplished by air power and without any exertion on the part of the operator, who controls the position of the turret by admitting air to one end or the other of the air cylinder by the valve later described.

Figure 28:
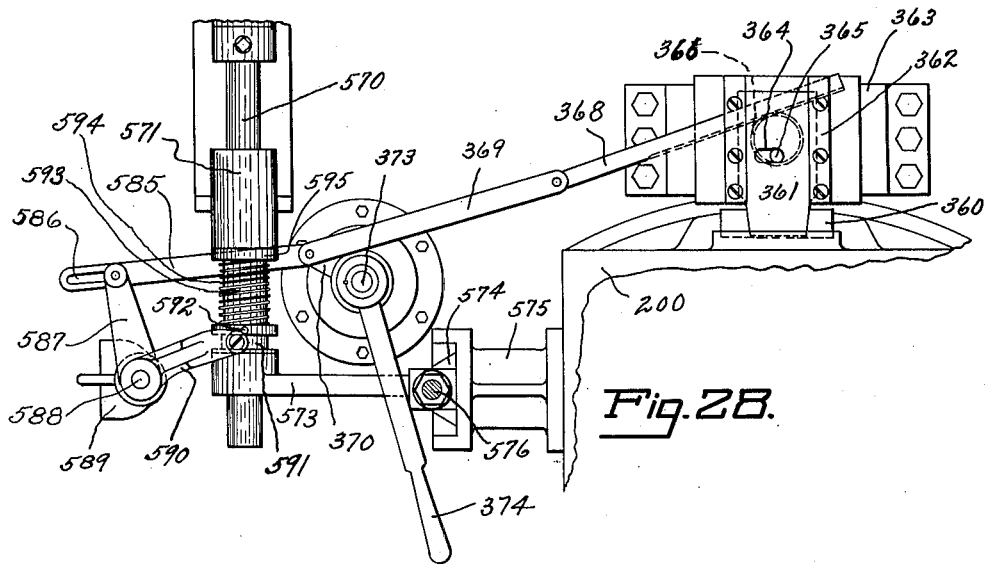
Fig. 28 is a detail plan of mechanism appearing in part in Fig. 3.
Figure 29:
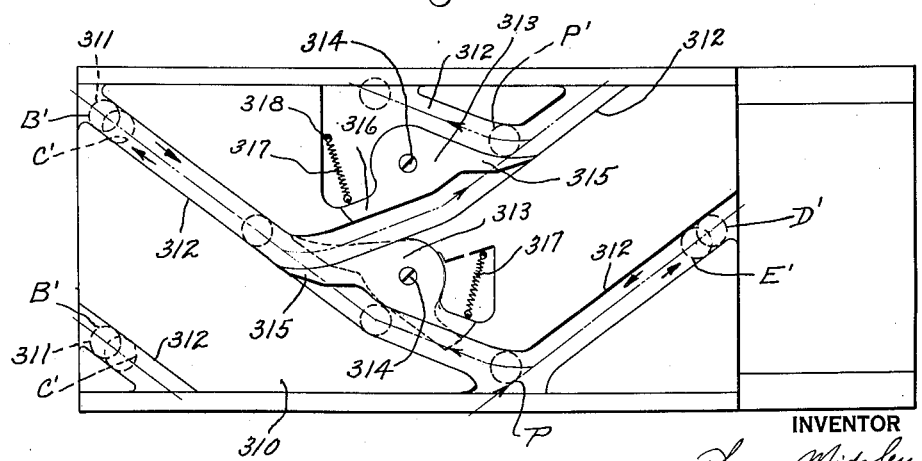
Fig. 29 is a perspective view of the turret shown in Fig. 5, certain parts being omitted.
Figure 60:
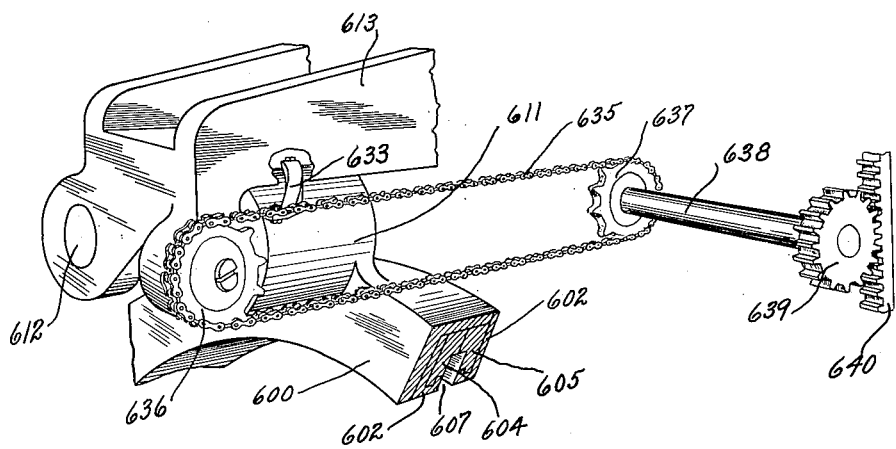
Fig. 60 is a perspective detail of one of the upper operating means for axially shifting the constricting devices.

To hold the turrets when desired in their operative positions, each one is provided with a locking mechanism illustrated in Figs. 28 and 29. Each turret frame 200 is provided with a recessed lug 360 into which the beveled end of a slide 361 is adapted to fit. This slide is mounted in ways 362 secured to a block 363 on the foundation frame so that when it is projected into engagement with the lug it will securely hold the turret against rotation. The slide has a slot 364 in which works a pin 365 eccentrically mounted on a pinion 366 carried by a stud shaft 367 (Fig. 5) journaled in the block 363. A rack bar 368, sliding in ways in block 363, meshes with the pinion. This bar is connected by a link 369 with an arm 370 projecting through an opening 371 (Fig. 29) in the bottom of a pedestal 372, and connected to a vertical shaft 373 (Figs. 6 and 28) mounted therein. By means of a handle 374 at the upper end of shaft 373 the described train of mechanism can be operated to force the slide either into or out of locking engagement with the lug. Certain other mechanism also operated by handle 374 will be referred to later.

*Cord supply (Figs. 2, 4, and 31–37. Reference characters 400–499).*

The machine is shown as provided in its preferred form with two cord supplying units, one below and one above the main portion of the mechanism. By concentrating the material supplied into two groups the groups may be made larger, and may carry a sufficient quantity of material for a great number of tires, reducing the time required for replenishment to a minimum. The cords are led from the supplying units to the circular guide through interposed clamping and tensioning devices, all of which will be described in order. In the first instance the cord supplying devices will be considered.

Upon the top of the central frame 400 which encloses the circular guide and the cord tensioning devices is mounted a frame 401 (Figs. 2 and 4) supporting the upper cord supplying unit. A similar frame 402 is attached to the bottom of the foundation frame 150, and carries the lower of the two units. In general these units are similar, and except for minor features of arrangement which will appear from the diagrammatic showing of the two units in Figs. 32 and 33, a description of one will suffice for both. The parts belonging to the lower unit are designated by primed numerals.

The cords *m* are wound between turns of a liner 403 upon a spool 404. This spool is detachably mounted in the frame 401 in a manner similar to that of the liner wind-up roll which is illustrated and described below in detail. Upon the surface of the material wound upon the stock spool rests a drag bar 405 fixed in swinging arms 406 pivoted at 407 on a bracket 408 journaled at 409 (Fig. 2) in the frame and clamped at 410. This mounting permits of the adjustment of the pivot point of the arms to vary the action of the bar on the stock spool. The bar rests on the spool by gravity, and serves to exert a constant smoothing and tensioning influence on the material.

It is necessary to wind up the lining material 403 as this is unwound from the stock spool, and as the speed with which the liner is delivered from the stock spool varies according to the amount of material on the spool, a variable speed drive is provided. The mounting and drive for the liner wind-up spool is illustrated in Fig. 31. The wind-up spool 411 has end flanges 412 through which passes a square arbor 413 projecting slightly beyond them. The ends of this arbor (one only being shown in Figs. 31 and 35) fit into rectangular sockets 414 in the enlarged ends 415 of shafts 416 journaled at 417 in the frame 401. Over the enlargements 415 slide collars 418 having projections 419 fitting into the socket 414. Each collar is provided with a set screw 420 (Fig. 35) the end of which slides in a blind keyway 421 in the enlargement 415, thus permitting the collar a limited endwise travel but preventing its removal unless the set screw is removed. When the collar is in the position of Fig. 31 projection 419 overlies the end of the arbor and holds the latter in place in the square socket thus provided for it. Accidental misplacement of the collar is prevented by a pin 422 normally pressed outwardly by a spring 423 in a hole in the enlargement 415, and standing adjacent the side of the collar when the latter is in the position of Fig. 31. A pin 424 passing through a slot in the pin prevents the latter from falling out. To shift the collar the pin 422 can be depressed by the finger, when the collar may be slid along the enlargement 415 to open one side of the socket 414. The arbor 413, with the liner spool carried by it, can now be removed for replacement. As above stated, the spools 404 and 404' carrying the cords and the liner are mounted in a similar manner.

Keyed to the end of one of shafts 416 are opposed plates 425 and 426, the first of which is adapted for a slight sliding movement on its key. Between these plates, preferably faced with leather or other friction material 427, is a disk 428 carrying a sprocket 429. A disk 430, also keyed to the shaft and spaced slightly from plate 425, carries between it and the plate a series of springs 431 (conveniently mounted on pegs 432) which exert yielding pressure between the plate and disk. A handwheel 433 is screwed onto the end of the shaft and serves to press the disk 430 towards plate 425 with an adjustable pressure. In order to clamp the handwheel in adjusted position a nut 434 is also screwed to the shaft and may be wedged towards the handwheel by a screw 435. A disk 436 on the end of the shaft prevents accidental removal of the handwheel. By the described mechanism the wind-up roll may be driven from sprocket 429 by friction, so that the speed of the roll may accommodate itself to the varying speeds with which the liner is received by it, and so that the liner may be kept taut at all times. The sprocket 429 is driven by mechanism which will be described below.

From the stock spool the cords, now separated from the liner, pass around an idler roll 437 (Fig. 32). They then pass around a friction faced roll 438 whose function is to draw the cords from the stock roll by power as required by the operation of the machine. The rotation of this roll is controlled in a manner to be described by a floating roll 439 over which the cords then pass. From this point the cords pass to the guiding and tensioning mechanism.

Over a sprocket 440 (Fig. 2) attached to one end of the friction roll 438 passes a chain 441 leading to a sprocket on the shaft of a motor 442. A similar chain 443 passes over sprocket 429 on the liner wind-up roll and also leads to a sprocket on the shaft of the motor. The motor is energized by any suitable current source controlled during the operation of the machine by the floating roll 439. As a standard form of electrical control mechanism has been used it has been shown conventionally, its operation and installation being apparent to any one familiar with electrical control devices of this sort. The device in question appears in Figs. 36 and 37. Floating roll 439 is carried by arms 445. These are pivoted at 446 to the frame 401 and carry at one end adjustable counterweights 447. At the end adjacent the roll 439 is mounted a shoe 448 having a high camlike portion which contacts in one position of the roll with the control roller 449 of an electrical-switch shown conventionally at 450. Comparing Fig. 32 with Figs. 36 and 37 it will appear that if cords be drawn downwards towards the center of the machine the floating roller will also be drawn downwards. The drawing downward of the floating roll will allow the control roller 449 to drop off the high point of the shoe 448 from the position of Fig. 36 to that of Fig. 37. The electrical connections are so arranged that this completes the energizing circuit through the motor, and draws the cords from the stock spool. When the demand by the machine for additional cord lengths ceases, the counterweight will cause the floating roll to rise in the cord slack formed by the continued operation of the motor, forcing the high part of the shoe again upon the control roller and stopping the motor. Power means for drawing the cords from the stock spool is desirable as otherwise the strain on the machine would be too great, particularly in stopping and starting, and the tension given to the cords when they were laid in the tire would be too high. The liner wind-up, which is operated from the same motor as the friction roll, operates simultaneously with the latter, but is actuated through a friction device as described so that the actual rotation of spool 411 only keeps pace with the unrolling of the liner.

The construction of the idle roll 437, which is characteristic also of the floating roll 439, is shown in fragmentary section in Fig. 34. The roll is formed of a cylindrical shell 460, provided with headers 461 between which and a supporting rod 462 are ball bearings 463. A spacing collar 464 holds the bearing in position, and a disk 465 carries a packing 466 serving to retain lubricant in the bearing.

*Cord guiding and tensioning devices (Figs. 2, 4, 6, 28, 29, 30, 40, 43-48, 50-56, and 59. Reference characters 500-599).*

From the cord supply as described above, and which for convenience in description has been considered as ending with the floating roll 439, the cords pass in two opposed series to a circular guide composed of a circumferential series of spaced rollers 500 (Figs. 30, 50, and 54). These rollers form the guiding circumference 120 referred to in considering the method upon which the machine operates. These rollers, as well as certain other guiding devices now to be described, are mounted upon a secondary frame 501 so designed that the guiding mechanism may be removed from the machine as a unit. This feature is of importance in facilitating changes in the guide which it may be desirable to make on account of tire size changes or repairs. In Fig. 52 this secondary frame is illustrated as partially removed from the machine. A vertical slot 502 (Fig. 2) is provided in at least one of the upright members of the central frame 400 and as appears in Fig. 52 the secondary frame 501 may be withdrawn through this slot. End projections 503 on the secondary frame are adapted by bolt holes or otherwise for attachment to the central frame when the machine is assembled, so that during the operation of the machine the secondary frame functions as a rigid and integral part of the main framework.

Some of the cords (those nearer the center of the supply) pass directly from the floating roll 439 to the guide rollers 500; while those cords nearer the ends of the supply, whose direction must be more radically changed, pass first through a preliminary guide composed of rollers 504 (see Figs. 30 and 50). These rollers are carried on the secondary frame, and are mounted on a bar 505 screwed in place and carrying suitable pivot pins 506. A plate 507 overlying the rollers serves to form enclosed guide spaces for the cords, and to give additional bearing for the pivot pins. Rollers 500 forming the guiding circumference 120 are similarly mounted, as will perhaps best appear from the section shown in Fig. 54 (see also Fig. 50). An annular bar 508 is secured to the secondary frame and carries the pivot pins 509 on which the rollers 500 are mounted. An annular plate 510 overlies the rollers, preventing the cords from slipping out of place.

From the circumference 120 formed by rollers 500 the cords pass around tensioning or slack take-up rollers 511 which are arranged to form the guiding circumference 123 mentioned in the description of the method. These rollers are carried on pins 512 (Figs. 50 and 54) mounted on a ring 513 seating in an annular recess 514 in the secondary frame 501, and are overlaid by a plate 515. Ring 513 is mounted on antifriction rollers 517 held in place by a plate 518, and is kept from coming out of the recess by a plate 519 attached to the frame and fitting over a shoulder on the ring. The mechanism provided for oscillating the ring in order to take up the cord slack formed at certain times in the operation of the machine will be later described.

From the rolls 511 the cords pass over a series of spacing rolls 520 (forming circumference 121) carried on pivot pins 521 on an annular bar 522 in a manner similar to the mounting of the other sets of rollers, and then pass to the inner circumferential guide corresponding to the circumference 124 in the description of the method. This is made in two parts, one secured to the main frame and one to the secondary frame. The two parts of the guide are similar, and each comprises a circumferential series of telescoping rollers 523, held in place by suitable devices in rings 524. One of the rollers has been shown in section in Fig. 53. As is there shown, the roller has a central aperture 525, and has its ends respectively convex at 526 and concave at 527. These ends are preferably substantially spherical in shape, so that adjacent rollers will telescope (Fig. 40) but will present a substantially continuous surface even though the series is arranged in a curve around the guiding circumference. To receive these rollers the rings 524 are formed with curved annular seats cut away at 528 (Fig. 54) to reduce the bearing surface. Plates 529 attached to the rings as by screws overlap the rollers and retain them within the seats. As an additional safeguard against the rollers 523 becoming misplaced, they are preferably threaded on a rod 530 having its ends suitably joined together so as to form a complete annulus.

One way of securing these ends is shown in Fig. 40. In that view appears a member 531, of a central diameter equal to the rod and having turned down end portions 532 and 533. The former end portion fits loosely into a cylindrical recess in the end of the rod, and has an annular groove 534 through which passes tangentially a pin 535. This secures the member 531 to the rod 530 against endwise movement, but permits it to rotate. The other end portion 533 has a screw-threaded engagement with the rod. To assemble the rollers 523 on the rod they are first strung loosely in place, the last roller to go in place being one provided with a lateral hole 536. The rollers are mounted closely together, but the sum of all the clearances between them permits a space being formed between any two, which gives space to shift and work with the transversely apertured roller. This roller is first located over the central portion of the member 531, and a pin inserted through the hole 536 into a hole 537 in the member 531. By this means the member can be rotated to thread the end 533 into the threaded socket in the rod. The apertured roll is then shifted to bring its hole over registering holes in the end 533, whereby a pin 538 may be inserted to bind the rod and the member 531 firmly together. The rollers are now all freely journaled on the roll and are ready to be mounted as an assembly in the machine.

That one of the rings 524 (Fig. 54) which is carried on the secondary frame is located by dowel pins 539, and is clamped in place by the overhanging plate 522 which carries rollers 520. The other ring is similarly mounted on dowel pins 539 and held by a plate 540, but in this case the recess in the frame is made deep enough so that a sectional ring 541 is required to keep the rollers in proper position. Bolts 542 keep the sections of the ring 541 in place. This construction is desirable for the reason that, as before stated, the secondary frame is designed for removal through slot 502, and with the parts in the operative position shown in Fig. 54, the rollers 523 carried by the ring 524 on the main frame 400 would interfere with this movement. By removing the sectional ring 541 and sliding ring 524 towards the right (as viewed in Fig. 54) a clear passage can be provided for the removal of the secondary frame, except for one or two other parts which will be noted below.

It was set forth in the preliminary description of the method of tire building which this machine is designed to carry out that the cords were kept under taut conditions during periods when the motion of the tire building support would tend to create slackness, by deflecting them between the stationary guiding points on circumferences 120 and 121. Circumferences 120 and 121, it will be remembered, are represented in the machine by the series of rollers 500 and 520 respectively. The deflection of the cords is accomplished by a circumferential displacement of the rollers 511 arranged in circumference 123, the cords being meanwhile clamped by mechanism to be described at circumference 122. The mechanism for oscillating the ring 513 carrying the series of rollers 511 will first be described.

The supplemental frame 501 has a guiding slot 543 (Figs. 44, 45, and 54) in which run a pair of rollers 544 carried by studs 545 screwed into the ring 513 which carries the series of cord guiding rollers 511. Also attached to these studs and to a third stud 546, similar to the others except that it carries no roller, is a bracket 547 having an outstanding arm which is provided with a series of holes 548. By rocking this arm through the arc permitted by slot 543 the ring 513 and the rollers carried thereby can be oscillated. Through one of holes 548 (which are provided to permit of variations being made in the effective length of the arm) is a pivot pin 549 carried by a double link 550 (see also Figs. 43 and 47). This link is pivoted at 551 (Fig. 43) to a piston rod 552 preferably having attached thereto a suitable cross head running in guides 553 to take up side thrust, and connected at its other end to a piston 554 (Fig. 4) running in an air cylinder 555. By admitting air to the cylinder the described train of mechanism will be operated to oscillate the series of rollers 511 and take up any slack which may tend to be present in the cords. Figs. 30 and 50 show one extreme position and Figs. 43 and 51 the other. This operating mechanism may be disconnected from the secondary frame when the latter is to be withdrawn from the machine by removing studs 545 and 546.

The clamping means which holds the cords during the tensioning operation to prevent additional cord lengths being drawn from the supply comprises a ring 556 (Fig. 54) having a clamping face between which and an abutment 557 on the bar 508 the cords are gripped. This ring slides towards and from the abutment over a ledge 558 on the frame (see also Figs. 46 and 47). It carries a series of cam rolls 559 (see also Fig. 56) each of which slides in a cam slot 560 formed in an oscillating ring 561 journaled on ledge 558 by roller bearings 562. A flange 563 on this latter ring (Figs. 47 and 56) fits under an overhanging lip on a plate 564 attached to the frame as by bolts. Each cam roll is conveniently constructed of a headed stud 565 to which is rotatably secured as by a screw a cap sleeve forming the cam roll itself.

With the oscillating ring 561 positioned so that the cam rolls will be in the dotted line position of Fig. 56 the clamping ring is pressed against the abutment 557, and when it is moved so that the cam rolls are in the full line position the clamping ring will be moved away from the abutment sufficiently to permit the cords to pass freely. It will be understood that while the cam rolls are shown in different circumferential positions in Fig. 56 it is in reality the ring 561 which moves and the cam rolls have only a lateral movement in a direction parallel to the axis of the guiding circumferences. Circumferential movement of the clamping ring is prevented by a keyed connection 566 (Fig. 54) between it and the ledge 558.

As shown the cam grooves in ring 561 have a portion 567 operative to withdraw the clamping ring beyond its normal unclamped position. This portion of the cam grooves is utilized only when it is desired to withdraw the secondary frame from the machine, the normal inoperative position of the clamping ring being insufficiently far removed from the abutment to permit the several series of guiding rolls on the secondary frame to clear it.

This clamping mechanism is operated at predetermined points in the operation of the machine by a cam device by the reciprocation of whichever core is in operation, the device associated with the other core being automatically rendered inactive by the swinging of the core turret. For this purpose the ring 561 which carries the cam slots has attached to it (Figs. 55 and 56) a pair of blocks 568, between which the rounded end of a lever 569 is adapted to fit when the secondary frame 501 is assembled into the machine. When the secondary frame is removed the lever 569 readily becomes detached from between the blocks. The lever is pivoted to a bracket on frame 150 upon a shaft 570 (Fig. 43) running lengthwise of the machine to points adjacent both core turrets, as clearly appears from Fig. 2. In Figs. 6, 28, and 29 one end of this shaft is shown. It is journaled near its end in a bearing 571 on the foundation frame 150, and carries as will be later described an arm 573. The end of this arm is rounded and fits into a horizontal slot in a block 574 (Figs. 6 and 29) vertically slidable in suitable ways in a bracket 575 attached to the turret frame 200. To the block is attached a link 576 pivoted at its top to a rocking arm 577 carrying a cam roller 578. This cam roller extends into the path of a switch cam carried in a frame 579 mounted on the top of the core slide 208, and illustrated in more detail in Fig. 59. The frame has a trapezoidal depression 580, adjacent the two ends of which are stub shafts 581 connected for simultaneous movement by cranks 582 and a link 583. Each stub shaft carries a cam switch 584, the two switches being so mounted that when one is touching the bottom of the trapezoid (as shown by the one at the left in Fig. 59) the other will be elevated so as to present a clear track under it.

The path relative to the reciprocating cam frame of the non-reciprocating cam roll 578 is shown in dot and dash lines in Fig. 59. As the frame reciprocates to shift the roll from the position at the extreme left the roll will pass under the left hand cam switch, elevating the latter to its central position and causing the right hand switch to be lowered on account of the connecting linkage. The cam roll will remain stationary until the continued movement of the frame brings the depressed right hand switch under it. The cam roll will then ride up the top surface of the switch, rocking arm 577 and through the connecting mechanism described operating the cord clamping ring 556 to release the cords, which up to this time have been firmly clamped between the ring and the abutment 557. The cords will remain unclamped, so that additional lengths may be drawn out from the supply, until the core reaches the end of its stroke, by which time the cam roll 578 will have ridden over the switch and have reached the clamping position shown at the extreme right of Fig. 59. A similar cycle of operations occurs on the reverse stroke. The coordination of these operations with the operation of the air cylinder and other functions will be discussed more fully below in considering the general operation of the machine.

When one of the core turrets is swung so as to permit of the removal of the completely built up tire carcass (as shown at the left of Fig. 3) the mechanism for operating the cord clamp is disconnected from that turret. In the embodiment shown this disconnection is accomplished by the operation of unlocking the turret to free it for rotation. That part of the apparatus is controlled by handle 374 carried at the top of standard 372. To the arm 370 projecting from the lower part of the turret, and which is connected to the turret lock by link 369, is pivoted a link 585 (Figs. 28 and 29) having at its free end a slot 586 furnishing a lost motion connection with a pin on a crank arm 587 carried at the lower end of a shaft 588 journaled in a bracket 589. The top of this shaft carries a forked arm 590, having rollers or other suitable means fitting into a groove in a collar 591 keyed at 592 to a sleeve 593 keyed to the shaft 570 for rotation therewith, but free to slide along it. As the described linkage is operated, therefore, the arm will be moved in a direction towards the bottom of Fig. 28, causing its rounded end to be carried out of the slot in block 574, thereby freeing the core turret from all engagement with the cord clamping mechanism. The core turret may now be swung to its inoperative position. On the reverse operation of the turret the block 574 may not have its slot quite in line wtih the end of arm 573. In this case the arm 573 and its sleeve 593 remain stationary with the end of the arm bearing against the side of the block, while arm 590 moves the collar 591 towards the top in Fig. 28, compressing a spring 594 mounted between the collar and a flange 595 on the sleeve. As soon as the movement of block 574 brings its groove into line with the end of arm 573 the latter will snap into place.

*Constricting devices (Figs. 39, 41, 42, 43, 46-49, 52, 57, 58, 60, and 61. Reference characters 600-699).*

Located on each side of the central frame 400 are mechanisms arranged to constrict the series of cords towards the axis of the building core. The purpose of this constriction has been considered in describing the method according to which the machine is operated, and is dealt with at length in my said prior applications. The two devices are similar and a description of one will suffice for both.

The constricting devices are supported from the main central frame, one on either side. Each device comprises a ring 600 of L-shaped cross-section (Fig. 49), to which is connected as by screws 601 spaced guiding quadrants 602 having inturned edges 603. Within the space bounded by rings 600 and 602 run freely a pair of rings 604 and 605 carrying the constricting wires 606. The wires are normally curved, as indicated in Fig. 41, so that they lie within a groove 607 formed by shouldered portions of the rings, and are each attached at one end to ring 604 and at the other to ring 605.

The preferred method of attachment is indicated in Figs. 38 and 39. At each end of each wire is a ferrule 608 through which passes a screw 609. This screw is threaded into a block 610 (Fig. 49) freely turning in a counterbore in the ring 604 or 605, as the case may be. By this construction the screw will not become unthreaded by the slight rotation given in use by the wire to the ferrule. The wires may be provided with anti-friction rollers 610' (Figs. 38 and 39) threaded thereon, the rollers being held by soldering or otherwise securing those at the end of each wire.

The constricting mechanism thus far described is similar in most respects to that shown in my prior application Serial No. 547,081, and operates in the same general manner. If rings 604 and 605 are rotated slightly in opposite directions the ends of each wire will be separated circumferentially, causing the wires to change in shape as indicated by the difference between Figs. 41 and 42. The sharp curve near the middle of the wire in Fig. 42 is due to the natural shape to which it is brought by application to a portion of the circumference of the circular series of cords. By applying force to the rings in this manner a constricting force will be exerted upon the cords around a circumference bounded by the series of wires. The specific mechanism for rotating the rings is different in the present case from that in the prior application referred to, and will now be described.

Each ring 600 has at its top and bottom a boss 611 (Figs. 46 and 47). The boss at the top (Figs. 46 and 60) is bored for sliding upon a shaft 612 suitably secured to the central frame 400 and to a bracket 613 attached thereto. The boss at the bottom (Figs. 47 and 61) gives bearing to a rotatable sleeve 614, through which passes a shaft 615 journaled for rotation in the frame 400 and in a bracket 616 attached thereto. A spline connection indicated by 617 is provided between the sleeve and shaft, so that while the sleeve, and consequently the ring 600 and parts carried thereby, may be shifted axially a limited distance, it will always be constrained for rotation with the shaft. Fast upon the sleeve are gears 618 and 619. Gear 619 meshes with a segmental series of gear teeth upon the outer surface of ring 605, reaching these teeth through an aperture in the outer ring 600. Gear 618 meshes with a similar gear 620 on a stub shaft 621 suitably journaled in boss 611 and carrying also a gear 622 meshing with gear teeth on ring 604 in a similar manner to that by which ring 605 is driven. By this mechanism the rings 604 and 605 may be rotated in opposite directions under the influence of shaft 615 to expand or contract the series of wires.

At the end of shaft 615 is a gear 623 meshing with a gear 624 on one end of a stub shaft 625 journaled in a bracket 626 (Fig. 47) suitably supported on the central frame. At the other end of the stub shaft is a gear 627, meshing with a rack 628 suitably supported in a bracket 629. This rack is connected to a piston rod 630 (Fig. 43) carrying a piston 631 in a pneumatic cylinder 632 which may be operated to cause travel of the rack in one direction or the other by control devices to be described.

During the laying of successive plies of a single tire casing the constricting wires remain in one plane, opening and closing as required for the constriction of the cords. During the operation of transferring from building on one core to building on the other the axial position of the constricting devices is changed. In the present embodiment pneumatic control devices are provided for this purpose, so that by shifting a control handle the wires can be placed in position either for the normal or transfer operations.

Figure 61:
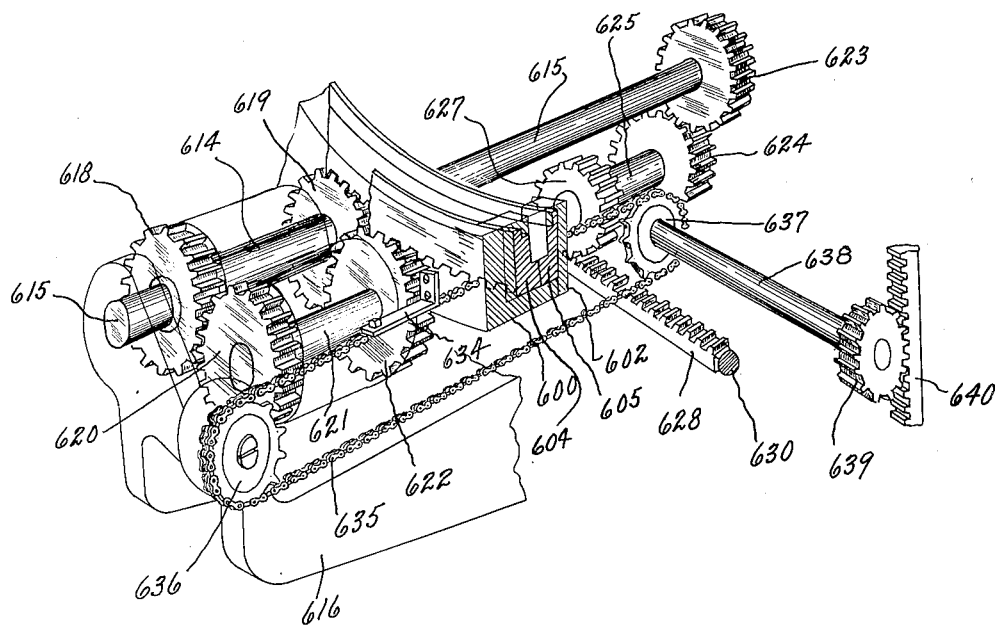
Fig. 61 is a perspective detail of one of the lower means for axially shifting the constricting devices and of the mechanism for operating the constricting devices.

The upper boss 611 by an arm 633 (Fig. 60), and the lower boss by an arm 634 (Fig. 61), are connected respectively to similar chains 635, running between sprockets 636 and 637, the former mounted on idler shafts in brackets 613 and 616, and the latter on shafts 638 journaled in bearings in the central frame 400. To the other ends of the shafts 638, upon which sprockets 637 are mounted, are gears 639 (Figs. 43 and 61)

meshing with vertical racks 640 guided in brackets 641. These racks are connected with the piston rods 642 of a double ended pneumatic cylinder 643 having a single piston 644 to which both rods are secured. A common motion of the rods down or up will function through the sprockets and chains to shift the entire constricting device respectively towards or away from the central guiding frame. It will be understood that there is one air cylinder, controlled by suitable devices to be described, on each side of the central frame for operating the two constricting devices.

*Transfer mechanism (Figs. 5, 9–13, 16, 22, 62, 64, and 67. Reference characters 700–749).*

After a tire carcass has been built up on one core, the circumferential series of cords is transferred to a core on the other turret, anchored in position, and then severed between the two cores. The method of doing this is fully described and claimed in my copending application for patent filed December 3, 1921, Serial No. 519,583, and the apparatus herein shown for the purpose is similar in many respects to the apparatus shown in my application Serial No. 547,081, filed March 27, 1922. Reference to those cases may be made for a more extended discussion.

Passing through the center of each core supporting sleeve 242 is a tube 700 (Fig. 5) carrying at the end adjacent the core clamping and folding devices used in the transfer operation. On one only of the turrets is carried a knife for severing the cords between the cores. With the exception of the knife the mechanisms are similar and a description of one will suffice for both. The tube 700 has bearing in each end of the sleeve, as appears in Figs. 5 and 9, and slides freely in it. At the core end of the tube is fixed a hub 701 (best seen in Fig. 16) to which is bolted at 702 a spider 703. Rods 704. pinned to the spider at 705 and sliding freely in the core head 244, give the desired rigidity to the spider while permitting it to be moved by reciprocation of the tube into either the position of Fig. 9 or Fig. 16. The outer ends of all but one of these rods are notched at 706 to receive an annular plate 707 having holes 708 (Fig. 10) with enlarged portions 709. The enlarged portions are big enough to slip over the ends of the rods, and by rotating the plate slightly into the position of Fig. 10 the narrower portions of the slots will be brought into the notches, preventing the plate coming off the rods. The remaining rod, instead of being notched, has a shouldered end, and a screw end 710 which can be tightened to clamp the plate firmly. By slightly loosening the screw end this rod will function the same as the other rods.

The annular plate 707 serves as a supporting means for the cord clamping and folding mechanism and its detachable feature just described permits this mechanism being quickly removed when, for example, it is desired to take a core off of the core head. At its outer periphery each plate 707 supports by ball bearings 711 (Fig. 11) a ring 712. As shown in Fig. 12 a small plate 713 screwed to plate 707 closes a gap left to permit the insertion or removal of the balls. Ring 712 has a flange 714 and a beveled shoulder 715. Over the shoulder fits a split ring 716 with a beveled surface mating with the beveled surface of the shoulder. The gap in this ring is closed by a tapered wedge 717 (Figs. 12 and 13) shaped to interfit with the ends of the ring so that a smooth surface is presented on both sides. A solid ring 718 fits over ring 716, and is of suitable diameter to receive between it and the ring the fold 719 of a rubber or rubberized fabric inflatable bag 136. In assembly the fold is made around the ring 718, and the split ring 716 expanded against it and locked by wedge 717. These parts are held in assembled relation by a pipe 721 passing through rings 718 and 716, and shoulder 715, and by a plate 722 screwed at 723 (Fig. 12) to the side of ring 712. Pipe 721 serves to admit fluid under pressure such as air to the interior of the inflatable bag, and to this end is connected by a flexible tube 724 (Figs. 9 and 16) to a pipe 725 running through the interior of tube 700, and leading to a source of fluid pressure as will later be described.

Plate 722 preferably has a curved abutment 726 adapted to underlie the building flanges 126 on the core and center with respect to the core a bead anchorage in process of being applied, although in certain cases this may be omitted as indicated in Fig. 22. It also serves to retain one side of the bag, forming together with flange 714 a pocket within which the bag 136 is located when in deflated condition. Plate 722 also has an annular lip 727 adapted to press the bead anchorages against the building flange 126. The plate 722, abutment 726, and lip 727 form collectively the clamping plate 135 referred to in the discussion of the method. The bag 136 is formed with a re-entrant fold so that on deflation it will lie wholly within the pocket formed by plate 722 and flange 714. When inflated it changes in shape roughly from the full to the dotted line position of Fig. 11.

The rear end of the tube 700 (Figs. 62 and 64) passes into a block 730 in which it is held by a split collar 731 clamped by bolts 732 upon screw threads 733 on the tube. A thrust bearing 734 is located between the collar and one side of a recess 735 in the block so as to permit the tube 700 to turn relative to the block even under the strain set up when the lip 727 is clamped against the building flange 126 to hold the tire bead in position. Block 730 runs in ways 736 (Fig. 67) on the core slide 208 and is attached by a nut 737 (Fig. 62) to a reduced end portion of a piston rod 738 carrying, in a fluid pressure cylinder 739, a piston 740. A pipe 741 at each end of the cylinder (only one appearing in Fig. 62 on account of their angular positions) serves for the admission of suitable fluid under pressure to move the piston, and consequently the clamping and folding mechanism carried by tube 700, into either the position of Fig. 9 or that of Fig. 16.

The pipe 725, which carries the pressure fluid to the inflatable bag 136, runs inside the tube 700, being preferably suspended therein by wires 742 (Fig. 64) soldered to the tube. The pipe terminates at a hole 743 in the tube, located near one end of block 730, and opening into a recess 744 formed in the block. A pipe 745 leads into this recess, which extends entirely around tube 700 so that fluid may enter pipe 725 in whatever rotative position the tube may be in. To prevent leakage the recess is provided with U-shaped packings 746 mounted on either side of the hole and held apart and in form by a perforated bridge piece 747. The recess is closed by a disk 748 bolted to the end of block 730.

*Knife mechanism (Figs. 5, 9, 10, 21, 62, 63, 64, and 67. Reference characters 750 to 799).*

The knife shown in the drawings is similar in its general design to that described in my said application Serial No. 547,081, and is claimed specifically in my copending application, Serial No. 634,733, filed April 26, 1923. As stated above, only one of the turrets carries a knife. This turret, that at the right in Figs. 2 and 3, and the one shown in Fig. 5, has a shaft 750 extending through it inside tube 700 and journaled at its end adjacent the core in hub 701 (Fig. 21). Splined to the end of this shaft is a crank arm 751, shown in end view in Fig. 10. A knife holder 752, carrying a knife 753 at its outer end, is pivoted at 754 to the crank arm. The holder is slotted at 755 for a portion of its length, and a screw 756 passes through the slot and into a plate 757. A spacing collar 758 (Fig. 21) holds the knife holder at the proper distance from the plate. The plate fits between the base of spider 703 and a ring 759 held thereto by screws 702. It is thus left free to rotate, but is frictionally restrained lightly by a plug 760 pressed towards the plate by a spring 761 located in a recess of the spider. A thrust bearing 762 is located between hub 701 and the crank arm 751 to absorb any end thrust involved from the two core heads pressing against each other as will appear in the description of the method of operating the machine. The end of shaft 750 is tapered at 763, and when the two cores are in the transfer position fits within an anti-friction thrust bearing 764 on the opposite core head (Fig. 16) so that the hub of the crank arm may bear upon the opposing hub 701 through this thrust-bearing to keep the transfer mechanisms properly separated (see Fig. 9) and yet may rotate freely during the severing operation.

If the knife mechanism be assumed to be in the position indicated by dotted lines in Fig. 10, and if the shaft 750 be rotated in the direction of the arrow in that figure, the following sequence of operations will take place. It will be noticed that in this position the crank arm has drawn the knife holder inward until the outer end of the slot is against the screw 756. The angular position given to the knife holder will cause the knife to lie well within the space bounded by the tire material. Rotation of the shaft in the direction of the arrow will cause the knife holder to slide along the screw until it reaches the full line position of Fig. 10, the friction of the plug 760 preventing rotation of the plate during this much of the motion. When the crank arm and knife holder are in line (the full line position) the arm strikes a stop pin 765 (Fig. 10) on the plate. This causes the crank arm, knife holder, and plate to move as a unit, carrying the knife around the core one or more times as may be desired while extended in cutting position. Upon stopping the rotation of the shaft, if this be done suddenly as is preferable, the inertia of the relatively heavy plate will cause it to overtravel the crank arm, bringing the parts to the same relative position as that shown in dotted lines (although the parts may be in a different relative position to other parts of the mechanism). It will be seen that the described mechanism operates to project the knife from inactive to active position, rotate it about a circumference to sever the material, and retract it to inactive position.

Figure 62:
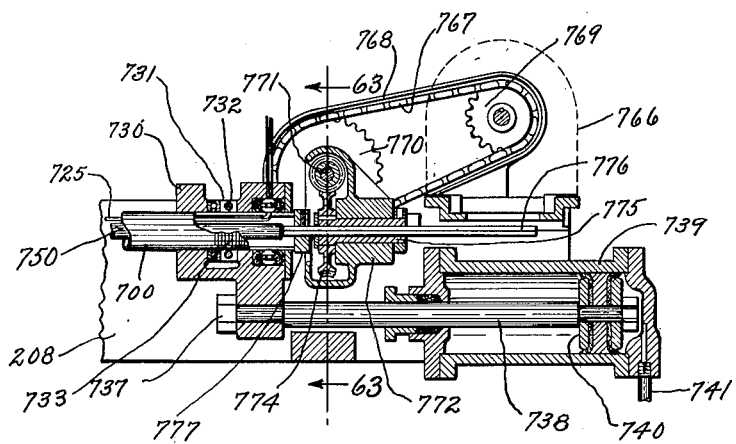
Fig. 62 is a detail, mainly in median section, of certain mechanism located on the outer end of that turret shown at the right in Fig. 2.
Figure 63:
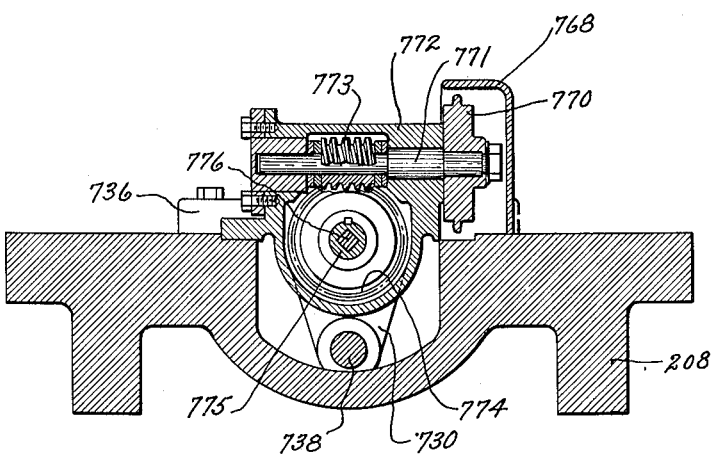
Fig. 63 is a section on line 63—63 of Fig. 62.
Figure 64:
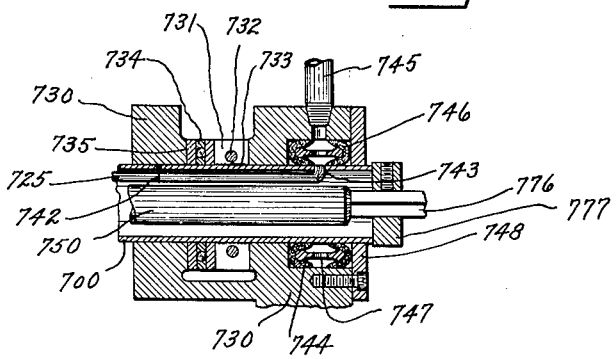
Fig. 64 is an enlarged detail of certain parts appearing in Fig. 62.

The driving mechanism for shaft 750 is best illustrated in Figs. 62 and 63. The power for this purpose is provided by a small motor 766 mounted on the rearwardly extending part of core carrying slide 208. A chain 767, enclosed in a guard 768, connects a sprocket 769 on the motor shaft with a sprocket 770 fast on a cross shaft 771 suitably journaled in a bracket 772 on the core slide. A worm 773 on this cross shaft meshes with a worm wheel 774 splined to a sleeve 775 journaled in the bracket and provided with collars at each end to prevent longitudinal movement. The sleeve has a square hole in which a square extension 776 of shaft 750 is free to slide. In order to prevent any endwise play of shaft 750 a collar 777 is screwed to it and bears against sleeve 700. Endwise play in the other direction is prevented by the contact (through hub 701 and thrust bearing 762) of crank arm 751 with the other end of the sleeve. By this means shaft 750 is permitted to partake of the reciprocation relative to the core slide of the transfer mechanism under the influence of air cylinder 739 without requiring any movement or adjustment of the devices for causing its rotation.

Figure 65:
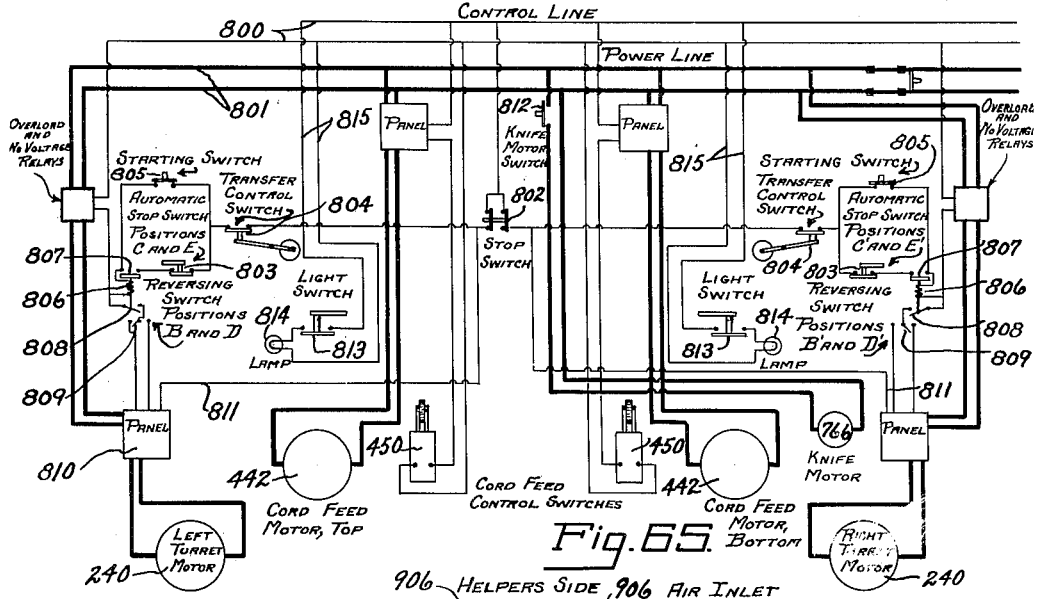
Fig. 65 is a diagram illustrating the electrical control connections.

*Electrical control system (Fig. 65. Reference characters 800–899).*

The various mechanical parts thus far described are controlled in part electrically and in part pneumatically, and the two groups of controls will be separately considered. Considering first the electrical controls, those parts controlled in this manner comprise the cord feed, the motors operating to reciprocate the cores carried by each core turret, the motor operating the knife for severing the cords between the adjacent completed tires, and a signal light indicating the position of certain automatic controlling devices.

The general arrangement of electrical circuits is indicated in Fig. 65, in which heavy lines represent the power circuit and light lines the control circuit. Since the details of the control connections will vary with the type of motor used, and since the control devices acting directly on the power line are standard as applied to the various types and makes of motors, no attempt has been made to illustrate the details of such apparatus, attention being solely directed to the controls which cause the motors (through the other standard but unillustrated devices) to carry through the cycle of operations for which the present machine is designed.

Certain details of the control for the cord feed motor have been previously described in connection with Figs. 36 and 37. The manner in which the switch 450 there referred to is connected is indicated in Fig. 65. Each switch (one for each of the two cord feed motors) is connected in a circuit in series with motor control devices indicated generically by the word "Panel" and is tapped off a control line 800 conveniently of lower voltage than the main power line 801. Other connections are made from the panel to the main power line and from the panel to the motor, so that when the control circuit is closed by switch 450 (in turn controlled by floating roll 439) the standard motor controls on the panel are actuated to cause operation of the cord feed motor and consequent feeding of the cords from their supply.

The motors 240 which operate the core-carrying slides in the two turrets are each controlled by a reversing switch, two sets of stop switches, and a re-starting switch. There is also provided a double stop switch 802, located in the control circuit of both turret motors, which may be used to cut off current from both motors simultaneously. This is desirable rather than having a separate switch for each motor since there is only one place for the operator to remember when an emergency stoppage becomes necessary. The reversing switch changes the direction of movement of the core slide at the end of the stroke, that is, in positions B or D. One stop switch 803 on each turret functions to stop the core in positions C and E, shortly after the actuation of the reversing switch. It is at these positions that the bead anchorages are applied. This switch therefore finds its main employment during the normal ply building operation on a single core. The second stop switch 804 is inactive during normal ply building operations but functions to stop the core at selected positions (lettered from F to J inclusive) during the transfer of cord laying from one core to the other.

The mechanical details of these switches will be taken up in detail below, but their electrical connections are best considered in connection with the general circuit shown in Fig. 65. The transfer control switch 804 is normally closed, forming a continuation of the circuit through the double emergency stop switch 802, and may be considered in its electrical features as acting in the same manner as the emergency stop switch itself. Beyond the transfer switch the control circuit divides, one branch being normally broken by the starting switch 805, a normally open circuit switch which is closed only at the moment of starting. The circuit through the starting switch passes through a solenoid 806 so that when the starting switch is closed the solenoid will be energized. The solenoid carries a contact piece 807 serving when the solenoid is energized to close the circuit through the second branch of the control line. This second branch has in it also a normally closed circuit switch 803 above referred to as the automatic stop switch actuated when the core is in positions C and E. Also carried by the plunger of solenoid 806 is a switch 808 in circuit with a double throw switch 809 acting as a reversing switch. The two leads from the reversing switch go to a control panel 810, of a standard construction differing with the maker and the type of motor to be operated. A wire 811 is also tapped off the control line and leads to the devices on the panel. Depending on the setting of the reversing switch 809 the turret motor 240 will be operated in one direction or the other as long as switch 808 is closed.

The operation of these control switches may now be considered in somewhat more detail. As long as current flows through solenoid 806 switch 808 will be kept closed and the motor operated. Current may reach the solenoid through either branch of the control line. In starting the starting switch 805 is momentarily closed, causing current to pass through the solenoid (emergency switch 802 and transfer switch 804 being of course closed). The impulse electrically given to the plunger of the solenoid closes switch 808, thereby starting the motor, and also causes the contact piece 807 to bridge the gap in the switch of which it forms a part. The automatic stop switch 803 being in closed position the second branch of the control line is completed through the solenoid. The starting switch 805 may now be released, the current in the branch including stop switch 803 keeping the solenoid energized and switch 808 closed. If the stop switch 803 happens to be open when the starting switch is first closed the latter must be held closed until the stop switch has been closed by the movement of the mechanical parts.

The knife motor 766, operating under a low load, may be operated directly from the main power line by a switch 812 preferably of the oil type and manually operable. The light switch 813, which is placed in series with a lamp 814 in a circuit 815 preferably tapped off the control circuit, is automatically operated as hereinafter described and serves to indicate to the operator when the other control mechanism is so set as to make it safe to start the transfer of the tire building operation to a succeeding core.

*Automatic stop switch (Figs. 67, 71, 72, and 81. Reference characters 803–825). (Positions C and E.)*

The first switch to be considered will be the one (duplicated for the two turrets) which stops the core at positions C and E a short distance after its reversal of direction. The switch 803 (not shown in detail as its construction is unrelated to the invention) is of the normally closed type, that is, it forms an unbroken part of the control circuit until opened by the tripping device to be described. It is illustrated in detail in Figs. 71 and 72 in two stages of coaction with one of the tripping devices. A bracket 816 is mounted at the side of the switch box 803, and carries an arm 817 pivoted at 818 and extending over the top of the switch box. Through this arm passes an adjusting screw 819 which presses upon the button or switch operating member 820. When this button is in its normal or elevated position, indicated in Fig. 72; in which position it is yieldingly held by a spring forming part of the internal switch mechanism, the switch is closed, being opened by the depression of the button. The switch box and bracket are carried by the ways 207 which support the core-carrying slide 208. Upon the slide itself are mounted two brackets 821 (Fig. 67) each supporting a pivoted member 822 (Figs. 71 and 72) carrying at its lower end a roller 823 and adapted to rest against an adjustable stop screw 824. The roller 823 is so supported by this apparatus as to pass directly over and in contact with an elevation 825 on lever 817 during the reciprocation of the core-carrying slide.

Figure 72:
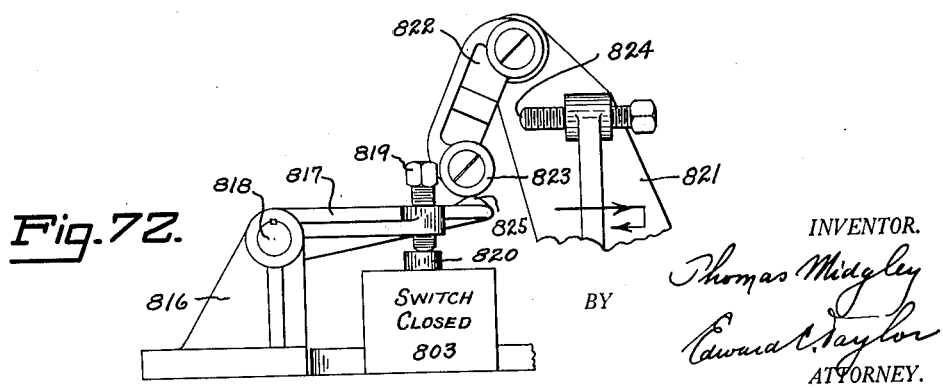
Fig. 72 is a similar view with the parts in a different operative position.
Figure 73:
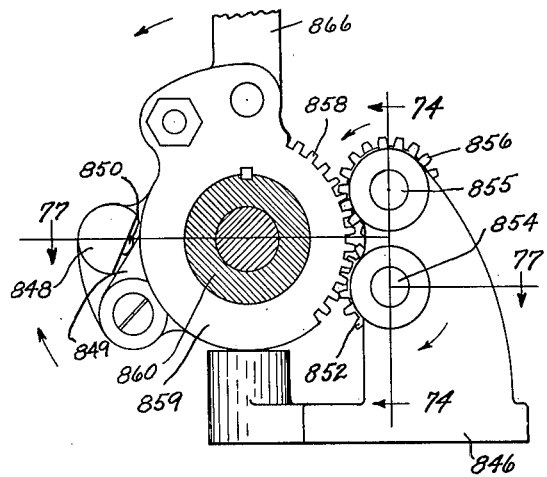
Fig. 73 is a section of certain mechanism appearing in part in Figs. 67 and 68, taken on line 73—73 of Fig. 77.
Figure 74:
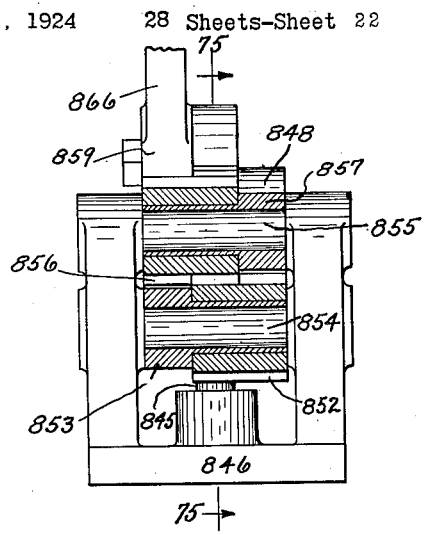
Fig. 74 is a view from the right in Fig. 73, partly in section, on line 74—74.
Figure 75:
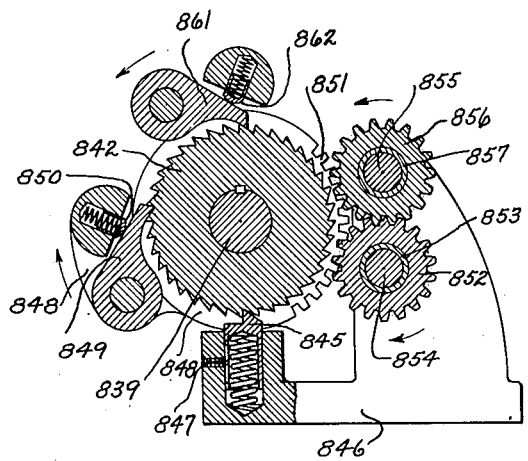
Fig. 75 is a section on line 75—75 of Fig. 74.
Figure 76:
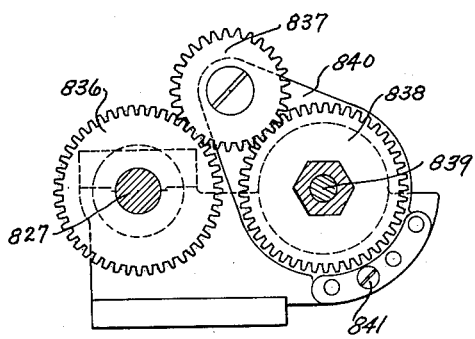
Fig. 76 is a view on line 76—76 of Figs. 67 and 77.
Figure 77:
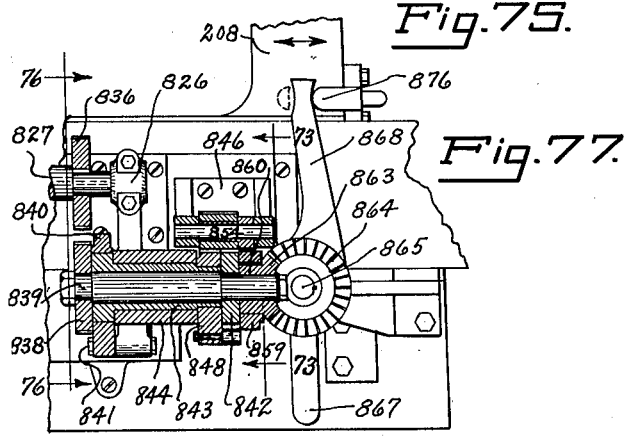
Fig. 77 is a plan section on line 77—77 of Fig. 73.

In Fig. 72 the slide is shown as approaching its limit of motion in one direction. During its outward travel the roller 823 at that end of the slide rides freely over elevation 825, member 822 swinging on its pivot away from the stop screw to permit of this. At the limit of motion the roller has ridden over the elevation and the member 822 has fallen to the vertical position. As the slide moves in the reverse direction, the reversing switch to be later described having meanwhile acted, the elevation 825 forces the member 822 against the stop screw 824. Further motion of the roller being impossible, continued motion of the slide causes the lever 817 to be depressed, consequently depressing the button 820 and stopping the core reciprocating motor. The machine now remains at rest until the core motor is again started by the operator pressing the starting button 805. Motion of the core continues to the other end of the stroke (unless earlier stopped by the transfer control switch) and reversal and stoppage shortly thereafter occur as before, the switch during this second stoppage coacting with the parts on the other of the two brackets 821.

*Automatic transfer stop switch (Figs. 6, 67, 68, 73–77, and 81–84. Reference characters 826 to 879).*

Journaled in bearings 826 on the turret side (Fig. 67) is a shaft 827 carrying a series of stops 828, 829, 830, 831, 832, 833, and 834, set at various intervals, and projecting (see Fig. 81) at various angles about the shaft. These stops coact with a roller 835 attached to a normally closed circuit switch 804, carried by the core slide, to open the control circuit and stop the movement of the core at various times during the transferring of the tire building operation from one core to another. In Fig. 81 the stops have been lettered according to the positions indicated in Figs. 100 to 109.

The shaft 827 is rotated intermittently in part automatically and in part manually, automatic operation occurring during the normal ply-laying operations on a single tire, and manual operation occurring at the several stop positions during the transfer between successive tires. At one end of the shaft is a gear 836 (Figs. 76 and 77) meshing with an idler 837 which is driven from a gear 838 on a shaft 839 also mounted in bearings on the turret. The idler is mounted on an arm 840 pivoted on shaft 839 and held in adjusted angular position by a screw 841 which holds the arm to the frame by passing through any one of a series of holes in the arm. The purpose of this adjustable construction is to permit gear 836 to be changed so as to vary the speed of rotation of shaft 827, a feature of use in changing from a tire of one number of plies to one of another number, as will be more fully explained elsewhere.

Intermittent rotation of shaft 839 is caused by a ratchet mechanism, operated either automatically or manually, and functioning to advance the shaft through one complete unit of motion only upon a complete two-directional reciprocation of the operating lever. A ratchet 842 is keyed to shaft 839, which is carried in a bushing 843 supported in a pedestal 844 on the turret frame. A spring pressed detent 845 (Fig. 75), held against rotation in a bracket 846 by a pin and slot connection 847 prevents retrograde motion of the ratchet. Freely rotating on a shoulder of the bushing 843 is a pawl carrier 848, pivotally supporting a pawl 849 held yieldably against the ratchet wheel by a spring pressed plunger 850. A portion of this pawl carrier is provided with gear teeth 851 (Fig. 75), meshing with a pinion 852 freely mounted on a bushing 853 (Fig. 74) on a short shaft 854. As will be seen from Fig. 74, the bushing is so designed as to keep the pinion at one end of the shaft 854. Directly above this shaft, and journaled in the same standard 846, is a second shaft 855 carrying a similar pinion 856 and bushing 857, the latter, however, being arranged to keep its pinion at the opposite end of the shaft from pinion 852. The two pinions are long enough to mesh with each other, and function as back gears, rotating in opposite directions. Pinion 856 meshes with teeth 858 (Fig. 73) on a second pawl carrier 859, keyed to a sleeve 860 pivoted freely on shaft 839 at the opposite side of the ratchet wheel from pawl carrier 848. This second pawl carrier is provided with a pawl 861 (Fig. 75) pivoted so as to overhang the ratchet, and held in contact therewith by a spring pressed plunger 862. Sleeve 860 carries a bevel gear 863 (Fig. 77) meshing with a similar gear 864 on a vertical shaft 865. Oscillation of the pawl carriers can be accomplished by a handle or arm 866 attached to pawl carrier 859 (see Figs. 6, 67, 68, and 73) by a handle 867 on the vertical shaft 865 (Figs. 6, 67, 68, and 77), or by a trip arm 868 (Fig. 77) also carried by the vertical shaft. At the bottom of the shaft (Fig. 84) is a ball-ended projection 869 lying between two spring pressed plungers 870 suitably secured to the base of the turret, in which the shaft is also journaled. These plungers act as a centering device, causing the shaft to be returned to a standard central position after rotation in either direction.

The intermittent rotation or "indexing" of the shaft 827, as previously stated, is accomplished by an oscillation of the ratchet drive in opposite directions. One motion of the oscillation is given by a manual movement of handle 867 or by a mechanical pushing of the trip arm 868. Considering as the simplest case the movement of arm 868 in one direction or the other, it will be clear that the pawl carrier 859 attached to sleeve 860 will be moved so as to cause its pawl either to turn the ratchet wheel or to slip over it, depending on the direction of motion given to the handle. But as this pawl carrier is moved in one direction the pawl carrier 848 will be moved in the opposite direction by reason of the reversing back gear connection detailed above. If one pawl glides over the ratchet the other will be in turning engagement with it. The only effect that changing the direction of push on lever 868 will have will be to cause a change in which pawl acts first, for whichever is the first to act will be followed by a turning action of the other during the centering of the shaft by spring plungers 870, the first to act gliding freely over the ratchet during the centering movement. By this construction there is obtained an intermittent motion of the indexing shaft 827 always in one direction from a motion of handle 867 or arm 868 in either direction. As far as the operation of the indexing shaft itself is concerned this characteristic is not of importance, as uni-directional intermittent movement could be given by a motion of the handles always in a single direction. The utility of the construction lies in the possibility it offers for control of the reversing and transfer stop switches by the same devices, a feature which will be clearer when the reversing switch is considered.

Stop 830, which contacts with roller 835 to cause stoppage of the core at position J, is somewhat differently constructed than the other stops, and deserves especial consideration. This stop is located so that it bears against the roll quite near its limit of motion, and as a safeguard against the roll in its outward motion interfering with the indexing of shaft 827 which sets stop 830 in readiness to contact with the roller on its return stroke, the stop is mounted so as to yield. For this purpose an eccentric disk 871 is keyed to the shaft 827 (Fig. 83) and carries, pivoted in a slot 872, a member 873. This member has a stop projection 830 adapted to enter the path of roller 835, and a tail portion 874, lying within the slot and forced outwardly by a a spring plunger 875. If, as indicated in Fig. 83, the rotation of shaft 827 should bring the projection 830 against the flat side of roller 835, the spring will be momentarily compressed, causing the projection to cam the roller gradually away from it as the roller moves from position D to J.

Since an increase in the number of plies changes the number of times the core is passed back and forth but does not change the transfer positions, the only change necessary to turn from one type of tire to another is to replace shaft 827 with its cams and gear 836 with a second similar assembly differing only in the positions of the stop cams and the number of teeth on gear 836. In Fig. 81 is illustrated a cam assembly for a six-ply tire, there being in all fourteen equally spaced positions, including six positions (indicated by dash lines at the left) in which this cam mechanism does not function except to step idly from one position to another as the core reverses its stroke, indexing of the shaft being accomplished by trip arm 868 being struck by stops 876 (Figs. 67 and 77) on the core slide at the ends of the latter's reciprocating strokes. There are also eight other positions, seven being occupied by the seven transfer stop cams, and one being an idle space during which the shaft is indexed by trip arm 868 as before. In the assembly for an eight-ply tire shown in Fig. 82 the eight transfer positions are as before except that the cams are set in closer angular relation. Gear 836 is changed when this assembly is used, being made of a size which will give one sixteenth of a rotation of shaft 827 for each actuation of the ratchet mechanism. Instead of the six idle spaces at the left there are in this case eight spaces, making sixteen equally spaced positions in all. Similar changes to produce the number of plies desired may be made in a like manner.

*Reversing switch (Figs. 68, 79, 80, and 84. Reference characters 880 to 890).*

Secured on the lower end of vertical shaft 865 (Figs. 68 and 84) is a lever 880, the forked end 881 of which embraces a pin 882 on a lever 883 attached to the shaft 884 of a reversing switch indicated generically at 809. This switch is of any standard type, shown as one in which the contacts are set by angular displacement of the handle to one side or the other of a neutral position, but which are not disconnected when the handle is moved to the neutral position nor until it is angularly displaced to the other side of that position.

Without attempting to show in detail the construction and the electrical features of this illustrated form of standard switch, its method of operation is indicated in Figs. 79 and 80. The operating lever 883 is fixed to a shaft 884 to which is also fixed a member 885. Loosely pivoted on the shaft is a contact member 886 having a shouldered portion 887 extending adjacent member 885 between two lugs 888 thereon. The shouldered portion and the lugs 888 form a lost motion connection by means of which a movement of the operating lever is permitted without corresponding changes in the connections. In Fig. 79 the switch is shown in the position resulting from a movement of the operating lever to a position along the dotted center line to the left. By this movement the contact member 886 has been pressed between spring clips 889. The lever is here shown as having been moved back to the neutral center line, no corresponding movement of the contact points having been produced. If the operating lever is now moved to the right hand center line member 886 will be moved between spring clips 890.

At the end of each reciprocation of the core slide a stop pin 876 (of which there are two for each slide) contacts with trip arm 868, throwing the arm slightly and causing sufficient rotation of the vertical shaft 865 to throw the reversing switch. As the slide starts backwards in response to the reversed impulse of the driving motor the centering plungers 870 (Fig. 84) cause the shaft to be returned to a central position, carrying with it trip arm 868 and handles 866 and 867, but for the reasons set forth above causing no corresponding movement of the reversing switch. As the core carrying slide reaches the other end of its stroke the other stop pin 876 contacts with trip arm 868, forcing it from its normal or central position in the reverse of the direction before given. This operates to shift the contacts in the reversing switch to again change the direction of rotation of the motor.

*Indexing plate (Fig. 67).*

At the ends of the core slide's normal stroke the shaft 827 is rotated through the proper fraction of a complete revolution (one-fourteenth in case of a six-ply tire), or "indexed", by the trip arm 868. In the normal ply-laying operations this is the only way indexing is accomplished. During the transfer several stop positions occur, at each of which the shaft must be indexed to free the roller 835 from that one of the stop cams which caused the stoppage before further operation of the machine can take place. At certain of these stoppages the motor is re-started in the same direction as before, and at certain others it is re-started in the reverse direction. In order to insure that the restarting shall be in the correct direction use is made of the handle or arm 866 previously mentioned as secured to the sleeve 860. This arm, while described as a handle and capable of use as such if desired, preferably terminates about flush with a slotted plate 891 (Fig. 67) secured to a frame 892 attached to each core carrying slide and overhanging the shaft 827 and associated mechanism. This plate has a longitudinal slot 893 and a series of notches 894 opening out of it. The slot is located so as to guide the arm 866 while in its central or neutral position and acts to prevent indexing of the shaft or actuation of the reversing switch at improper times. The notches are arranged so that when the parts are in a proper position for restarting after a stoppage the arm 866 and consequently the operating handle 867 can only be moved in one direction. It may be recalled in this connection that when the motor is to be re-started in the same direction as before its stoppage, the reversing switch is not changed on account of the lost motion connection previously described, the only effect of the operation of handle 867 being to index the shaft 827. This removes from contact with roller 835 the stop cam which had previously caused the stoppage, and permits the machine to be restarted by pressing the starting button 805.

*Lighting switch (Figs. 65 and 78).*

In Fig. 78 is illustrated the operating mechanism for a signal light. A switch 813 is normally kept open by the pressure of an adjustable contact member 895 attached to a bell-crank 896 freely pivoted on a suitable shaft. The other end of the bell-crank carries a roller riding on the surface of a disk 897 fastened on shaft 827. A notch 898 is provided in the disk into which the roller may drop to close the circuit in the switch and light the signal lamp 814, with which, as shown in Fig. 65, the switch is connected in series. The notch 898 is so located as to cause the light to be lighted when the shaft is indexed so as to move stop arm 830 out of alignment with roller 835.

When the operationn of one of the turrets is suspended during the removal of a tire from it and the building of one on the other turret, the shaft is set with stop 830 in alignment with the roller, the core slide being stopped in position J. Before re-starting operations on this turret the helper must index the shaft to free stop 830 from engagement with the collar and the signal light serves to inform the operator that his helper has performed this duty.

*Pneumatic control (Figs. 66, 68, 69, 70, 86-97, and 105-108. Reference characters 901-999).*

Figure 66:
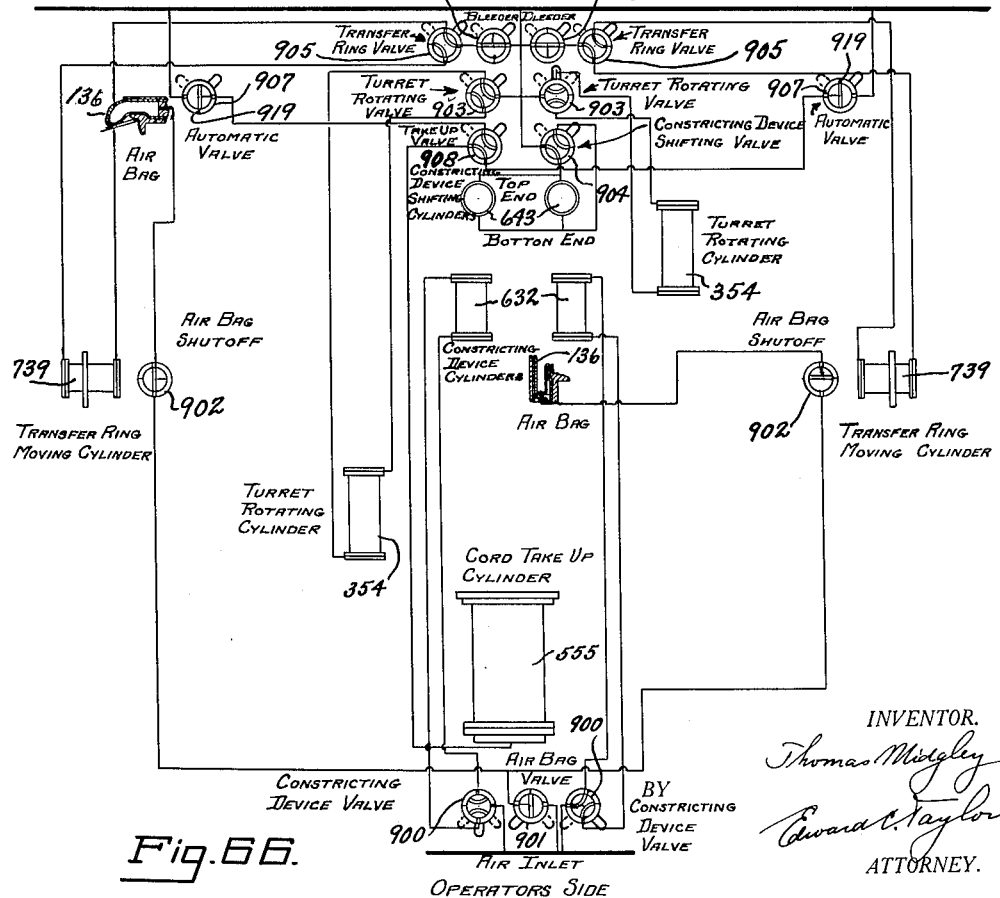
Fig. 66 is a diagram illustrating the pneumatic control connections.
Figure 67:
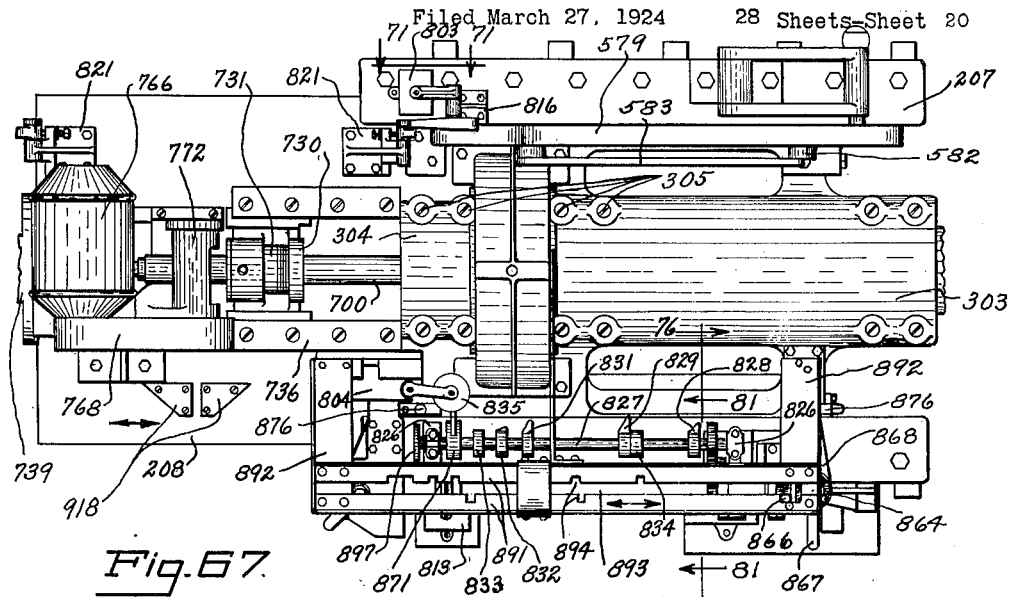
Fig. 67 is a top plan view of that turret shown at the right in Fig. 3, the turret being reversed end for end.

The several pneumatic cylinders which have been mentioned in the detailed description of the several sections of the machine are in the main controlled by hand operated valves. Fig. 66 is a diagram indicating the connections for each of these cylinders. The valves are preferably located on two control panels, one on either side of the machine, to be operated by the machine operator and the helper respectively.

Taking up first the controls on the operator's side of the machine, there are three valves, two, represented by 900, for operating the air cylinders 632 which expand or contract the constricting wires 606, and one valve 901 for operating simultaneously the two expanding air bags 136 and 136' used in the transfer after the cutting of the cords between the two cores. The valves 900 which control the cylinders 632 are each of a four-way type, so that by shifting the valve handle one way or the other the wires are either expanded or contracted, one side or the other of the cylinders being connected to the air main and the other side being vented to the atmosphere.

The valve 901 which controls both of the air bags used in transferring is, as above stated, also located at the operator's station. As both of these bags are always expanded simultaneously it is preferable to have one valve for controlling both. This valve is of a two-way type, serving either to admit air to the bags or to vent it therefrom. After the transfer operation is completed it is desirable to have the air pressure left on in the bag associated with the tire just being started, so as to hold the cords folded around the bead anchorage until they are held firmly by the starting of the second ply. During this period it may be desirable to remove the completed tire carcass on the idle turret and to this end to release the air pressure independently in the bag associated with it. A separate valve 902 is therefore provided on each turret, operable when turned 90° from its normal or open position to shut off the connection between the bag and the air line and to vent the bag to the atmosphere. After the tire is removed and the turret made ready for the building of a fresh tire, the valve 902 is again moved to place the bag in connection with the main air line and under the control of valve 901.

On the opposite, or helper's side of the machine are several control valves. Each of the turret rotating cylinders 354, which it will be remembered swing the core turrets independently to or from their positions in alignment with the cord guide, is connected with a four-way valve 903, operative to admit air to either end of the cylinder and to vent air from the other. By this means air pressure can be introduced at either side of the piston to swing the turret in that direction or the other.

The air cylinders 643 which shift the constricting devices axially, into either their normal position for use in applying bead wires between successive plies or their position for use in applying the bead wire to the fresh core during the transfer, are also controlled from this point. The two constricting units being always used in normal ply-building operations at positions similar to each other, they are here operated by a single four-way valve 904, operable to admit air to either end of the two cylinders simultaneously, and to vent air from the other ends.

The transfer rings 135 which are shifted by cylinders 739 during the transfer are each controlled by a pair of valves. To understand the purpose of this double control it will be necessary to refer to Figs. 105 to 108. In the transfer from one core to another the two cores gradually approach each other as the initial bead wire of the fresh core is being applied. Although the distance between the cores is constantly growing less the transfer rings 135 on the two cores must remain together so that the cords can be laid over them, as clearly appears in these figures. I prefer to obtain the relative motion between the fresh core and its transfer ring by permitting the two rings to abut and the ring on the filled core to push the other relative to its core as the cores come together. To allow this pushing it is necessary that the cylinder operating the ring on the fresh core be vented, but without any reversal of the direction of the air pressure on its piston. Each of the cylinders 739 is normally controlled by a four-way valve 905 which admits air to either end of the cylinder and simultaneously vents the other. This valve functions to shift the transfer ring into either extreme position, but does not serve for the intermediate positions of Figs. 105 to 108. A bleeder valve 906 of two-way construction is therefore placed in the air line in series with valve 905. This functions in the position of Fig. 66 only as a conduit between the air line and valve 905, but when turned to the position indicated by the handle in dotted lines it opens a small vent from the cylinder to the atmosphere and shuts off connection to the air line.

Figure 68:
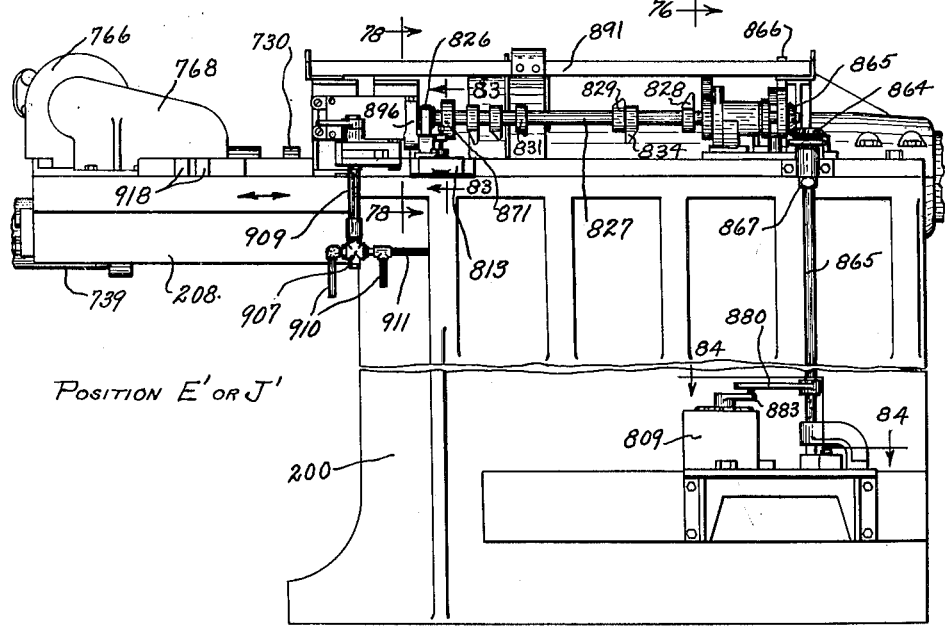
Fig. 68 is a front elevation of Fig. 67.
Figure 69:
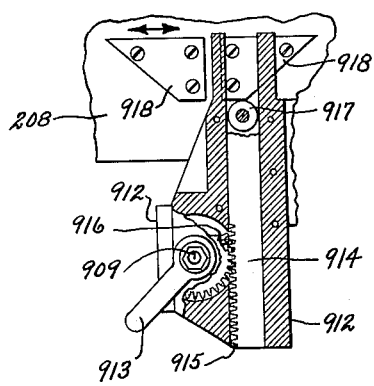
Fig. 69 is a plan view, partly in section, of an automatic shut-off for the cord take-up pneumatic control.
Figure 70:
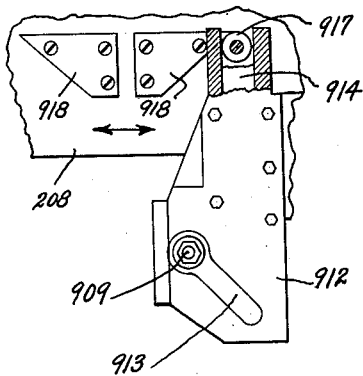
Fig. 70 is a similar view, mostly in top plan but partly in section, the parts being shown in different operative position.
Figure 71:
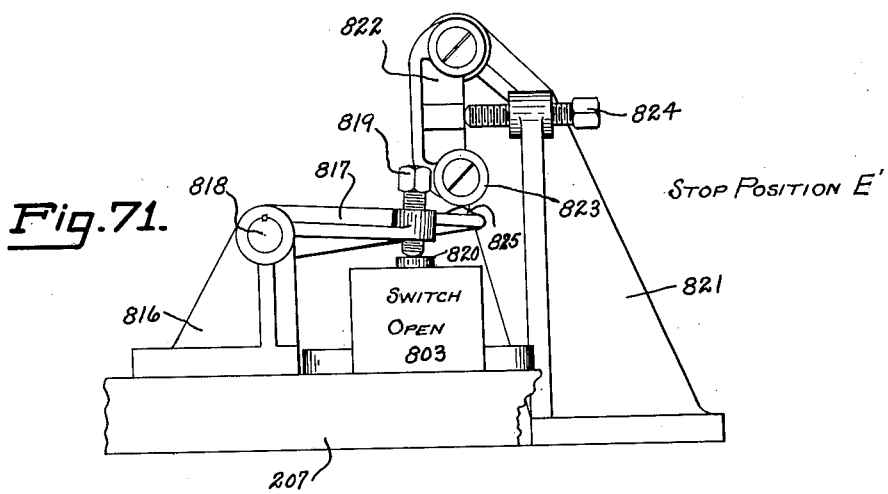
Fig. 71 is a detail elevation of an electrical stop device, looking from line 71—71 of Fig. 67.

The only other remaining air circuit is that including the cylinder 555 operating the take-up for the cords. This is best understood by a comparison of Fig. 66, showing the piping; Figs. 68, 69, and 70, showing the mechanical construction of a semi-automatic valve; and Figs. 86 to 97 illustrating diagrammatically the movement of the core and cords. There are in this system a pair of semi-automatic valves 907, one for each turret, and a single four-way valve 908 by which the control of cylinder 555 can be placed in either one of the turret valves. The action of the four-way valve 908 will be clear from Fig. 66, in which it will be apparent that by locating valve 908 in either the full or dotted line position an air circuit will be made from the air cylinder to the appropriate automatic valve.

Leaving the air connections themselves for a moment, the structure of the semi-automatic valves will be considered. As the valves on each turret are similar, a description of one will suffice. In Figs. 68, 69, and 70, 909 represents the shaft of the three-way valve 907, connected with suitable piping 910 and secured to the turret frame by a dead end pipe 911. This valve shaft 909 is sufficiently long to project through a bracket 912. The handle 913 of the valve is located above this bracket and the valve itself below it. Sliding in suitable guides in the bracket 912 is a bar 914 (Figs. 69 and 70) having rack teeth 915 thereon which mesh with teeth on a gear segment 916 secured to the shaft 909. On the end of the bar is a roller 917 projecting into the path of cam plates 918 secured to the reciprocating slide 208 which carries the core. These plates are so arranged on the slide that they will contact with the roller and move the slide to the position of Fig. 69 at substantially the center of the core's reciprocation, or in other words when the core is within the annular cord guide. The valve may be operated by the handle 913 to open or close it, but the automatic action caused by the cam plates always closes the valve at the center of the stroke. As it closes to shut off the air supply to the cylinder it connects the cylinder to a bleeder or vent opening 919 (Fig. 66) by which the air may escape.

Referring now to the diagrammatic Figures 86 to 97, it will be seen that as the core travels from the position of Fig. 88 to that of Fig. 92 (and even during the removal of the constricting wires) the cords must, in order to preserve their taut condition, be drawn back through the guide by the displacement of circumference 123 relative to circumferences 120 and 121. This is accomplished by air pressure supplied to cylinder 555, as will be remembered. At the position of Fig. 90, therefore, and before releasing the constricting wires, valve 907 is manually thrown to admit air into the cylinder. This tensions the cords and keeps them taut during their release by the constricting wires, and by drawing the excess lengths of the cords back through the central guide preserves the cords in this taut condition until the core reaches about the center of its travel. When the core has reached the position of Fig. 92, or slightly thereafter, roller 917 is struck by the moving cam plate 918, and is forced from the position of Fig. 70 to that of Fig. 69, thereby shutting off the valve 907. By shutting the valve the vent 919 in the valve is opened, so that during further travel of the core from the position of Fig. 92 to that of Fig. 94, a consequent straightening out of the cords between guides 120 and 121 will be permitted by the shifting of the piston in cylinder 555 and expulsion of the air through the vent under the influence of the tension of the cords. During the movement of the core from about the position of Fig. 94 to that of Fig. 96 the valve 907 remains off, and as indicated by a comparison of these figures, the cords pass in straight lines between circumferences 120 and 121 without any action upon them by the tension device.

*Summary.*

Before considering in detail the manner in which the operator controls the machine in building tires a concise description will be given of the way in which the machine itself functions during a building cycle. Starting with the core belonging to the left hand turret in the position of Fig. 100, the turret motor 240 acts through intermediate gearing on rack 209 to cause longitudinal movement of the core slide 208, shifting the core relative to the central cord guide from the position of Fig. 100 to that of Fig. 101. During this movement the cam rolls 311 on the core supporting sleeve 242 coact with the stationary cam 310 to cause a rotation or twist of the core, best shown by a comparison of Figs. 86 and 87 with Figs. 88 and 89. As the core withdraws from the guide the cords are drawn through guide 124 on account of the increase in distance between the points where the cords leave the guide and the points where they contact with the core. This increase is due both to the linear separation of the core and guide, and to the increased angular separation of these two points on the cord. During the first part of this motion (corresponding roughly with the transition from Fig. 86 to a position similar to Fig. 94 but with the core on the right of the central guide) the required additional cord is furnished by the rotation of guide rolls 511 (circumference 123) into line with guide rolls 500 (circumference 120) and guide rolls 520 (circumference 121). The venting of cylinder 555 to permit of this has been done automatically at or before the position of Fig. 86 by automatic valve 907. During the latter part of the separation cord is supplied from the stock spools 404 and 404'; the cord being pulled from the loop formed by floating roll 439, and cord being fed from the supply rollers to replenish that drawn from the loop by motor 442 under the control of the switch 450 which is actuated by the shifting positions of the floating roll.

At the end of the travel of the core (Fig. 101) one of the stops 876 on the core slide contacts with the trip arm 868, actuating the reversing switch 809 to cause a reversal in the direction of travel of the core. The control shaft 827 is also indexed one step by the movement of arm 868, but none of the stop cams are thereby introduced into the path of roller 853, the shaft at this time being turned so that one of the idle spaces at the left in Fig. 81 is presented to the roller. Shortly after this reversal stop switch 803 is opened by the arrival of its cooperating mechanism in the position of Fig. 71. At or near the time of reversal the cords are clamped by ring 556 to prevent accidental feeding from the supply rolls during the reverse stroke of the core, and to permit their being tensioned by the shifting of circumference 123.

After the operator has caused the proper pressure cylinder 632 to close in the constricting device 129 formed by wires 606, which he does at the end of the stroke, and has applied a bead anchorage 130 (Fig. 102) after the core stops, he removes the constricting wires from the cords and starts the motor 240 by pressing the starting switch 805, causing the core to travel from the position of Fig. 102 through the central cord guide to the position of Fig. 103. As the core approaches the guide there would be a tendency for slack to be formed in the cords, due both to the decreased linear distance between the core and the guide and to the reversed rotation of the core during this period. It will be remembered from a description of the method that the core rotates during its travel towards the guide in a direction the reverse of that occurring during its outward travel. The formation of any slack is prevented, however, by the tensioning action of pressure cylinder 555 acting through ring 513 to displace guide rolls 511 (circumference 123) and increase the length of path of the cords (Figs. 30 and 93). This pressure is removed by automatic valve 907 shortly before the core reaches the center of its stroke. At a time shortly after the passage of the core through the central guide the clamping ring 556 is released from the cords by cam roll 578 riding up on switch cam 584 (Fig. 59). This occurs at substantially the time when the cords are straightened out between circumferences 120 and 121 (Figs. 94 and 95) and permits the further movement of the core to draw cords directly from the supply.

This sequence of operations is repeated until a tire of the desired number of plies is built up. The next step is the transference of the building operation to a fresh core on the other turret. The manner in which this is performed has been considered in detail above and will be referred to again below, it being here merely emphasized in passing that the cores are stopped automatically at the several stop positions of Figs. 104 to 109 by the electrical control mechanism, leaving the operator free to perform what other things may be necessary.

*Operation.*

The description of the manner of operating the machine may for convenience be commenced with the left hand core in position A (Fig. 100). This is a position in which this core is left after the termination of the transfer operations and may be considered as the start of the normal ply-building operations. Starting, then, with the left hand core in this position, the helper moves handle 867 to one side of its center. He is constrained to move the handle in the right way by the interlocking of arm 836 with the slotted plate 891. When the machine stopped in position A the arm 866 came opposite one of the notches 894, and it is only possible to shift handle 867 in a direction which will carry the arm into the notch. This direction is such as to cause an indexing or partial rotation of shaft 827, but not to actuate the reversing switch 809. In this way, when the machine is again started, the core will move in the same longitudinal direction as before its stoppage.

By this indexing of the shaft 827 stop cam 828 is turned out of contact with roller 835 and the transfer control switch 804 closed. As shown in Fig. 65 the control circuit is now in condition for the motor 240 to be started by the switch 805. The operator once pressing this switch, the core travels to the end of its stroke (position B) where its direction of travel is reversed by switch 809 as described above. At about this last position the operator turns the proper valve 900 to cause the constricting wires at the right of the central guide to close in around the cords. Likewise at about this position the cords are clamped at circumference 122 by the actuation of sliding ring 566 by cam roll 578 and connected parts.

At position C, a short distance back from the end of the stroke, the core travel is automatically stopped by switch 803. The constricting wires have meanwhile drawn the cords towards the axis of the core, as permitted by the slack developed by this short movement, and hold the cords (Fig. 102) in position to receive a bead wire. This wire 130 may be applied around the cords by the operator and his helper in any desired way, as by uniting with a suitable clip the ends of a wire previously cut to length and looped at its ends.

After the bead wire is applied the core is ready for another layer of cords. Before starting the core travel again air is admitted to the take-up cylinder 555, through valve 908, preferably under the control of the helper, and valve 900 turned by the operator to expand the constricting wires and free them from the cords. The elastic take-up operated by cylinder 555 serves to prevent the formation of looseness in the cords, and to draw them snugly against the wire 130. The operator may now press the starting button 805 to start the travel of the core to position D.

During the travel from position C to position D, at a point slightly before the core reaches the center of its stroke, the automatic valve 907 acts to release air from the cylinder 555. As the core is passing through the guide there is little change in the length of the cords between their points of contact with the core and the guide, but as the core leaves the guide it starts to draw additional lengths of cords. The cords are initially furnished by the straightening out of the cord lengths between the guides, but later the cords must be drawn from their supply rolls. To permit this the clamp 566 is released automatically by roller 578 riding on switch cam 584, which occurs about half way between the center and end of the stroke. After the core has passed the central guide the cords are firmly anchored around the bead wire just applied, and therefore bag 136, which up to this point has been kept inflated to securely hold the cords in conjunction with clamping plate 135, may be released. This is done by the operator, who turns valve 901 to vent the bag and shut off the supply of air. At about the same time the helper actuates valve 905 which admits air to cylinder 739 and shifts the clamping ring (carrying with it the bag 136) from the position relative to the core in Fig. 102 to that in Fig. 103. These same relative positions are shown in Figs. 16 and 9 respectively.

The remainder of the normal ply-building operation is a repetition of the steps hitherto described, with the exception that the bag 136 and ring 135 are not again disturbed. The core is reciprocated back and forth through the guide, a new bead anchorage and cord ply being added at each stroke, until the number of plies desired in the tire carcass has been laid. During these repeated reciprocations the control shaft 827 is indexed around, one step at each reversal of core travel, by arm 868 striking alternately on the two stops 876. After the succession of ply laying strokes has been completed the shaft 827 has rotated to a position to bring stop 834 into cooperation with roller 835. On what would be the next following ply laying stroke, then, this stop trips switch 804 and stops the left hand turret in position F (Fig. 104), shortly before which the automatic air valve 907 has been turned by cam 918 to shut off air from the take-up cylinder 555.

The machine is now ready for the start of the operation of transferring the series of cords from the left hand to the right hand turret. The helper rocks handle 867 on the left hand turret in the direction permitted by the index plate 891, that notch 894 which in this case is opposite the arm 866 being cut in a direction to set the reversing switch 809 for reversed operation of the turret motor. This same operation indexes the shaft 827 so as to bring stop 833 into alignment with collar 835. After this the helper turns valve 905 to admit air to cylinder 739 and thus press clamping ring 135 firmly against the cords passing around the last applied bead anchorage (Fig. 104). He then turns valve 903 on the right hand turret, causing cylinder 354 to rotate it into alignment with the central guide, the right hand turret being previously in the inoperative position at right angles to the line of travel of the core in which position a fresh core was put in place.

As soon as the turret has moved into line the operator swings handle 374 and locks the turret to its base. Valve 905 is also turned by the helper to shift the right hand clamping ring 135' into the extreme position appearing in Fig. 104; and valve 905 is turned to relocate the constricting devices bodily on rods 612 and 615 in that one of their two positions in which the two devices are closer to each other. The operator now presses simultaneously the starting buttons 805 on each turret, the helper having at some time previous indexed shaft 827 of the right hand turret to bring stop 829 of that turret into line with roller 835.

The two cores are moved, each under the operation of its own motor, and are automatically stopped; core 125 in position G by its stop 833, and core 125' in position K' by its stop 829. In this position the helper turns the bleeder valve 906 on the right hand turret to permit a yielding movement of its clamping ring 135, and the operator turns the valve 900 to drop the constricting wires 129' on the left hand side of the cord guide. This leaves the parts in the condition of Fig. 105.

Figure 106:
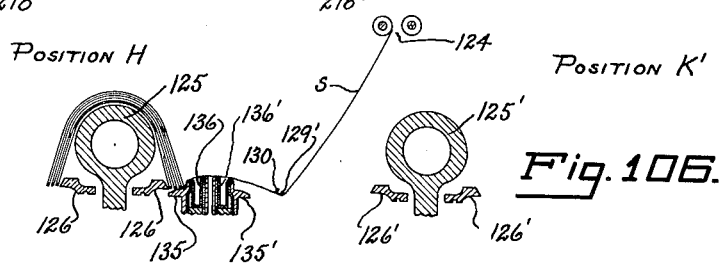

The helper now swings handle 867 on the left hand turret in the direction permitted by the index plate, in this case to reverse the travel of the left hand core; this, of course, indexing shaft 827 so as to bring stop 832 into line with roll 835. This releases the transfer control switch 804 so that the operator may restart the left hand core by pressing the starting button. Shortly after it starts, however, the core is stopped by the action of stop 832, bringing the core to rest in position H, as shown in Fig. 106. In this position the bead wire 130 may be applied, this forming the initial anchorage of the tire to be constructed on core 125'. With this wire in place the helper actuates valve 908 to cause the take-up cylinder 555 to operate; and the operator turns valve 900 to remove the constricting wires.

Figure 107:
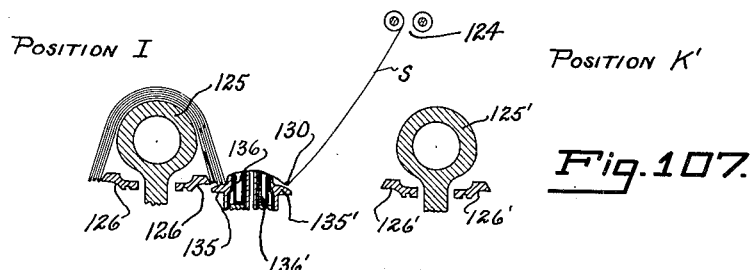

On a further indexing of shaft 827 by the helper, the handle this time moving so as to preserve the direction of travel of the core, the operator again presses the starting button for the left hand turret. The core is stopped by stop 831 in position I (Fig. 107). In this travel the wire 130 is drawn closer to the two adjacent transfer rings, finally riding upon the surface of the right hand ring 135'. The helper now resets the index shaft of the right hand turret to bring stop 828 into line with roller 835, the notch 894 in this case being arranged to cause no reversal of the motor. The core is now brought up into contact with the other parts as indicated in Fig. 108, its flange 126' riding upon ring 135 and clamping the bead wire 130 firmly in a fold of cords. This clamping is assisted by cylinder 739 drawing the ring 135' tightly to the core, the bleeder 906 being closed and valve 905 opened. The core is stopped in this position (A') by stop 828. If necessary, on account of the thickness of the tire bead, the left hand core is temporarily released from its driving mechanism during this movement by the clutch mechanism controlled by treadle 235. The helper releases the air from the take-up cylinder 555 by valve 907 and then places the control of this cylinder in the automatic valve 907 of the right hand turret by reversing valve 908.

The cords are now clamped to both cores and may be severed. This is done by the knife mechanism under control of switch 812. After the cut is completed and the knife withdrawn to its folded or inactive position the operator turns valve 901 to admit air to the two bags 136 and 136', which expand out of their containing pockets and fold the cut ends of the cords back around the bead wires. The core on the right hand turret is now in the same relative position as that at which the description of operations on the left hand turret was started. Further operations on this core are the same as the operations on the left hand core already described. But before these operations on the right hand core the left hand core must be moved into its inactive position in which it is shown in Fig. 1.

The first stage in this proceeding is the resetting of shaft 827 of the left hand turret by the helper. That notch 894 which in this case is in line with the arm 866 extends in a direction to permit rotation of shaft 865 in a direction to set the switch 809 for reversal of the turret motor. The indexing of shaft 827 thus brought about brings into line with roller 835 none of the stops, the roller in this setting of the shaft passing through the relatively wide space between stops 830 and 831. When, then, the operator presses the starting button associated with the left hand turret the core will travel from position I to position D (Fig. 85), the limit of its stroke. At this point arm 868 contacts with one of the stops 876, reversing the motor and simultaneously resetting shaft 827 to bring stop 830 into line with roller 835. After a slight reverse travel of the core it is stopped by the transfer control switch in position J, which is substantially the point, indicated by E, where the core would be stopped by the switch 803 if the transfer control switch were not operated.

The reason for using the transfer control switch at this point rather than relying on switch 803 lies solely in the element of safety while the core which has a completed tire upon it is in its inactive position (see the core at the left in Fig. 1). If the turret motor were stopped merely by switch 803 it could be restarted by merely pressing the starting button, since the switch 803 and the starting button 805 are in parallel branches of the same circuit (Fig. 65). The transfer control switch, however, is in series with both of these other switches, and as long as it remains open the motor cannot be restarted. The only way in which this switch can be closed is by indexing shaft 827 to release the roll 835 from stop 830. This is under control of the helper, who is working on this idle turret; and, until he is ready and signifies his readiness by indexing the shaft to bring stop 829 into line with the switch roller, the operator can do no damage even though he accidentally presses the starting button associated with the idle turret. This indexing is indicated to the operator by the lighting of lamp 814.

It may be well in this connection to refer to the special construction of stop 830 previously described, and shown in Fig. 83. As so short a travel elapses between the indexing of shaft 827 at point D and the contacting of stop 830 with the roller 835 to cause stoppage of the motor at point J, there is some danger of the stop striking the flat side of the roller as the shaft 827 is rotating (see Fig. 83). The yielding construction described allows the stop to slip into position and gradually cam the roller away, thus eliminating possibility of breakage.

The left hand turret bearing the completed tire carcass may now be swung into the inoperative position of Fig. 1. To do this the operator unlocks the turret by swinging handle 374 and the helper turns valve 903 which admits air to cylinder 354 to rotate the turret. At about the same time the helper turns valve 902 on the left hand turret which shuts off the air bag 136 on that turret from the control of valve 901 the bag on the right hand turret under the and vents it to the atmosphere. This leaves control of the operator but frees the bag on the left hand turret so that the core may be removed. On turning valve 904 to reset the constricting wires in their normal or separated positions the machine is ready for building a tire carcass on the right hand turret in the same manner as previously described for the left hand core.

Having thus described my invention, I claim:

1. In a tire building apparatus wherein a circular tire building support passes forward and back through a circumferential cord guide, thereby drawing the cords across and to the side of the support; a second circumferential cord guide concentric with the first but of larger diameter, and means for deflecting the cords between the two guides to increase their length of path and thereby take up excess length of cord.

2. In a tire building apparatus, a circular tire building support, a circumferential guide concentric therewith, devices for supplying cords to the guide, and means between the supply and the guide for varying the length of cord path.

3. In a tire building apparatus in which a circumferential sheath of material is supplied to a building support through an encircling guide; a clamping device beyond the guide, and tensioning means located between the clamp and the guide.

4. In a tire building apparatus in which a circumferential sheath of material is supplied to a building support through an encircling guide; a clamping device beyond the guide, and tensioning means located between the clamp and the guide, said clamp being controlled by the relative positions of the support and the guide.

5. In a tire building apparatus wherein a circular tire building support passes forward and back through a surrounding circumferential cord guide, an annular clamp adapted to hold the series of cords at a circumference outside the cord guide, and means for deflecting the cords between the guide and clamp to take up slack in the cords.

6. In a tire building apparatus wherein a circular tire building support passes forward and back through a surrounding circumferential cord guide, an annular clamp adapted to hold the series of cords at a circumference outside the cord guide, a ring provided with cord guiding means and interposed between the clamp and guide, and means for rotating the ring to deflect the cords to take up slack.

7. In a tire building apparatus wherein a circumferential series of cords is drawn through a circular guide by the passage therethrough of a circular tire building support, and wherein a tendency to slackness in the cords is developed during certain periods in the movement of the support; a slack take up device constructed and arranged to draw back through the guide such slack as it is developed, said device being constructed to act with predetermined uniformity on all the cords of the series.

8. In a tire building apparatus, a circular material guide, a tire building core, means for reciprocating the core through the guide, and an elastically operating tension device operable to draw the material back through the guide as required to prevent the formation of slack between the core and the guide.

9. In a tire building apparatus wherein a circumferential sheath of material is drawn through a circular guide by the reciprocation therethrough of a circular tire building support, and wherein a tendency to slackness in the material is developed during certain periods in the movement of the support; a pneumatically operated slack take up device constructed and arranged to draw back through the guide under elastic tension the slack in the material so developed.

10. In a tire building apparatus wherein a circumferential series of cords is drawn through a circular guide by the reciprocation therethrough of a circular tire building support and wherein a tendency to slackness in the cords is developed during certain periods in the movement of the support; a pneumatically operated slack take up device acting with positive uniformity on all the cords of the series to draw back through the guide under elastic tension the slack in the cords so developed.

11. In a tire building apparatus wherein a circular tire building support passes forward and back through a surrounding cord guide; that construction of the surrounding guide comprising three concentric circumferential guides each adapted to guide separately each cord of a circumferential series, the middle one of the three guides being rotatable about its axis to deflect the cords guided jointly by the three guides and thereby keep them taut during the motion of the core.

12. In a tire building apparatus wherein a circular tire building support passes forward and back through a surrounding cord guide; that construction of the surrounding guide comprising three concentric circumferential guides each adapted to guide separately each cord of a circumferential series, the middle one of the three guides being rotatable about its axis to deflect the cords guided jointly by the three guides and thereby keep them taut during the motion of the core, and pneumatically controlled devices for rotating the middle guide.

13. In a tire building apparatus wherein a series of cords is drawn through a circumferential guide by the motion therethrough of a circular tire building support; a supply roll for the cords, a floating roll between the supply and guide responsive to the length of cord therebetween, power operated mechanism for unwinding stock from the supply roll, and means operably connecting said mechanism with the floating roll whereby the length of cord between the supply and guide is kept within certain limits.

14. In a tire building apparatus wherein a series of cords is drawn through a circumferential guide by the motion therethrough of a circular tire building support; a plurality of supply rolls for the cords, an annular clamp between the supply and guide, a rotatable annulus between the clamp and the guide for deflecting the cords and thereby taking up slack, a floating roll between each supply roll and the clamp for taking up slack in the cords, power mechanism for unwinding the cords from the supply rolls, and means operably connecting said mechanism with the floating rolls whereby cords will be unwound from the supply rolls as required by the operation of the machine.

15. In a tire building apparatus in which a building support passes through an encircling guiding device; a central frame housing the guiding device, and a secondary frame carrying the guiding device and removable therewith from the central frame.

16. In a tire building apparatus in which a tire building core is moved longitudinally through a surrounding cord guide and is rotated during such movement; an operating means for the core comprising a frame, a core carrying member in the frame, means for reciprocating the member, a concave cam held stationary in the frame, and a plurality of cam rolls carried by the member and coacting successively with the cam to rotate the core during its travel.

17. In a tire building apparatus wherein a circular tire building core is moved longitudinally through a surrounding cord guide and is rotated during such movement; an operating means for the core comprising an integral frame fixed in position with respect to the guide during the building operation, a transversely divided slide therein carrying the core, and core rotating mechanism located between said divisions of the slide.

18. In a tire building apparatus wherein a circular tire building core is moved longitudinally through a surrounding cord guide and is rotated during such movement; an operating means for the core comprising a frame, a slide guided in the frame, means for reciprocating the slide, a core supporting shaft fixed for movement with the slide but rotatable therein, a circular series of cam rolls fixed to the shaft and extending through an opening in the slide, and a cam fixed to the frame with which the rollers successively coact to rotate the core during its reciprocation.

19. In a tire building apparatus in which a tire building core is moved longitudinally through a surrounding cord guide and is rotated during such movement, an operating means for the core comprising a frame, means for reciprocating the member, a cam held stationary in the frame, a cam roll disk mounted on the member, cam rolls on the disk coacting with the cam to cause the core to rotate during its travel, said cam roll disk being capable of being disassembled from the member to permit removal of the cam without requiring the member being removed from the machine.

20. In a tire building apparatus wherein a circular tire building core is moved longitudinally through a surrounding cord guide; a reciprocating means for the core comprising a frame, a slide guided in the frame, a pair of racks carried by the slide, a shaft supported in the frame, gears carried by the shaft and meshing with the racks, a worm gear loosely carried by the shaft, a power shaft, a worm on the power shaft meshing with the worm gear, and a clutch connection operable to couple together the worm gear and its supporting shaft.

21. In a tire building apparatus comprising a circular guide, a tire building core reciprocable through the guide, and a support for the core rotatable to move the core out of alignment with the guide; operating means for the support comprising a gear segment fixed to the support, a rack meshing therewith, and a pneumatic cylinder connected to the rack to rotate the support.

22. In a tire building apparatus, a circular guide for a circumferential sheath of material, a clamping device for the material associated with the guide, a rotatable turret for supporting a tire core either for cooperation with the guide or in an inactive position, means for reciprocating the core in the turret, a lock for holding the turret in cooperative position, means for operating the lock, means for operating the clamping device by the reciprocation of the core in the turret, and mechanism disconnecting the clamping device from operation by the core upon withdrawal of the lock from locking position.

23. In a tire building apparatus wherein a circumferential sheath of material is drawn across and to one side of a circular tire building support and is constricted towards the axis of the support by a contractile structure formed of a plurality of wires each having its opposite ends attached to separate rings; mechanism for operating the rings to rotate them in reverse directions comprising gear segments attached to the rings, a gear meshing with each segment, connections between the gears so that they are constrained to move together but in opposite directions, a pneumatic cylinder, and connections between the cylinder and the gears whereby admission of pressure fluid into said cylinder causes yielding motion of the rings in opposite directions.

24. In a tire building apparatus, means for drawing a circumferential sheath of material across and to one side of a circular tire building support, and a pneumatically operated contractile circular structure adapted to exert a cushioned pull on the material towards the axis of the support.

25. In a tire building support having a circular guide for a circumferential sheath of material, a circular tire building support adapted to reciprocate through the guide, and devices at either side of the guide adapted to constrict the sheath towards the axis of the support; a plurality of guides upon which each device may slide, and shifting means engaging the devices to move them upon the guides.

26. In a tire building apparatus, a circular guide, a tire building core, means for reciprocating the core through the guide, stop mechanism adapted to cause stoppage of the core travel at predetermined points, restarting mechanism, and connections between the stopping and restarting mechanism whereby restarting of the machine sets the stop mechanism for stopping the machine at the next stop position desired in the building operation.

27. In a tire building apparatus, a circular guide, a tire building core, means for reciprocating the core through the guide, and stop mechanism comprising a rotatable shaft, a stop switch mounted for reciprocation with the core, a plurality of stop devices mounted on the shaft in different angular positions and adapted severally to cooperate with the stop switch to cause stoppage of the core travel, and means for rotating the shaft to bring said devices successively into cooperation with the stop switch.

28. In a tire building apparatus, a circular guide, a tire building core, means for reciprocating the core through the guide, and stop mechanism comprising a rotatable shaft, a stop switch mounted for reciprocation with the core, a plurality of stop devices mounted on the shaft in different angular positions and adapted severally to cooperate with the stop switch to cause stoppage of the core travel, a reversing switch, and connections between the reversing switch and the shaft whereby actuation of the reversing switch in either direction will cause a partial rotation of the shaft in a uniform direction.

29. In a tire building apparatus, a circular guide, a pair of tire building cores, means for reciprocating either core through the guide, automatic devices for stopping the core travel adjacent the ends of its reciprocation, and devices acting after the completion of the desired number of passages of the core through the guide to stop the core travel at intermediate positions facilitating the transfer of the building operation from one core to the other.

30. In a tire building apparatus, a circular material guide, a tire building core, means for reciprocating the core through the guide, an elastically operating tension device operable to draw the material back through the guide at certain periods during the core reciprocation, means for starting the operation of the tension device, and automatic means for discontinuing its operation when the core is passing through the guide.

31. In a tire building apparatus, a circular guide, a tire building core, means for reciprocating the core through the guide, automatic means for stopping the travel of the core selectively in predetermined positions, and manual means for restarting the travel and simultaneously resetting the stop means in position to stop the core travel at the next point desired.

THOMAS MIDGLEY.